(12) United States Patent
Johnson et al.

(10) Patent No.: US 7,291,267 B2
(45) Date of Patent: Nov. 6, 2007

(54) MOLECULAR SEPARATOR

(75) Inventors: Raymond Ford Johnson, White Oak, TX (US); Markley Dean Johnson, Gladewater, TX (US); Rodney Grage, Lindale, TX (US)

(73) Assignee: LJC Technologies, L.L.C., Tyler, TX (US)

( * ) Notice: Subject to any disclaimer, the term of this patent is extended or adjusted under 35 U.S.C. 154(b) by 398 days.

(21) Appl. No.: 10/820,538

(22) Filed: Apr. 8, 2004

(65) Prior Publication Data

US 2005/0170492 A1      Aug. 4, 2005

Related U.S. Application Data

(60) Provisional application No. 60/540,492, filed on Jan. 30, 2004.

(51) Int. Cl.
*B01D 65/02*      (2006.01)

(52) U.S. Cl. .............. 210/321.69; 55/302; 55/419; 96/10; 210/143; 210/209; 210/257.2; 210/259; 210/321.87; 210/411; 210/416.1; 210/456

(58) Field of Classification Search ............ 210/241, 210/257.1, 257.2, 258, 259, 314, 321.69, 210/321.87, 333.01, 335, 340, 341, 411–414, 210/636, 650, 770, 771, 791, 797, 806, 143, 210/201, 209, 456; 219/69.14; 55/301–303, 55/418, 419; 96/6, 10
See application file for complete search history.

(56) References Cited

U.S. PATENT DOCUMENTS

| | | | |
|---|---|---|---|
| 4,136,029 A | * | 1/1979 | Cosack et al. ........... 210/242.1 |
| 4,158,629 A | * | 6/1979 | Sawyer ........................ 210/137 |
| 4,222,874 A | * | 9/1980 | Connelly ..................... 210/650 |
| 4,636,317 A | * | 1/1987 | Lewis ........................ 210/748 |
| 4,642,188 A | | 2/1987 | DeVisser et al. |
| 4,927,547 A | * | 5/1990 | Backman .................... 210/771 |
| 4,957,625 A | | 9/1990 | Katoh et al. |
| 5,298,161 A | * | 3/1994 | Sieg ....................... 210/321.78 |
| 5,374,351 A | | 12/1994 | Bolton et al. |

(Continued)

FOREIGN PATENT DOCUMENTS

DE      30 26 769 A      2/1981

(Continued)

*Primary Examiner*—Joseph Drodge
(74) *Attorney, Agent, or Firm*—Carstens & Cahoon, LLP; Colin P. Cahoon; Chad F. Walter

(57) ABSTRACT

The present invention discloses a method and apparatus for separating particles and dissolved matter from a fluid stream. Specifically, the present invention includes a first pressure source which transports untreated fluid into a separator annulus with a filter element disposed therein. The untreated fluid is placed under appropriate pressure sufficient to produce turbulent flow, increased particle kinetics and/or cavitation physics allowing the desired fluid to penetrate and pass into and through the filter media. The filtered fluid is then transported to a collection tank. The contaminant particulate matter retained on the exterior of the filter media may be removed by the instantenous reverse pressurization of the separator annulus by a second pressure source thereby removing the contaminant particles away from contact with the filter media, and which may then be transported to a waste collection tank or a concentrator for further treatment.

19 Claims, 74 Drawing Sheets

U.S. PATENT DOCUMENTS

| | | |
|---|---|---|
| 5,401,397 A | 3/1995 | Moorehead |
| 5,434,381 A * | 7/1995 | Mitcheson ............... 219/69.14 |
| 5,846,420 A | 12/1998 | Bolton et al. |
| 5,906,751 A | 5/1999 | Parker |
| 6,110,390 A | 8/2000 | Potter et al. |
| 6,155,430 A | 12/2000 | Goodman |
| 6,203,696 B1 * | 3/2001 | Pearson ....................... 210/98 |
| 6,562,246 B2 | 5/2003 | McGowan |
| 6,607,661 B2 | 8/2003 | Koivula |
| 6,669,843 B2 | 12/2003 | Arnaud |
| 6,712,981 B2 | 3/2004 | Benenson, Jr. et al. |
| 2001/0009237 A1 | 7/2001 | Chau |
| 2003/0066795 A1 | 4/2003 | Fry et al. |
| 2003/0146171 A1 | 8/2003 | Herrmann |

FOREIGN PATENT DOCUMENTS

| | | |
|---|---|---|
| DE | 41 01 229 A | 7/1992 |
| FR | 2 716 385 A | 8/1995 |
| GB | 2 356 432 A | 5/2001 |
| JP | 62 149304 A | 7/1987 |
| JP | 08 019731 | 1/1996 |
| JP | 2002 346347 | 12/2002 |

* cited by examiner

MOLECULAR SEPARATOR

PRIORITY CLAIM

This application claims the benefit of U.S. Provisional Application No. 60/540,492, filed Jan. 30, 2004, the disclosure of which is incorporated herein by reference.

BACKGROUND OF THE INVENTION

1. Technical Field

The present invention relates to methods and apparatus for the physical separation of solids from fluids, and fluids from gases. More specifically, the invention relates to methods and apparatus for separating solids and dissolved constituents from fluids using an arrangement of separators and concentrators, which are pneumatically pressurized and depressurized at desired intervals via electronically controlled poppet valves, which results in the separation of particulates and dissolved constituents from the untreated fluid media.

2. Description of Related Art

The safe and effective removal of contaminants from fluids is a consistent problem faced by many industries. The impurities accumulated by water and other fluids during the hydrologic cycle, and as a result of use by humans, may appear in both suspended and dissolved forms. Suspended solids may be generally classified as particles larger than molecular size (i.e. particle sizes greater than $10^{-3}$ mm), which are supported by buoyant and viscous forces existing within water. Dissolved materials (i.e. particle sizes less than $10^{-3}$ mm) consist of molecules and ions, which are held by the molecular structure of water.

The presence of suspended and/or dissolved solids in water, wastewater and other fluids is undesirable for several reasons. The presence of visible suspended solids may be aesthetically displeasing. Likewise, the presence of suspended and/or dissolved solids allows for the adsorption of other chemicals or biological matter into the fluid. Due to the standards promulgated by government agencies, excessive contaminants must be removed from wastewater and other types of contaminated fluid streams before the effluent may be discharged to the environment or recycled. If established discharge-contamination levels are exceeded, cities and other governmental authorities may impose surcharges and penalties on the entity responsible for the excessive discharge.

There are many industries in which water and other fluids are typically used to clean equipment and other components, such as the aircraft, petroleum and automotive industries. This wash water typically contains significant amounts of suspended solids, dissolved minerals, and organic materials, including oils and other hydrocarbons. Detergents and other chemicals used in the wash operations and drilling operations present further difficulties only increasing the effluent fluid discharge concerns.

The prior art contains multiple attempts to improve the process of separating particles from a fluid. For instance, U.S. Pat. No. 5,647,977 discloses that the water from vehicle wash facilities can be completely recycled, without water discharge. However, where the cost of water is not a factor and the public sewage system can accept certain contaminants, a complete recycling system may not be cost justified. In such systems, aeration by dissolved oxygen can be used to eliminate foul odors without the foaming problems typically caused by continuously bubbling air in the sumps. Additional treatment to remove the suspended solids and reduce the organic materials (other than detergents) in the sump can render the water suitable for reuse, e.g., in the washing part of a vehicle wash cycle, or for discharge where permitted in selected public sewage systems.

A need exists in the art for a portable, highly efficient filtration apparatus and method which can separate suspended and dissolved solids in a variety of environments. Further, a need exists for an improved apparatus and method of removing particles from fluids in either a liquid or gaseous state. Further, a need exists for an apparatus and method which can consistently remove particles of a desired size so as to efficiently and consistently reduce the chance of the imposition of a surcharge for violating quality control standards and releasing untreated effluents.

SUMMARY OF THE INVENTION

The present invention discloses a method and apparatus for separating particles, dissolved matter and chemical sub-fractions from a fluid stream. Specifically, the present invention includes a pneumatic pressure source which transports untreated fluid into a separator. The untreated fluid is placed under pressure sufficient to drive the unfiltered fluid into and through the filter media within the separator. The filtered fluid is then transported to a collection tank. The particulate matter retained on the exterior of the filter media may be removed by the instantenous reverse pressurization of the separator thereby forcing filtered waste away from contact with the filter media and into a concentrator which can dewater and dry the filtered waste as desired. The concentrated waste is then transported to a waste collection tank where it is retained for appropriate disposal.

The present invention also discloses a novel poppet valve design which insures leak proof function and can be controlled electronically via standard control inputs or pneumatically by the application of positive or negative pressure. The present invention also discloses a novel separator design which utilizes kinetics and cavitation physics to increase filtration efficiency, allowing the separation of chemical sub-fractions from fluid streams below the 1 micron dimension.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
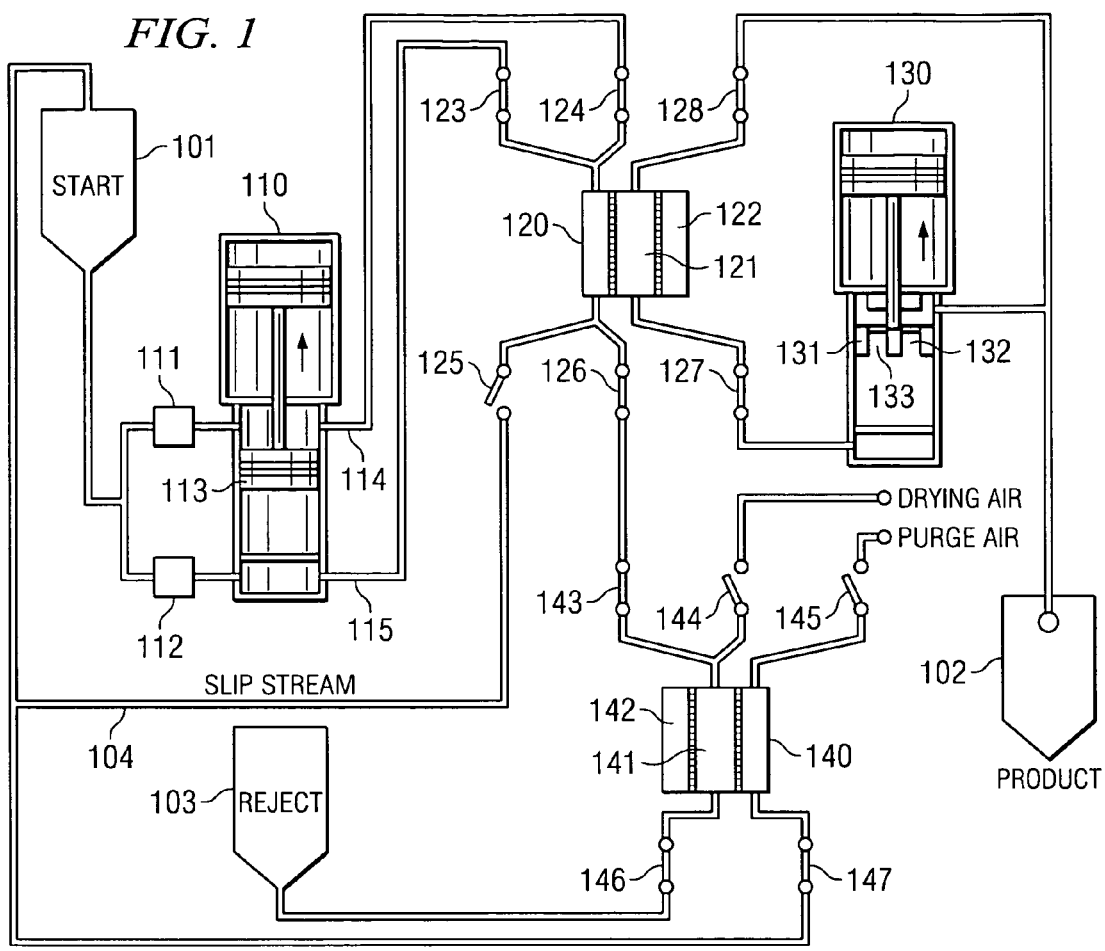
FIG. 1 is a schematic diagram illustrating the interaction of the functional components of the molecular separator as depicted in accordance with the present invention.

Referring now to FIG. 1, a schematic diagram illustrating the interaction of the functional components of the molecular separator is depicted in accordance with the present invention. An untreated fluid containing suspended particles and dissolved matter is placed in a in starting or contaminated fluid storage tank 101. This untreated fluid may include contaminated water, industrial solvents, or any similar fluid or solid from which sub-fractions are to be separated. The present invention can separate liquid from liquid, gases from liquids, and gases from solids. For example, the untreated fluid might be water contaminated with oil, iron, lead or other toxins or waste products. Another example of the fluid to be treated is brine made of zinc bromide (often used to flush drilling holes) from which dissolved solutes are removed such as iron.

The filtration process begins by drawing the untreated fluid from the starting tank 101 by means of a first pneumatic pump 110. The pneumatic pump 110 alternately draws the untreated fluid through two poppet valves 111, 112 via the upward and downward motion of the plunger 113, and alternately pumps the fluid through two out lines 114, 115. As the plunger 113 rises (as show in the present example), fluid is drawn through poppet valve 112. Simultaneously fluid is pumped out through line 114. When the plunger 113 reverses direction and pushes downward, valve 112 closes and the untreated fluid is drawn through poppet valve 111 and pumped out through line 115.

The untreated fluid moves through lines 114, 115 to a separator annulus 120. For the purposes of FIG. 1, a single separator annulus 120 with flux cartridge 121 inserted therein is shown for ease of illustration. In a preferred embodiment of the present invention, eight such annuli are contained in a single separator filter pod. Within the center of the annulus 120 is a filter media or flux cartridge 121. The flux cartridge 121 is the membrane that filters out the desired product from the untreated fluid. A space (referred to herein as fluid ring 122) exists between the inside surface of the annulus 120 and the outer surface of the flux cartridge 121. As untreated fluid is pumped through line 114, it passes through poppet valve 124 on top of the annulus 120 and into the fluid ring 122. When the untreated fluid is pumped through line 115, poppet valve 124 closes and the fluid passes through poppet valve 123 into the fluid ring 122.

Once in the fluid ring 122, the untreated fluid moves in a turbulent manner (described in more detail below), allowing the desired product (e.g., water, zinc bromide, etc.) to pass through the flux cartridge membrane and into the interior chamber of the flux cartridge 121, leaving behind larger particles and molecules as residue in the fluid ring 122 and the exterior of flux cartridge 121. The pressure supplied by pump 110 pushes the filtered product out of the center of the flux cartridge 121 through a valve 127 and into a second pump, called a pneumatic ejector pump 130. Alternatively, the filtered fluid product may leave the flux cartridge 121 through an ejector bypass valve 128 and travel directly to a product collection tank 102. This ejector bypass is used when a single ejector pump 130 services multiple separator filter pods in alternative embodiments of the present invention.

During the filtration cycle described above, the ejector pump plunger 131 is drawn up (as shown in FIG. 1), which opens check valves 132, 133 that are built into the plunger's disc. In this position, the check valves 132, 133 allow the filtered product coming from the flux cartridge 121 to pass by the plunger 131 and out of the ejector 130 and into the product collection tank 102. This filtration cycle repeats for a pre-determined time period (e.g., 20-25 seconds). At the end of this pre-determined cycle period, the separator is backwashed and cleaned with a reverse flush.

The reverse flush operation begins by stopping first pump 110 and shutting the poppet valves 123, 124 at the top of the separator filter pod in which the annulus 120 is contained. Next, the pneumatic ejector 130 is activated and plunger 131 is driven downward. This motion closes the check valves 132, 133 and stops the flow of filtered fluid past the plunger 131, allowing the plunger to exert pressure on the fluid inside the ejector. The fluid is pushed back through valve 127, through the flux cartridge 121 and into the fluid ring 122. The time period for this reverse ejection flush is approximately 0.35 seconds and is carried out under higher pressure than the normal filtration cycle driven by pump 110. For example, the pressure exerted on the untreated fluid by pump 110 may be up to 150 psi (depending on the viscosity of the fluid involved). In contrast, the pressure exerted by the ejector 130 during the reverse flush may be up to 250 psi. This quick, high-pressure reverse burst removes any particles and residue remaining on the outside surface of the flux cartridge 121 and re-homogenizes the particles and residue in the fluid ring 122 back into solution. Poppet valve 126 on the bottom of the annulus 120 is then opened to allow the pressurized particles and residue solution to flush out of the fluid ring 122 and into a concentrator annulus 140. The concentrator annulus 140, as its name suggests, concentrates the waste flushed from the separator annulus 120 by removing a significant portion of the flush fluid used during the reverse flush cycle. Unlike the separator filter pod, which may contain up to eight annuli in the preferred embodiment, the concentrator annulus 140 contains only one annulus with a flux cartridge 141 disposed therein.

The flushed waste enters the concentrator annulus 140 through an open poppet valve 143 and into the interior chamber of the concentrator's flux cartridge 141. The desired effluent fluid passes through the membrane of the flux cartridge 141 and into the fluid ring 142, leaving the concentrated waste residue in the interior chamber of the flux cartridge 141. Poppet valve 147, which is located at the bottom of the concentrator annulus 140, allows the filtered fluid in the fluid ring 142 to return to the starting tank 101. Poppet valve 143, through which the waste fluid entered the concentrator 140, is closed and poppet valve 144 is opened to let drying air into the interior chamber of the concentrator flux cartridge 141. This drying air provides a mechanism to dewater the concentrated waste and drives additional flush fluid through the flux cartridge 141 membrane and through the return poppet valve 147.

The drying air poppet valve 144 and fluid return poppet valve 147 are then closed, and poppet valve 145, located on the top of the concentrator 140, is opened to allow in pressurized purging air. When the air pressure inside the concentrator 140 reaches a pre-determined or desired level (e.g. 110 psi), poppet valve 146 is opened which allows the waste residue inside the flux cartridge 141 to escape into a waste collection tank 103.

Figure 2:
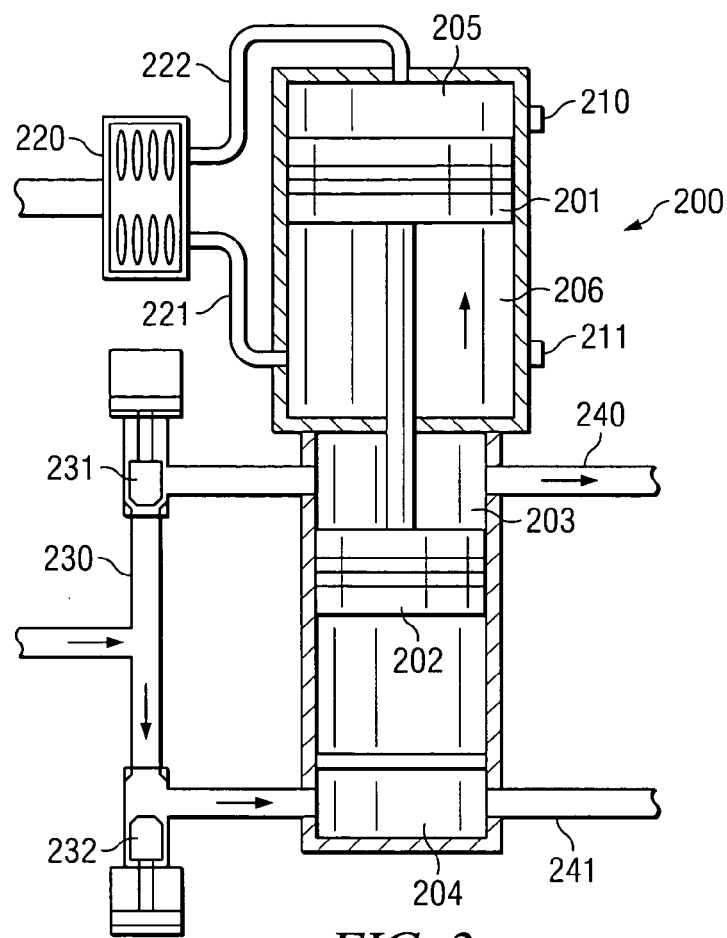
FIG. 2 is a schematic diagram illustrating the pneumatic pressure pump in more detail.

FIG. 2 is a schematic diagram illustrating the pneumatic pump in more detail. This view better illustrates the mechanisms by which untreated fluid is pumped into the separator filter pod through alternating channels. The operation of the pump 200 is controlled by monitoring the position of the top disc 201 as it cycles up and down. A magnetic strip with a positive pole (not shown) is placed inside the circumference of the upper disc 201. This magnetic strip is detected by two magnetic sensors 210, 211 positioned or attached along the side of the pump 200. As the upper disc reaches the end point of its movement (up or down), one of the sensors 210, 211 detects its position and relays this to a central controller, which coordinates the function of several solenoids that control the other components in the pump assembly. The sensors 210, 211 are adjustable up and down to facilitate calibration of the pump 200.

Referring to FIG. 2, the top disc 201 is moving upward due to pump air entering the lower half of the air chamber 206 through a hose 221. At the same time, exhaust air is being pushed out of the upper half of the air chamber 205 through another hose 222.

In the lower portion of the pump 200, the upward movement of the lower disc 202 draws untreated fluid through a supply line 230 and an open poppet valve 232 and into the lower fluid chamber 204. Simultaneously, the lower disc 202 pushes fluid from the upper chamber 203 through an upper outflow line 240. Because the upper poppet valve 231 is closed, fluid is prevented from flowing from the upper chamber 203 back into the supply line 230 during the upstroke. Poppet valves 231, 232 open and closed at the desired intervals able to move fast to control the fluid flow at high pressure. The top disc 201 is approximately six inches in diameter and operated to a maximum pressure of 110 psi at normal water. The lower disc 202 is approximately 5 inches, producing a maximum operating pressure of 150 psi at normal water.

As the upper pump disc 201 reaches the top of its upward movement, its position is detected by the top magnetic sensor 210. The signal from this sensor 210 is relayed to a central controller, which instructs a control solenoid 220 to reverse the direction of air through hoses 221 and 222. Therefore, pump air will now move through hose 222 into the upper half of the air chamber 205, forcing the upper disc 201 downward, and the exhaust air will flow out through hose 221.

The central controller also instructs a control solenoid (not shown) to open poppet valve 231 and anther solenoid (not shown) to close poppet valve 232. Therefore, as the lower disc 202 moves downward, fluid is drawn into the upper chamber 203 through the upper poppet valve 231. Poppet valve 232, now in the closed position, prevents fluid backflow into the supply line 230 as fluid is pushed out of the lower chamber 204 and through lower outflow line 241. When the upper pump disc 201 reaches the bottom of its movement path, it is detected by lower magnetic sensor 211, which relays the disc's position to the central controller, and the pumping cycle repeats itself as described above.

The pneumatic pump and pneumatic ejector pump may include carbon coated pump rods and piston components, which provides additional corrosion protection from contact with the untreated influent, effluent and waste materials involved in the process. Most of the other components are constructed of stainless steel. The heads of the poppet valves are made of marine brass because of its malleability, which allows the valves to maintain seal integrity over periods of sustained operation.

Figure 3:
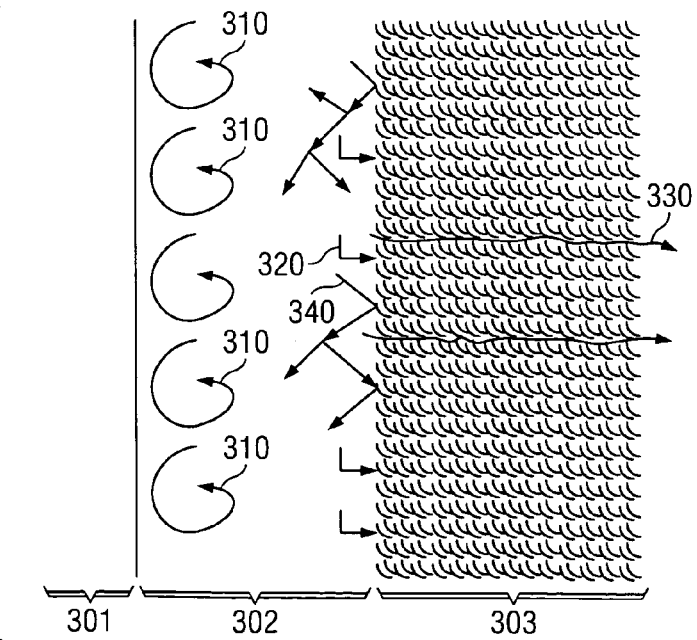
FIG. 3 is a cross-section view of the filter membrane of the flux cartridge inside the annulus of a separator.

FIG. 3 is a cross-sectional view of the filter membrane 303 of the flux cartridge inside the filter annulus 301. The porous matrix of the filter membrane 303 is created by pressing or sintering metal powder around a bar at high pressure and then annealing it, using well-known metallurgical techniques as is known in the metallurgical art. Other methods of manufacturing filter membranes 303 will be apparent to those of skill in the art. The present invention uses a lower membrane thickness than those found in the prior art (e.g. ⅛ inch versus 3/16 inch), which produces a much higher flow rate through the filter membrane 303. Utilization of these lower thicknesses are possible, in part, due to controlled fluid turbulence which is present in the fluid ring 302 during operation of the invention disclosed herein.

The turbulent flow of the untreated fluid in the fluid ring 302 is represented by curved arrow 310. This turbulent flow is created and controlled by the rhythmic pumping action of the pneumatic pump (pump 101 in FIG. 1). As the poppet valves (i.e. 123, 124 in FIG. 1) open and close with the alternating fluid streams coming from the pump, a temporary drop in pressure in the fluid ring 302 is caused when the poppets switch position (open or closed), creating a slight suction action after each infusion of fluid. This suction action causes the fluid to pulse up and down within the fluid ring 302, resulting in the turbulence represented by arrow 310. This turbulence is magnified or increased by the speed of the fluid moving through the relatively small space in the fluid ring.

When fluid flows smoothly without turbulence, the flow is called laminar. Typically, when a fluid is flowing this way it flows in straight lines at a constant velocity. If the fluid hits a smooth surface, a circle of laminar flow results until the flow slows and becomes turbulent. At faster velocities, the inertia of the fluid overcomes fluid frictional forces and turbulent flow results, producing eddies and whorls (vortices).

The present invention utilizes turbulent fluid dynamics to manipulate molecular kinetics such that only the desired, smaller molecules will pass through the membrane matrix 303, shown by arrow 330. To pass through the membrane 303, a molecule in the fluid ring 302 has to enter at almost a 90° angle or perpendicular to the surface of the membrane 303 when the molecule contacts the membrane, as represented by arrow 320. Due to the constant fluid turbulence, only the lighter molecules are able to make this turn fast enough to pass through the membrane 303. Heavier molecules (e.g., hydrocarbons, iron) cannot turn fast enough to reach the appropriate entry vector or angle when they hit the membrane 303. As shown in FIG. 3, when heavier molecules hit the uneven surface of the membrane surface, rather than pass through, they careen off and strike similarly sized molecules, causing them to scatter as well and increasing the kinetic energy present in the fluid ring between the annulus and flux cartridge. This kinetic pattern is illustrated by arrow 340.

In the absence of fluid turbulence or when laminar fluid flow conditions exist, the heavier molecules in the fluid stream would lose a majority of their kinetic energy and be able to enter the membrane at the appropriate vector. Thus, fluid turbulence is necessary to keep the heavier molecules bouncing off the surface of membrane 303. As fluid turbulence increases, the smaller a molecule has to be in order to turn and make the appropriate entry vector to pass through the membrane 303. Therefore, the filtration of smaller molecules can be accomplished by using a flux cartridge with a less porous membrane matrix and/or increasing the fluid turbulence within the separator fluid ring 302.

The present invention also provides a novel method of achieving the filtration of increasing smaller particle and molecule sizes by membrane emulation, since the filtering effects of a smaller membrane matrix can be achieved without actually changing the porosity of the flux cartridge interstices. Referring back to FIG. 1, a slipstream poppet valve 125 controls the flow of fluid from the separator fluid ring 122 to a slipstream fluid hose or path 104 that feeds back to the start tank 101. During membrane emulation, this slipstream poppet valve 125 is opened while the first pneumatic pump 110 is pumping pressurized untreated fluid into the separator fluid ring 122, which allows the untreated fluid to move through the fluid ring 122 at a faster velocity due to the increased pressure differential. As explained above, as fluid velocity increases so does fluid turbulence. With the membrane emulation technique, the present invention is able to turn, for example, a five-micron filter into the functional equivalent of a one-micron filter by increasing the turbulent flow of fluid in the separator fluid ring 122 due to the large pressure differential created by the slipstream path 104.

Returning to FIG. 3, another chemical effect produced by the filter matrix is cavitation of the filtered fluid as it passes through the membrane 303. Cavitation (the formation of bubbles) is produced when the static pressure in a fluid falls below the temperature-related vapor pressure. A forceful condensation (implosion) of the bubbles occurs when the fluid reaches a region of higher pressure. In the present invention, as the filtered fluid passes through the membrane 303, cavitation produces gas bubbles. When these gas bubbles reach the inner space of the flux cartridge (arrow 330), they rapidly implode. During this implosion process, like molecules come together (flocculation) and form precipitates, which allows targeted separation of dissolved material from the filtered fluid. Yet another chemical effect produced by the filter matrix is the break up of emulsions in the filtered fluid. As the filter fluid is pushed through the membrane 303 under pressure, emulsions in the fluid are broken. By using different size filter matrices and fluid velocities, the present invention is capable of separating particles from 300 microns down to 58 Angstroms.

Figure 4:
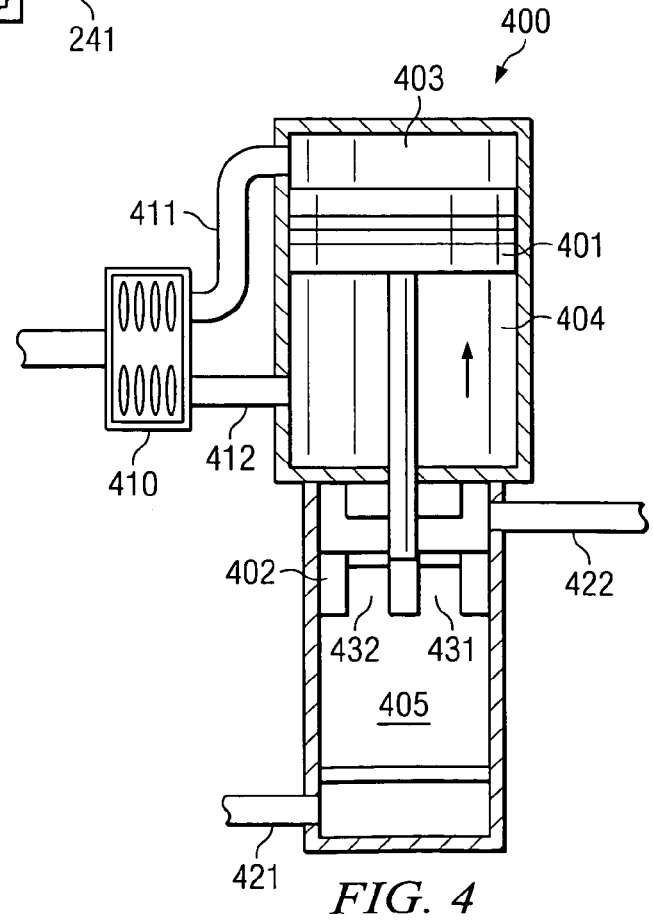
FIG. 4 is a schematic view illustrating the pneumatic ejector pump in more detail.

FIG. 4 is a schematic view illustrating the pneumatic ejector pump 400 in more detail. The cycling action of the pneumatic ejector pump 400 is controlled by a solenoid 410 that alternates the pump air between two hoses 411, 412. However, unlike the first pneumatic pump, the cycling of the pneumatic ejector pump 400 is not monitored by magnetic sensors. As shown in FIG. 4, the upper disc 401 is pushed up by air coming into the bottom half of the air chamber 404 through the lower hose 412. At the same time, exhaust air is pushed out of the upper air chamber 403 through upper hose 411. As the lower disc 402 is pulled up, check valves 431, 432 built into the seal around the disc are pulled open by friction. Once the ejector 400 is in this upper position, the pump air through the solenoid 410 is cut off, and the ejector is held in this position for the duration of the filtration cycle. As filter fluid product leaves the separator filter pod, it enters the pneumatic ejector fluid chamber 405 through line 421. Because the check valves 431, 432 are held open in this upstroke position, the fluid product is able to pass by the lower plunger disc 402 and flow out to a collection tank through line 422.

When the reverse flush cycle is executed, the solenoid 410 directs pump air through the upper hose 411 into the upper half of the air chamber 403, which drives the upper disc 401 downward, forcing exhaust air out of the lower half of the air chamber 404 through the lower hose 412. As the lower disc is pushed down, friction from the seal closes the check valves 431, 432, preventing fluid from passing through. As a result of the closed check valves 431, 432 fluid in the chamber 405 is forced back out through line 421 and back into the flux cartridges positioned within the separator as previously shown herein.

During the reverse flush, the time required for the pneumatic ejector 400 to begin exerting pressure is less than approximately 0.10 seconds and the time required to complete the downward stroke is approximately 0.35 seconds. The top disc 401 is approximately six inches in diameter and operated to a maximum pressure of 110 psi at normal water. The lower disc 402 is approximately 4 inches in diameter, producing a maximum operating pressure of 250 psi at normal water. The combination of higher fluid pressure and short stroke time make the reverse flush operation a sudden, shock load to the separator, which aids in the complete and expeditious removal of waste residue from the outer surface of each flux cartridge positioned within the separator annuli.

Figure 5A:
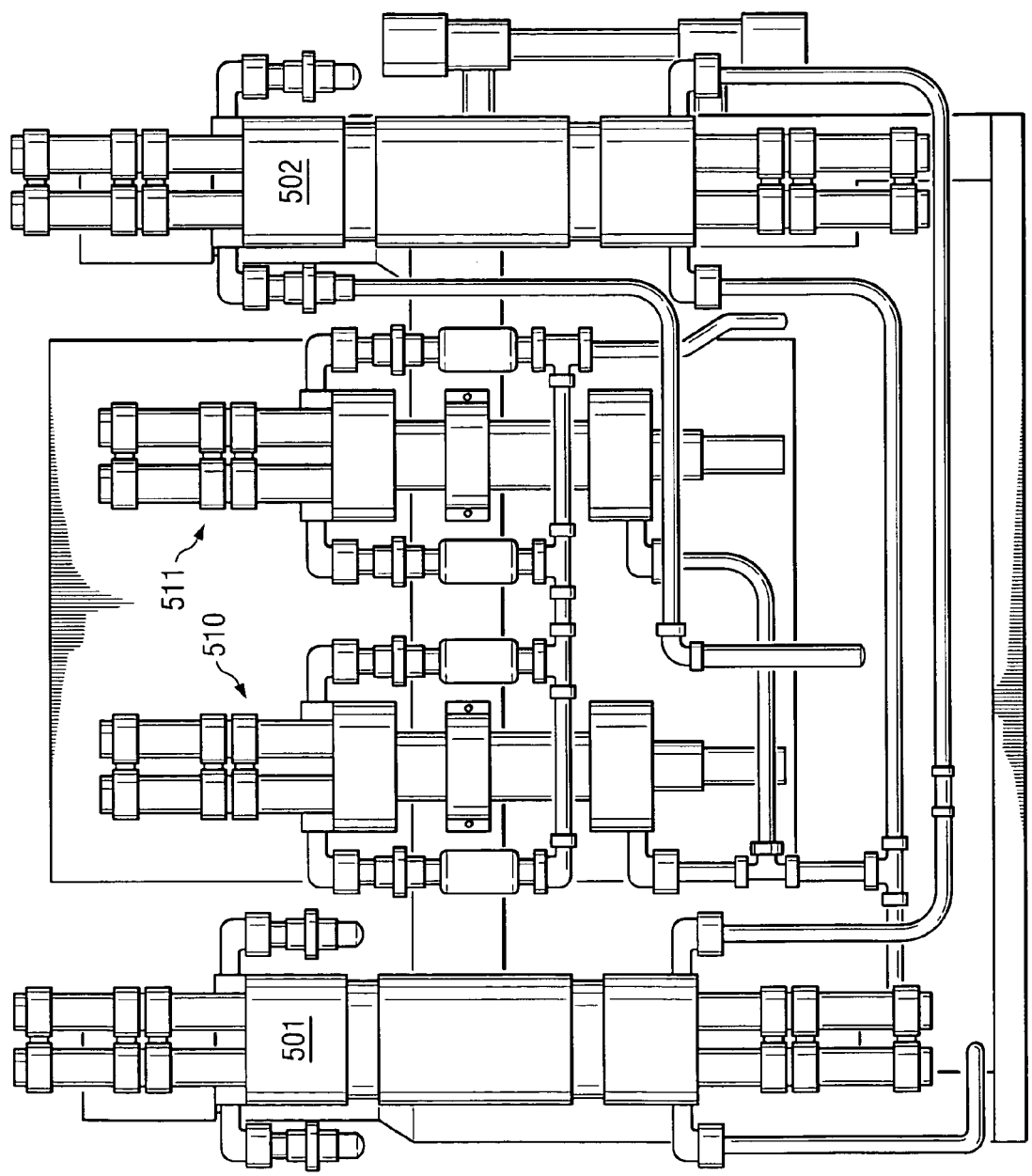
FIG. 5A is a rear view pictorial diagram of a preferred embodiment of the molecular separator apparatus.
Figure 5B:
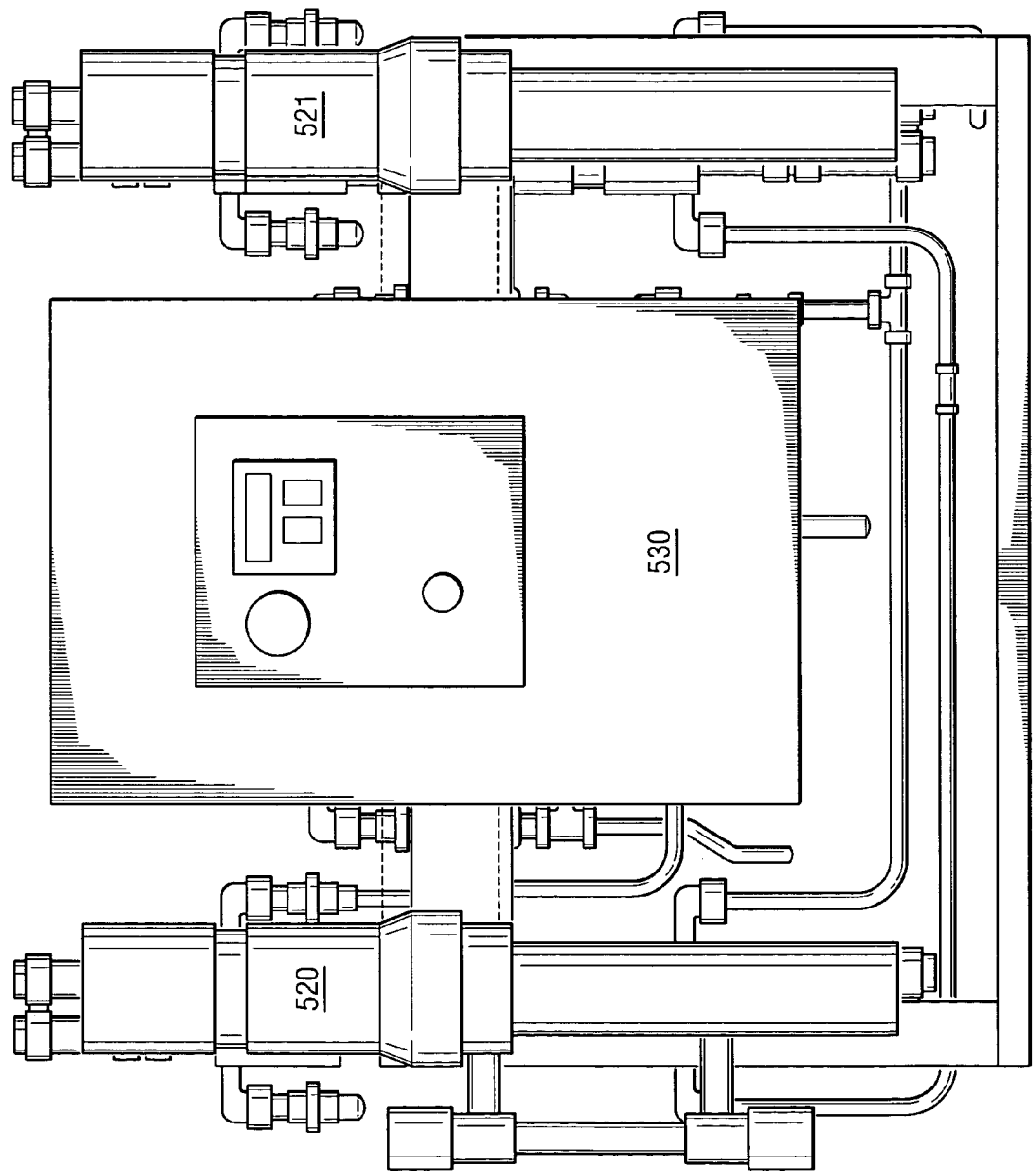
FIG. 5B is a front view pictorial diagram of the molecular separator apparatus.

FIG. 5A is a rear view pictorial diagram of a preferred embodiment of the molecular separator apparatus. In this view one can see the separator filter pods 501, 502 that contain the separator filtration annuli and flux cartridges disposed therein, as well as the concentrators 510, 511. FIG. 5B is a front view pictorial diagram of the apparatus, which depicts the pneumatic pumps 520, 521, various fluid connection lines and a control panel 530. First pneumatic pump 520 is the positive pressure pump that pumps the untreated fluid into the filter annuli. Pneumatic ejector pump 521 provides the reverse flush fluid and pressure for backwashing the separator pod(s) and transporting the waste residue into the concentrators 510, 511. The first pneumatic pump 520 and pneumatic ejector pump 521 are positioned vertically to facilitate even surface wear during operations. The control panel 530 includes data entry and control inputs and houses the central controller electronics and circuitry required to operate the invention disclosed herein and allow operator control of the performance of the desired processes disclosed herein. The control panel 530 may also house electronic equipment enabling the remote control of the unit via wired or wireless communication means as is known in the art. The control panel is designed to be capable of being internally pressurized, allowing the invention to be used in hostile environments containing volatile, explosive or corrosive conditions and protecting the enclosed circuitry therein from damage. The storage tanks for the various liquids and products, as well as the connection hoses for the controlling solenoids are not shown in FIGS. 5A and 5B for ease of illustration.

Figure 6:
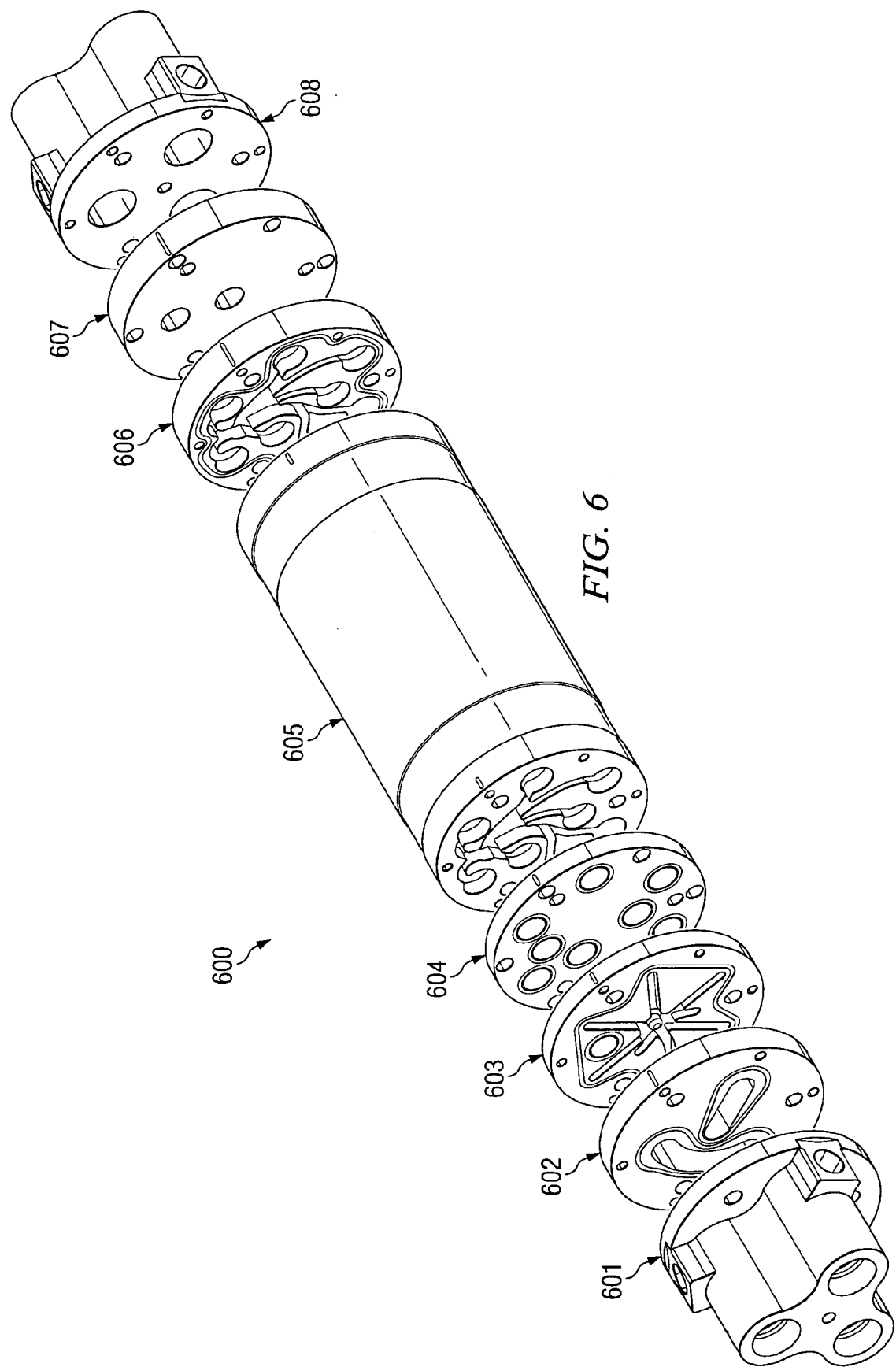
FIG. 6 is an exploded perspective view diagram of a separator filter pod.

FIG. 6 is an exploded, perspective view of one of a separator filter pod. The separator filter pod 600 comprises a main body 605 that contains eight filter annuli disposed therein. At either end of the separator filter pod 600 are valve heads 601, 608 which contain poppet valves which control the inflow and outflow of fluid to and from the separator filter pod 600. Between the top valve head 601 and the main body 605 are three transition plates 602-604, which include machined fluid flow pathways for facilitating the distribution of inflow and outflow fluid to and from the separator main body 605. Two transition plates 606, 607 are placed between the main body 605 and the bottom valve head 608 which include machined fluid flow pathways for facilitating the distribution of fluid flowing into and out of the separator main body 605. The separator components, including the valve heads, transition plates and main body may be constructed from Hastalloy, 316L stainless steel, or other metal alloys sufficient to provide corrosion protection to the components of the invention and containment of the fluids passing through same. The preferred embodiment of the present invention uses components fabricated from stainless steel. The separator and concentrator components disclosed herein may be integrated with VITON or CALREZ seals for leak prevention and containment under pressure. VITON seals are preferably used with stainless steel embodiments, while CALREZ seals would be preferable for use with embodiments constructed out of Hastalloy.

Figure 7A:
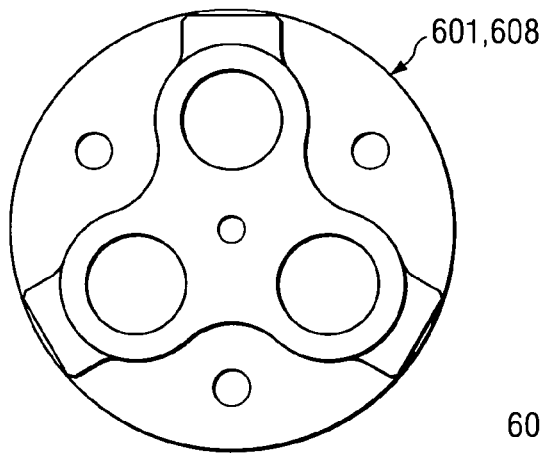
FIG. 7A is an end on view of the top of the valve heads.
Figure 7B:
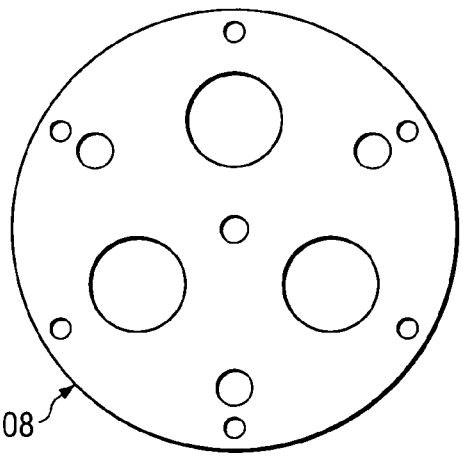
FIG. 7B is an end on view of the bottom of the valve heads.

FIG. 7A is an end on view of the top of the valve heads 601 and 608. FIG. 7B is an end on view of the bottom of the valve heads 601, 608.

Figure 8A:
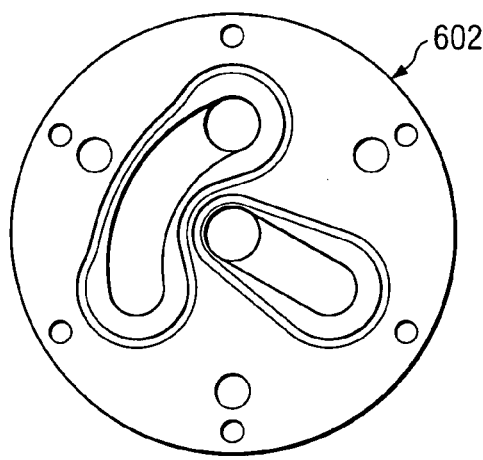
FIG. 8A is an end on view of the top of the first transition plate.
Figure 8B:
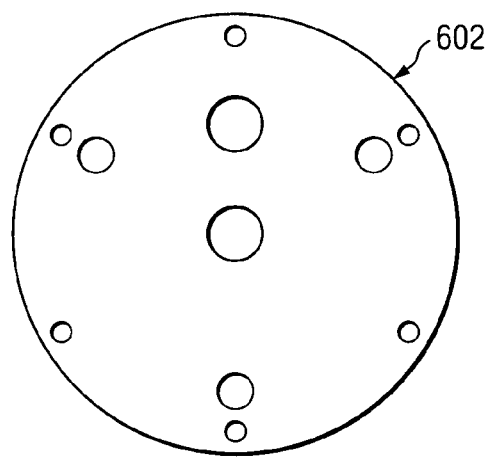
FIG. 8B is an end on view of the bottom of the first transition plate.

FIG. 8A is an end on view of the top of the first transition plate 602. FIG. 8B is an end on view of the bottom of the transition plate 602.

Figure 9A:
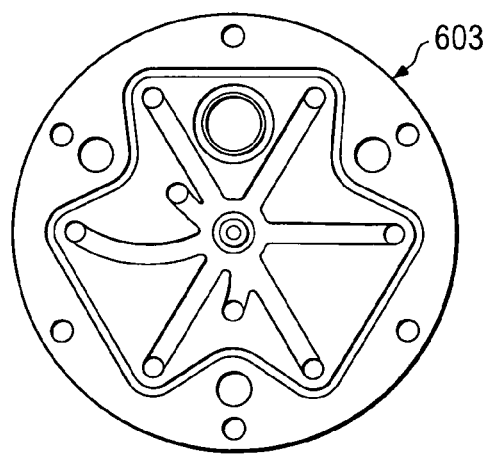
FIG. 9A is an end on view of the top of the second transition plate.
Figure 9B:
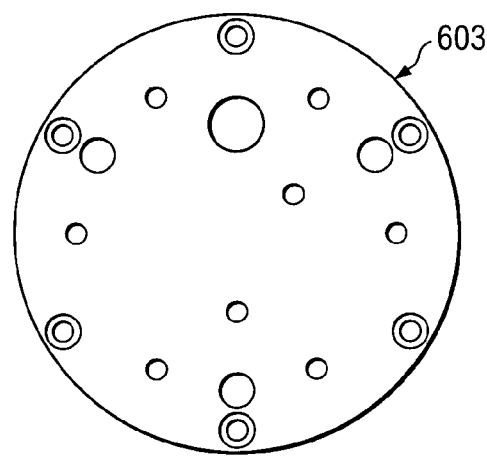
FIG. 9B is an end on view of the bottom of the second transition plate.

FIG. 9A is an end on view of the top of the second transition plate 603. FIG. 9B is an end on view of the bottom of the transition plate 603.

Figure 10A:
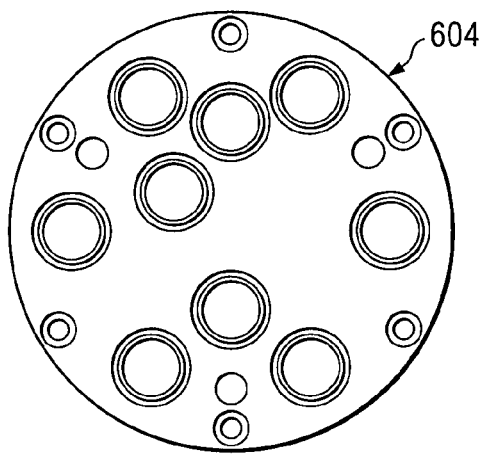
FIG. 10A is an end on view of the top of the third transition plate.
Figure 10B:
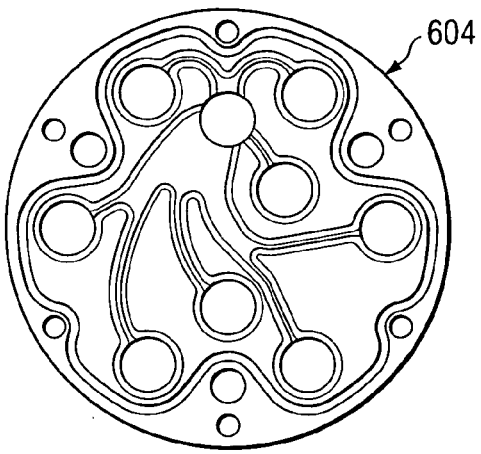
FIG. 10B is an end on view of the bottom of the third transition plate.

FIG. 10A is an end on view of the top of the third transition plate 604. FIG. 10B is an end on view of the bottom of the transition plate 604.

Figure 11A:
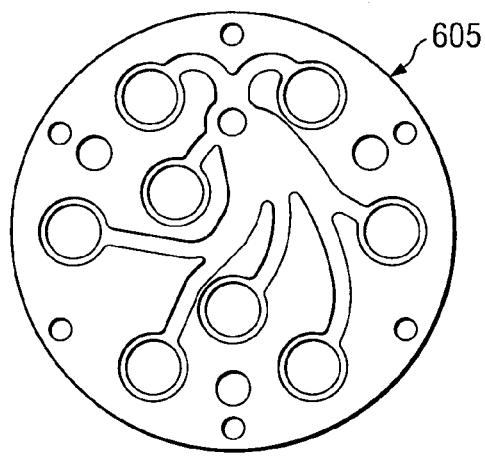
FIG. 11A is an end on view of the top of the main body of the separator filter pod.
Figure 11B:
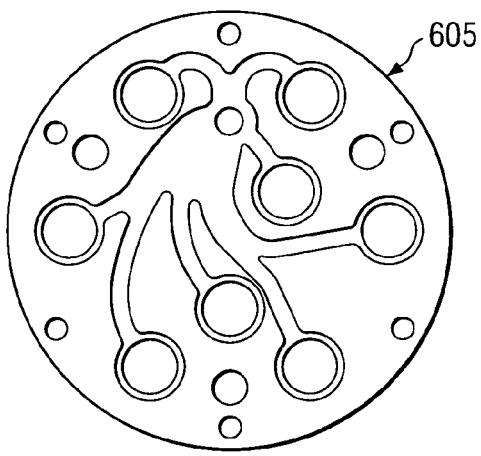
FIG. 11B is an end on view of the bottom of the main body of the separator filter pod.

FIG. 11A is an end on view of the top of the main body 605. FIG. 11B is an end on view of the bottom of the main body 605.

Figure 12A:
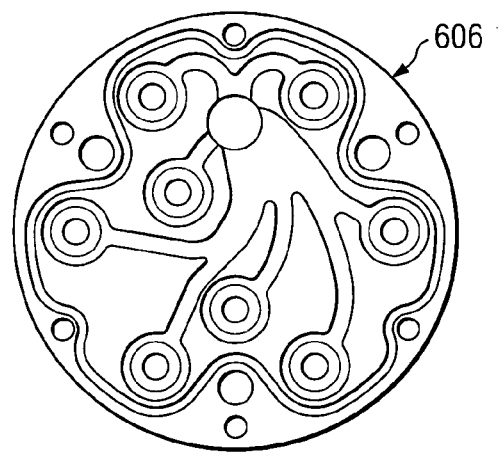
FIG. 12A is an end on view of the top of the fourth transition plate.
Figure 12B:
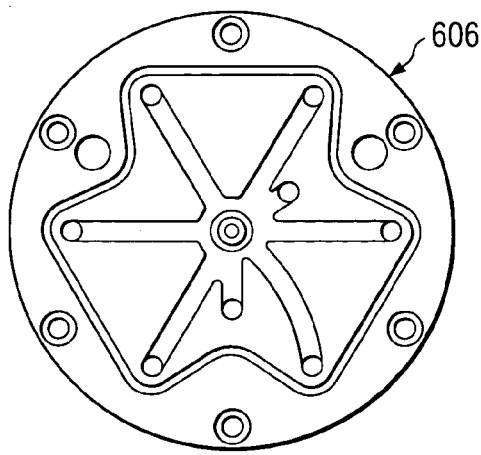
FIG. 12B is an end on view of the bottom of the fourth transition plate.

FIG. 12A is an end on view of the top of the fourth transition plate 606. FIG. 12B is an end on view of the bottom of the transition plate 606.

Figure 13A:
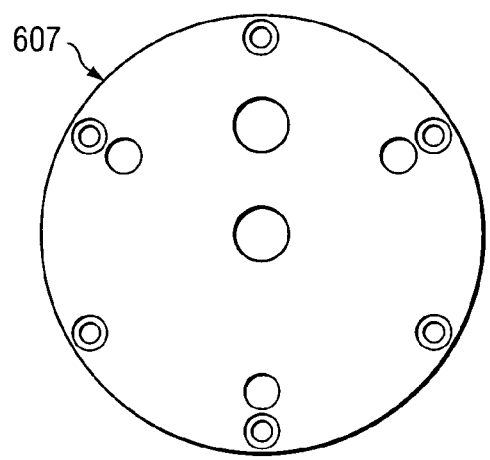
FIG. 13A is an end on view of the top of the fifth transition plate.
Figure 13B:
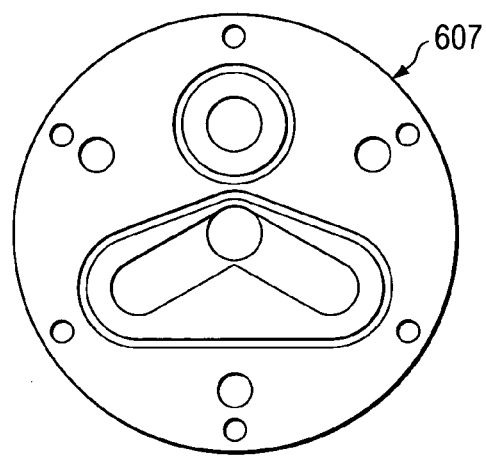
FIG. 13B is an end on view of the bottom of the fifth transition plate.

FIG. 13A is an end on view of the top of the fifth transition plate 607. FIG. 13B is an end on view of the bottom of the transition plate 607.

The depicted geometric patterns consisting of machined cuts, grooves and holes on and through the transition plates and main body 602-607 are fluid flow channels. These particular geometric patterns are used to ensure even fluid flow to and from the eight annuli in the separator main body 605. The transition plates may be secured to the main body of the separator and/or concentrator with internal threaded fastening means and external threaded bolt means, which provide easy access and removal of the transition plates for facilitating flux cartridge removal and replacement.

Figure 14:
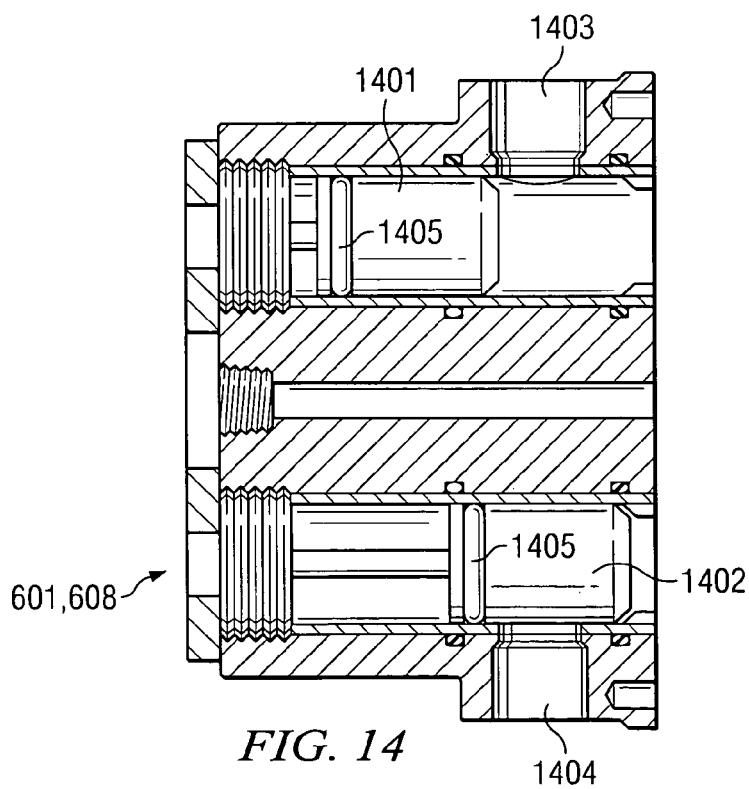
FIG. 14 is a cross section schematic diagram of the poppet valves and poppet valve heads.

FIG. 14 is a cross section schematic diagram of the poppet valve heads 601, 608. These poppet valves 1401, 1402 are similar to those illustrated in FIG. 2 but are smaller in dimensional size. The third poppet valve cannot be seen in FIG. 14, as it is disposed on the opposite side. The poppet valves in FIG. 14 depict the alternating positions of the valves, which allow the flow of fluid flow into and out of the valve heads and to and from the separator and/or concentrator via the transition plates shown in FIGS. 7A-13B.

Relating FIG. 14 to the example in FIG. 1, when fluid is being pumped through the upper line 114, valve 124 is open and valve 123 is closed. This can be seen in greater detail in FIG. 14, with poppet valve 1401 corresponding to valve 124, and poppet valve 1402 corresponding to valve 123. When poppet piston 1401 is pulled back into the open position, fluid can enter the separator filter pod through opening 1403. With poppet piston is extended 1402, fluid is prevented from entering through opening 1404. All of the poppet pistons or valves utilized in the invention disclosed herein may also include a circumferential indentation in the head of the piston to retain an O-ring seal 1405 (preferably VITON), as shown in FIG. 14, to prevent fluid leakage or blowby during operations.

Figure 15:
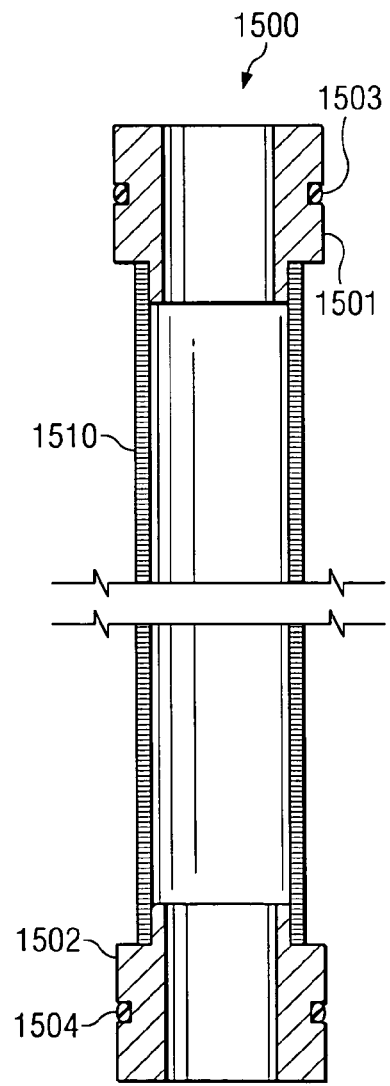
FIG. 15 is a side pictorial view of a flux cartridge.

FIG. 15 is a side pictorial view of a flux cartridge. In the preferred embodiment, the flux cartridge 1500 is essentially a metallic narrow tube annealed to form a porous media of desired size (e.g. 10 micron, 5 micron, etc.), although other filtration media could be adapted for the desired purpose as is known in the art. The body of the flux cartridge tube 1510 constitutes the filter membrane described herein. Welded to either end of the flux cartridge body 1510 are seating heads 1501, 1502, with a circumferential indentation for retaining an O-ring seal (preferably VITON seals) 1503, 1504, respectively.

Flux cartridges are inserted into cylindrical holes that run the length of the separator filter pod main body. The openings of these cylindrical holes are shown in FIGS. 6, 11A and 11B. Each one of the cylindrical holes constitutes a fluid inlet or outlet to an annulus within the separator. The inner portion of the seating heads on the flux cartridges fit into the annulus openings within the separator filter pod main body. The outer portion of the seating heads fit into matching holes in the proximate transition plates 604 and 606. The matching holes in the transition plates 604, 606 are shown in FIGS. 10B and 12A, respectively.

Figure 16:
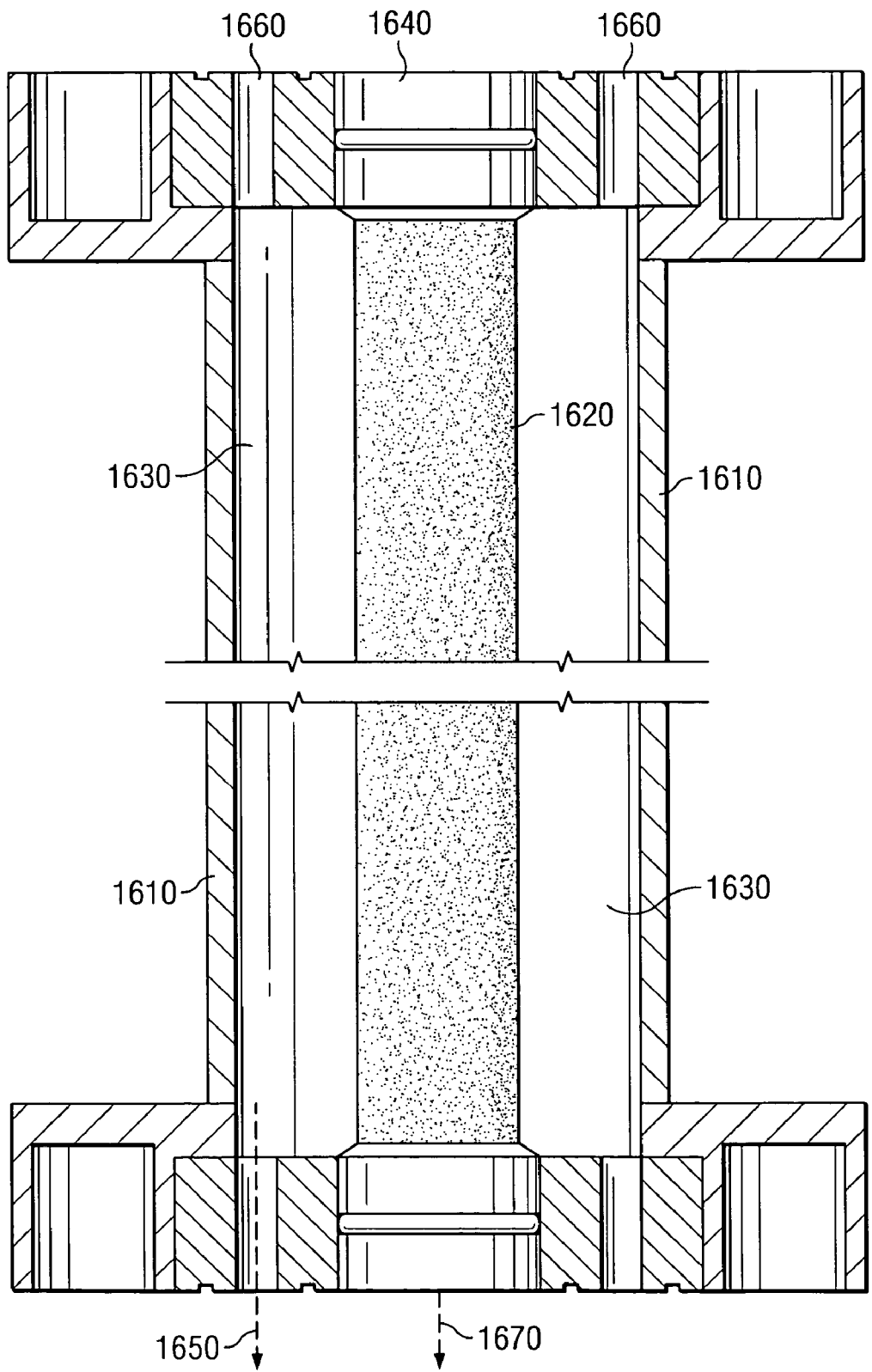
FIG. 16 is a cross section schematic diagram illustrating a concentrator in more detail.

FIG. 16 is a cross section schematic diagram illustrating a concentrator in more detail. In contrast to the separator filter pod (which contains eight annuli), the concentrator 1600 contains only one annulus 1610 with a single flux cartridge 1620. The fluid ring 1630 of the concentrator 1600 is considerably larger than that of the separator filter pod annuli, and the flux cartridge 1620 is also larger than the separator filter pod flux cartridges. This larger size (volume capacity) is necessary since the single annulus 1610 in the concentrator 1600 must process waste fluid from all eight annuli in the separator filter pod.

As described above, a concentrator filters waste fluid in the opposite flow direction in comparison to the separator filter pod. Waste fluid from the separator filter pod flows into the center into the center of the concentrator flux cartridge 1620 as indicated by arrow 1640. The desired fluid then filters through the membrane of the flux cartridge 1620 into the fluid ring 1630, similar to the process described above in relation to FIG. 3. From there, the fluid flows out through the fluid return line back to the start tank, as indicated by arrow 1650. After waste inflow from the separator filter pod is stopped, drying air enters the center of the flux cartridge 1620 through the same path indicated by arrow 1640. This drying air pushes additional fluid through the filter membrane of the flux cartridge 1620 and further concentrates the waste.

After the drying air flow is stopped by closing the appropriate valve(s), a burst of purge air enters the fluid ring 1630 as indicated by arrow 1660. This burst of purge air is similar to the reverse ejection flush used with separator filter pods. Its purpose is to remove waste reside adhering to the flux cartridge 1620, but in this case, the waste reside must be removed from the inside surface of the flux cartridge 1620 rather than the outer surface which is exposed to the fluid ring 1630. The purge may also be performed with any other preferred fluid in place of air. The waste removed by the purge is flushed out of the flux cartridge 1620 as indicated by arrow 1670 into a reject collection tank, as previously discussed.

Figure 17:
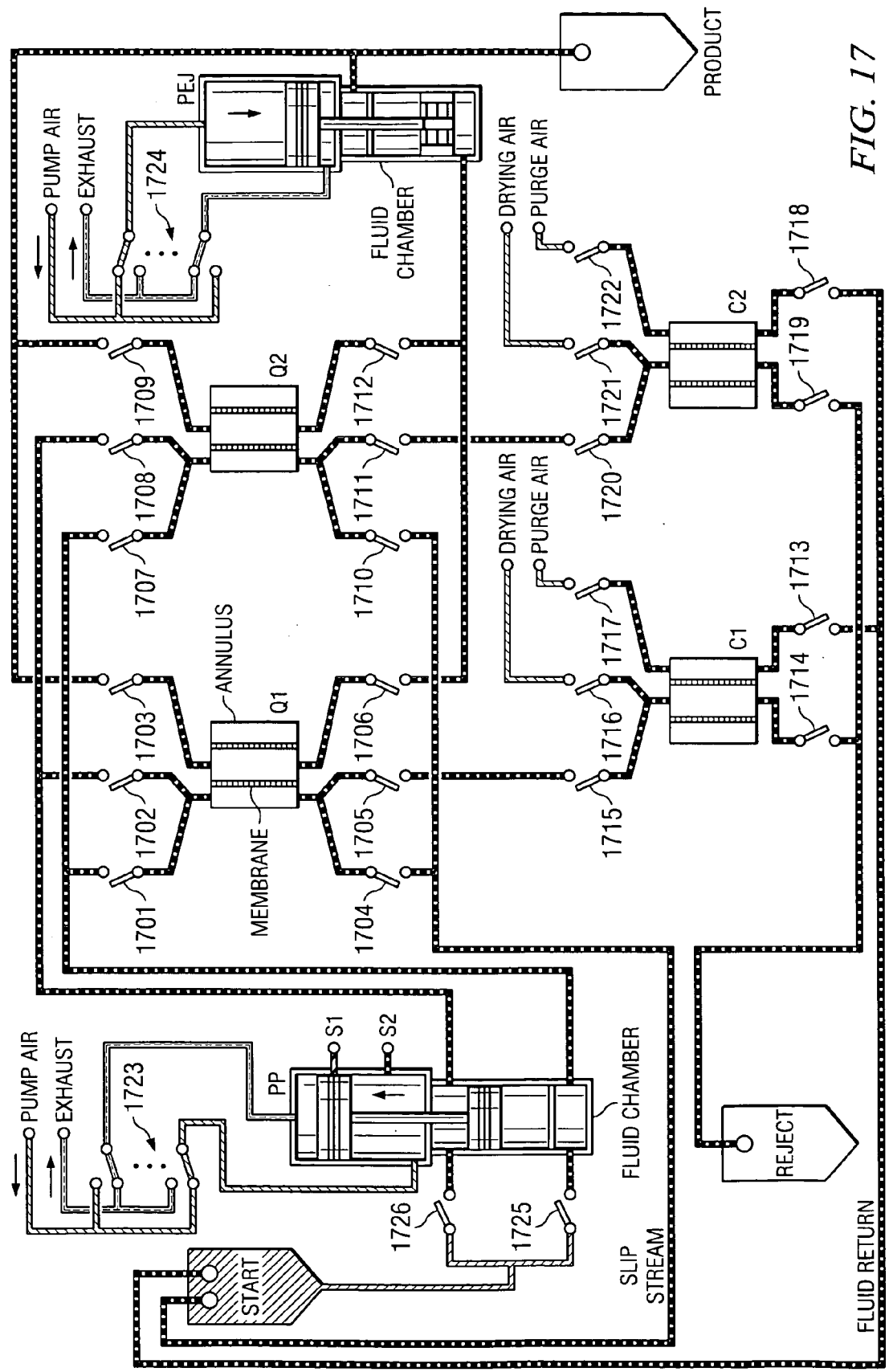
FIGS. 17-79 are schematic diagrams that depict the process flow of a complete filtration and ejection cycle for two separator filter pods operating in parallel and two concentrators operating in parallel; and, FIGS. 80 and 81 are tabular depictions of the valve opening and closing sequences that correspond to the flow diagram sequence depicted in FIGS. 17-79.
Figure 79:
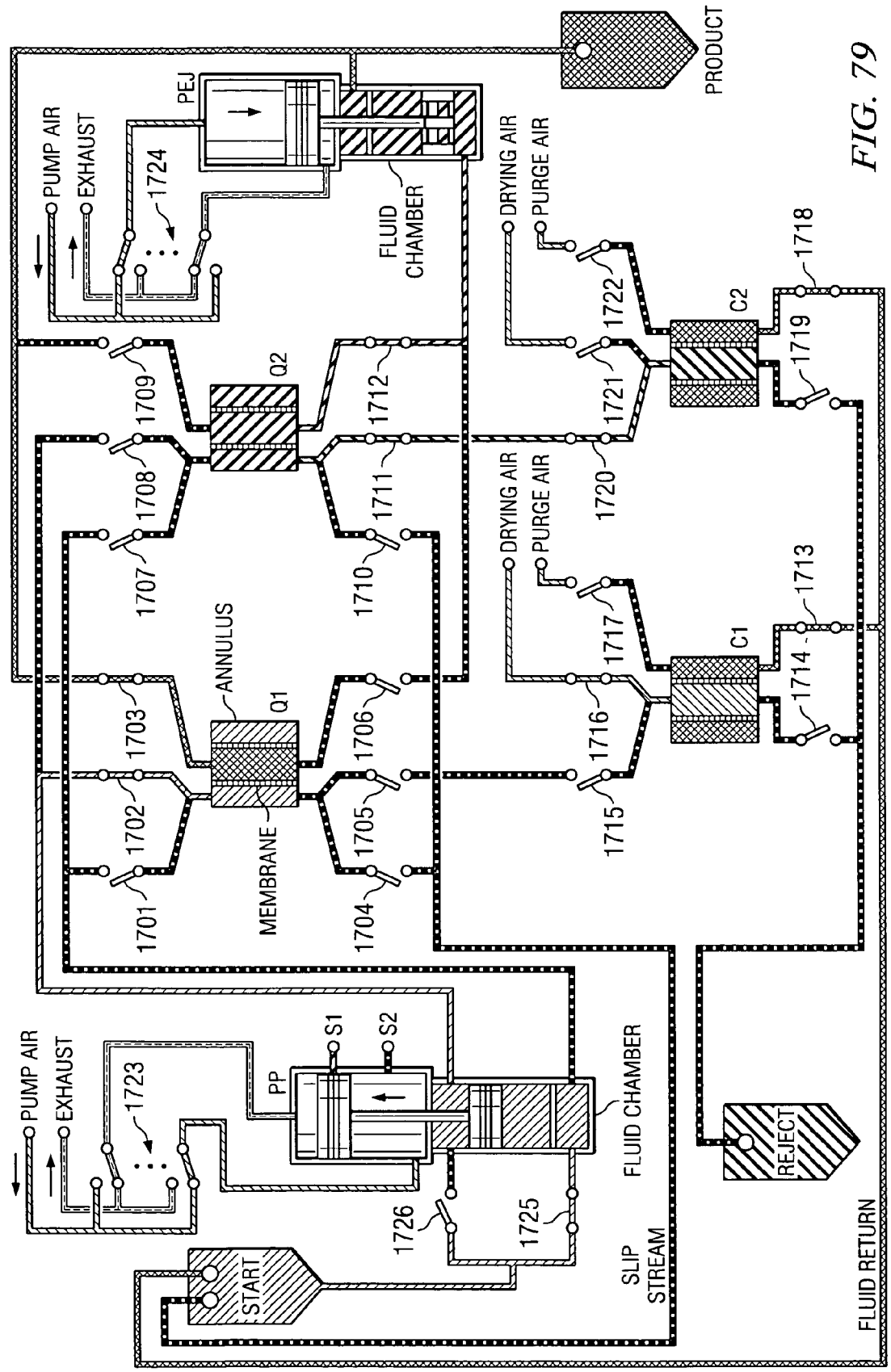
Figure 81:
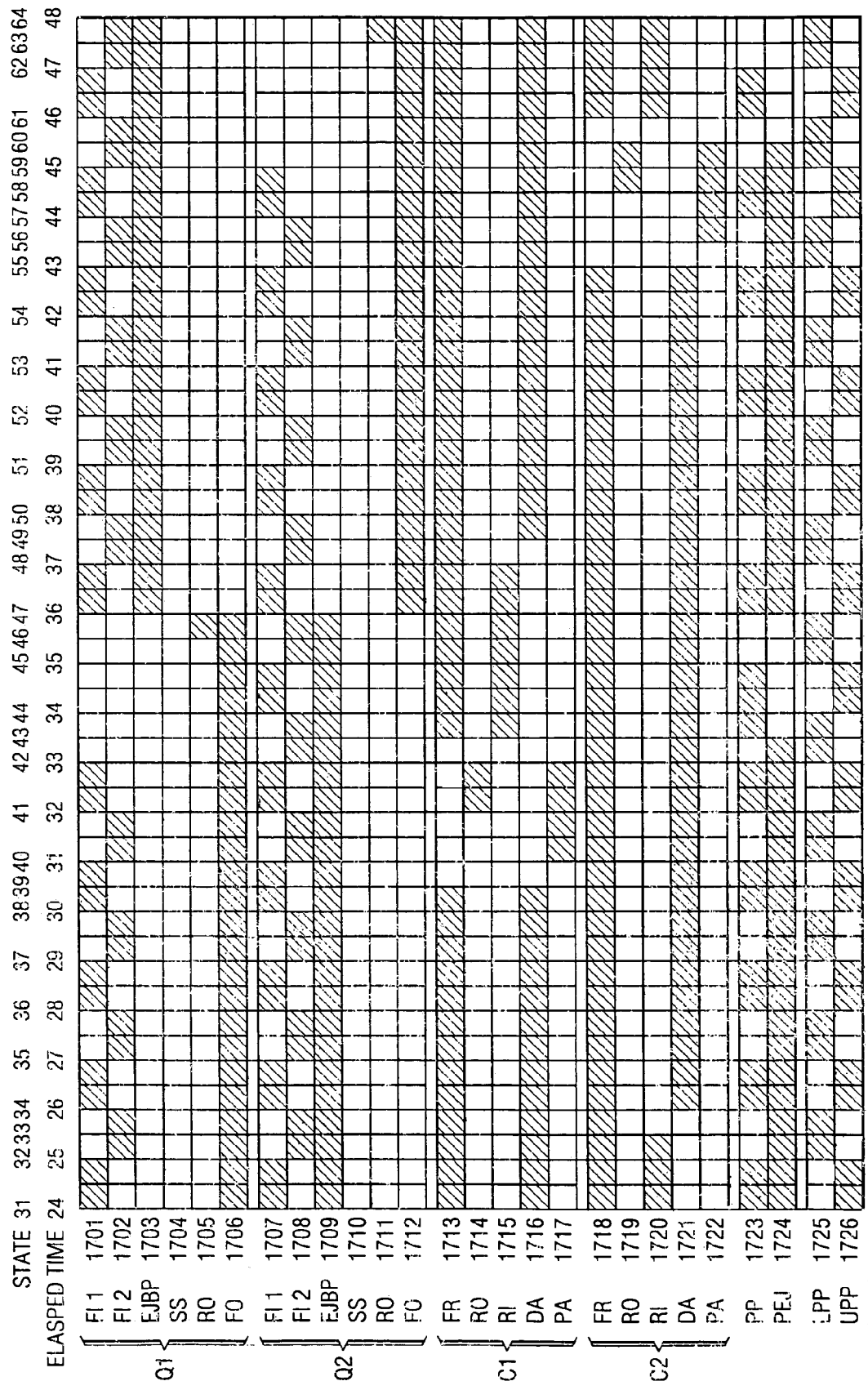

FIGS. 17-79 are schematic diagrams that depict the process flow at the indicated approximated time interval of a complete filtration and ejection cycle for two separator filter pods operating in parallel and two concentrators operating in parallel. FIGS. 17-81 additionally depict the various open or closed positions of the poppet valves, and thus the flow of fluid through the system, during the various states of the operational cycles of the invention disclosed herein. For the purposes of FIGS. 17-81, the poppet valves disclosed herein may also be referenced by the indicated numerals (1701-1726) as shown in relation to the each referenced valve. For the purposes of the separator filter pods Q1 and Q2, respectively, valves 1701, 1702 and 1707, 1708 may be referred to as the fluid inlet valves, which control the flow of untreated fluid from the start tank to the separator filter pods. Valves 1703 and 1709 are referred to as the ejector bypass valves. Valves 1704 and 1710 are the slipstream valves. Valves 1705 and 1711 are the reject out or contaminant waste valves. Valves 1706 and 1712 are the filtered fluid out valves.

In reference to the concentrators C1 and C2, respectively, valves 1713 and 1718 are referred to as the fluid return valves, which control the flow of return fluid from the concentrators to the initial start tank. Valves 1714 and 1719 are the reject out valves, which control the flow of waste residue from the concentrator to the reject collection tank. Valves 1715 and 1720 are the reject in valves which control the flow of waste fluid from the separator filter pods into the concentrators. Valves 1716 and 1721 control the flow of drying air into the concentrators so as to dry and further dehydrate the waste fluid being concentrated therein. Valves 1717 and 1722 control the flow of air or fluid being introduced into the concentrator for removal of the concentrated contaminants or waste to reject collection tank.

Likewise, and for the purposes of FIGS. 17-81, the pneumatic pump is referenced as PP and the ejector pump is referenced as PEJ. The valves that control the flow of primary pump air and exhaust to and from the pump and ejector are referenced as valves 1723 and 1724, respectively. Poppet valves 1725 and 1726 control the flow of untreated fluid from the start tank to the pneumatic pump PP. Also depicted are the magnetic sensors S1, S2, which monitor the position of the pump piston, as described in detail above.

Figure 70:
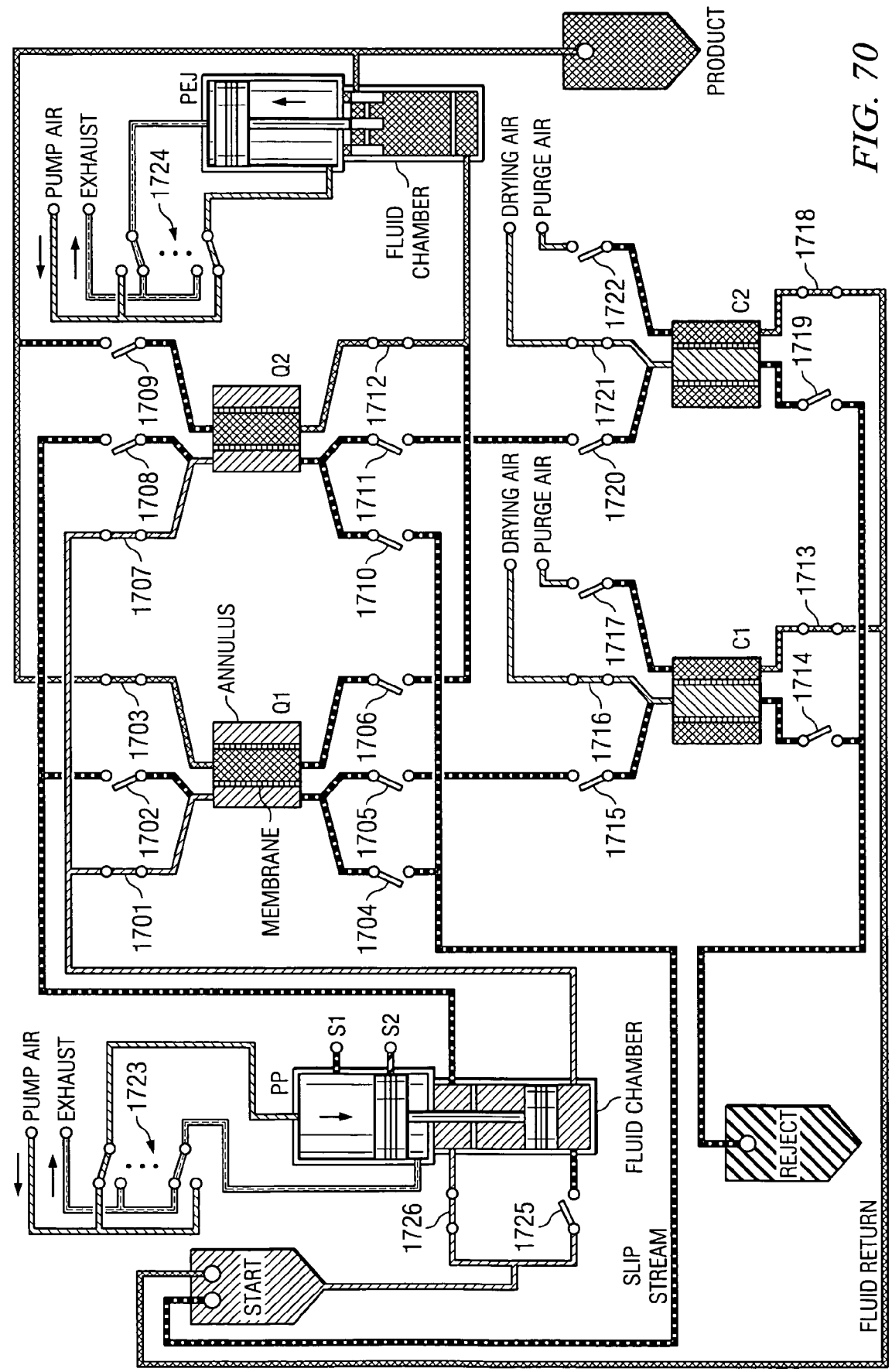

The process flow depicted in FIGS. 17-70 illustrates the use of the ejector bypass, which was briefly described above. The ejector bypass configuration depicted in FIGS. 17-19 allows a single ejector to service two separator filter pods. This configuration reduces operating costs compared to using a single ejector for each separator filter pod. For simplicity, only two separator filter pods Q1, Q2 are depicted in FIGS. 17-79, and as in FIG. 1, only one annulus is used to represent each separator filter pod, which would normally contain eight annuli in each pod. This is the same configuration illustrated in FIGS. 5A and 5B. However, it must be pointed out that a single ejector may service more than two separator filter pods. In the present example, separator filter pods Q1, Q2 are operating in parallel, meaning untreated fluid is being pumped into them directly from the same source.

The approximate time sequence of the valve operation, and the flow sequence during the operational cycle of the present invention is referenced in seconds for each State shown is FIGS. 17-81. For the purposes of disclosure, the states and times shown on FIGS. 17-81 are not to be construed as limitations on the function of the invention disclosed herein, but serve as merely an indicator of the approximate time progression throughout the inventive method disclosed herein.

FIG. 17 depicts the pre-operational state of the apparatus before operations commence in the referenced operational state.

Figure 18:
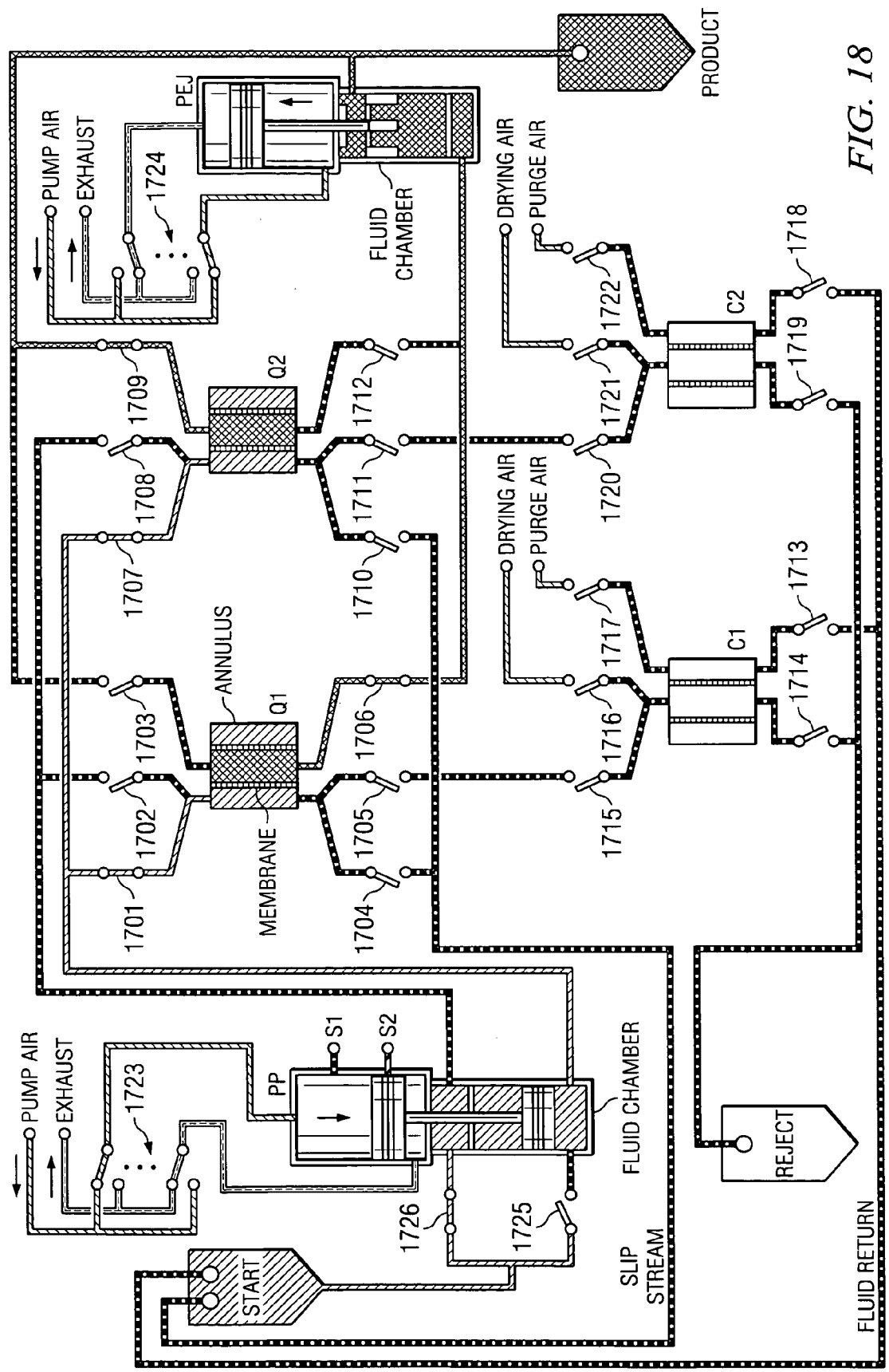

FIG. 18 depicts the commencement of operations wherein untreated fluid is pumped into the separator filter pods Q1, Q2. Untreated fluid is drawn from the start tank into the fluid chamber of the pneumatic pump PP through poppet valve 1726. Fluid is also pumped from the pneumatic pump PP into the fluid rings of separator filter pods Q1 and Q2 through poppet valves 1701 and 1702, respectively. Filtered fluid flows from the first separator filter pod Q1 through poppet valve 1706 and the ejector PEJ and into a product collection tank. Filtered fluid from the second separator filter pod Q2 passes through the ejector bypass valve 1709 directly into the product collection tank.

Figure 19:
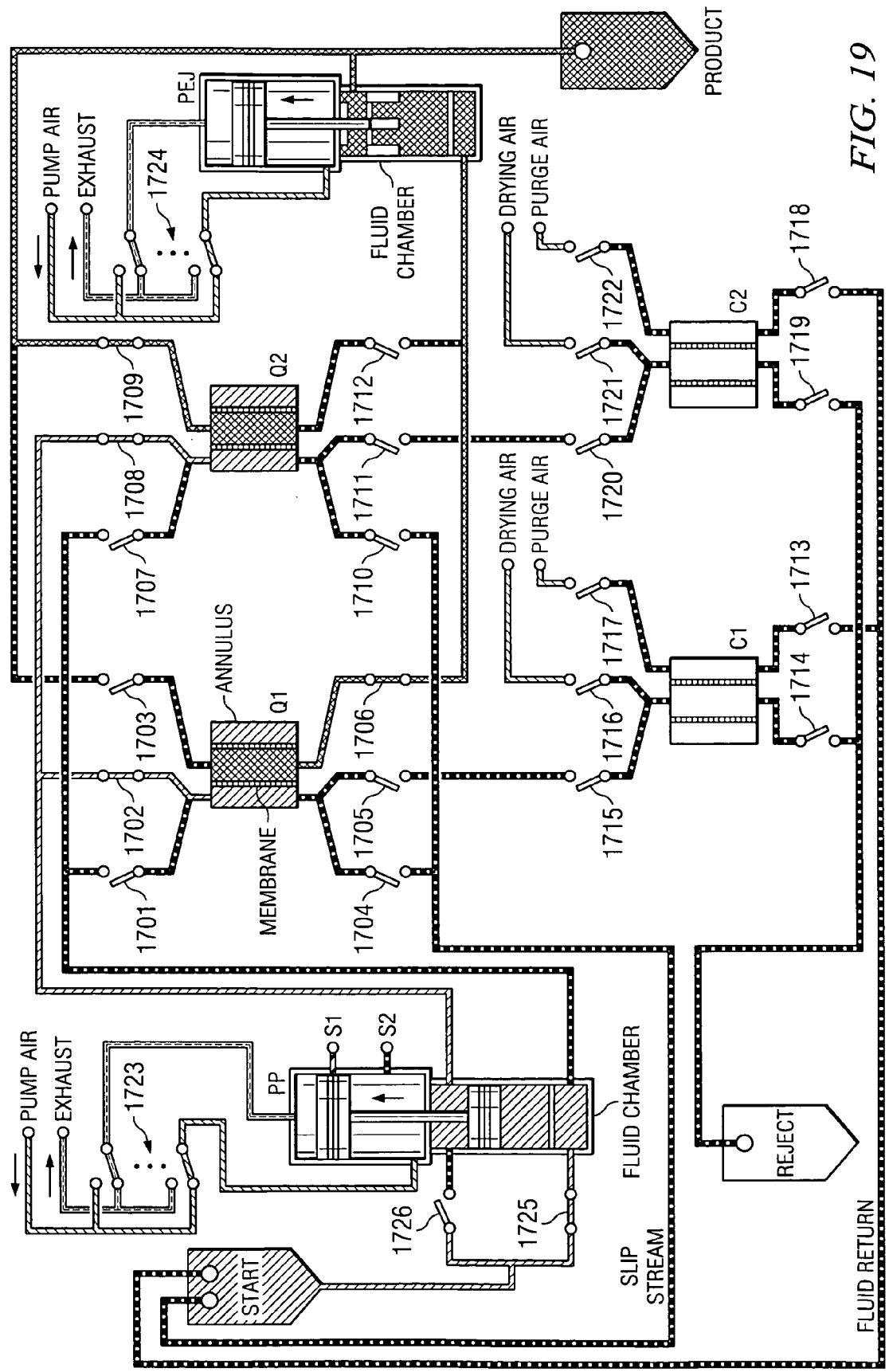
Figure 20:
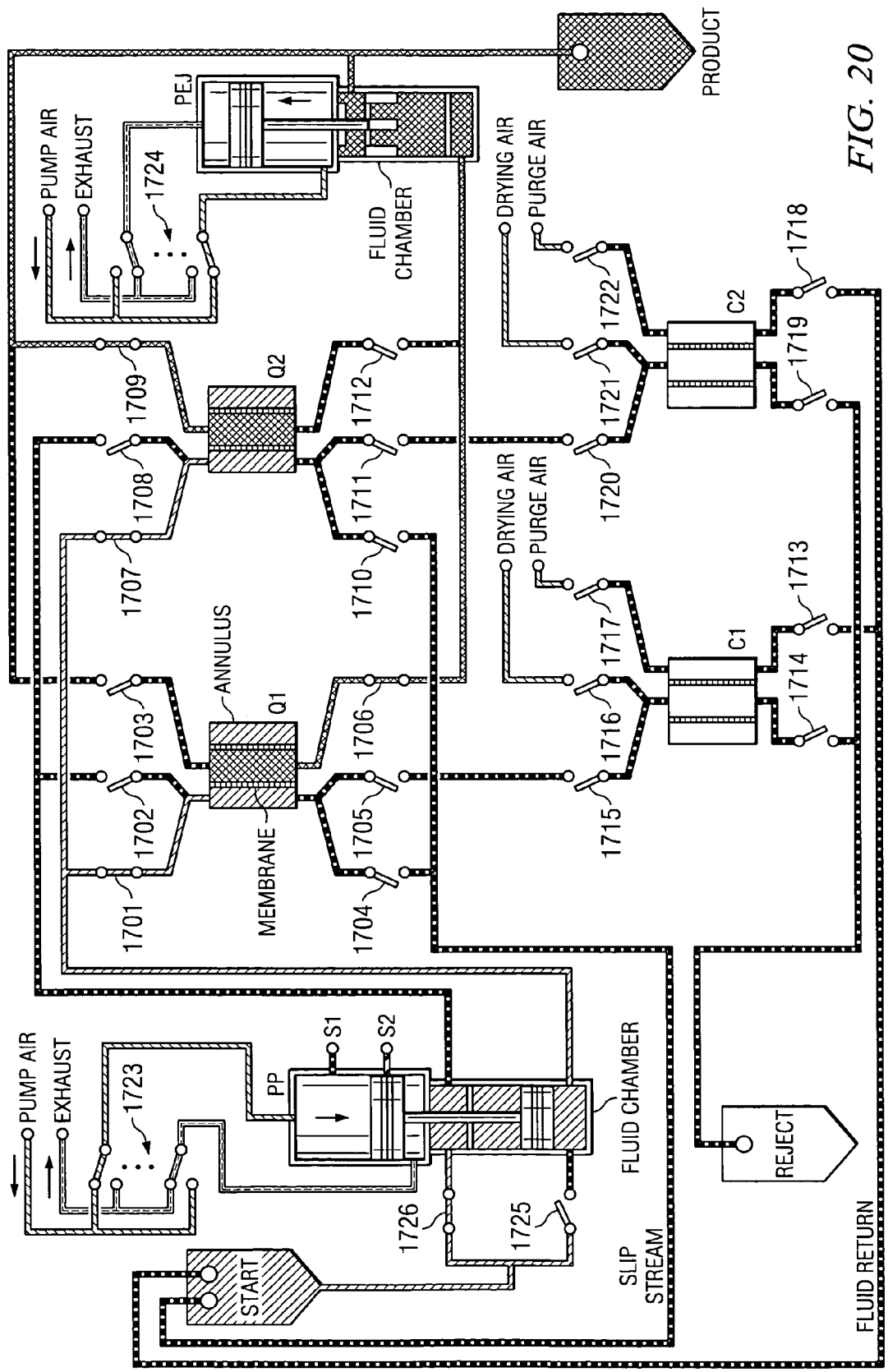
Figure 21:
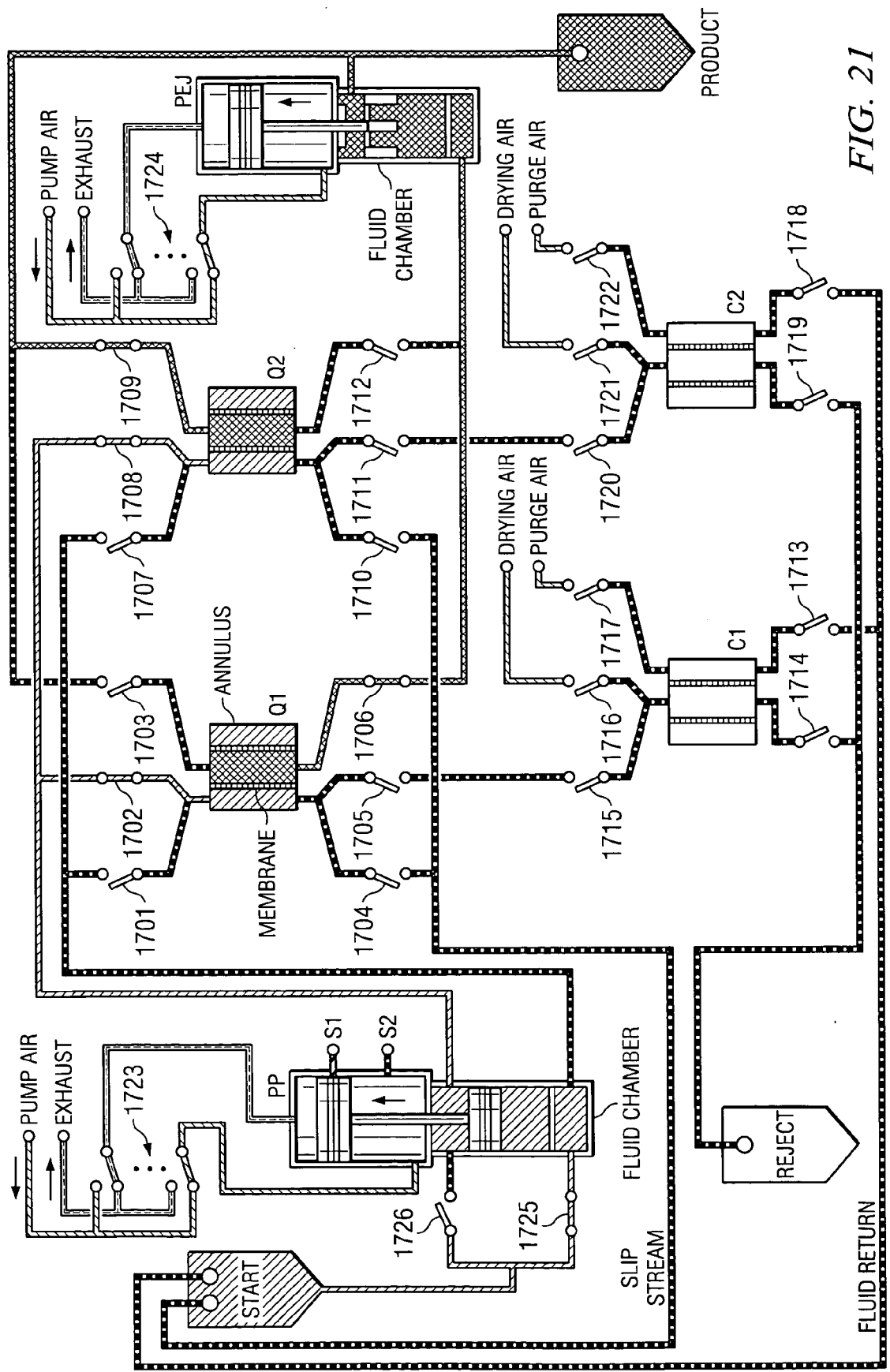
Figure 22:
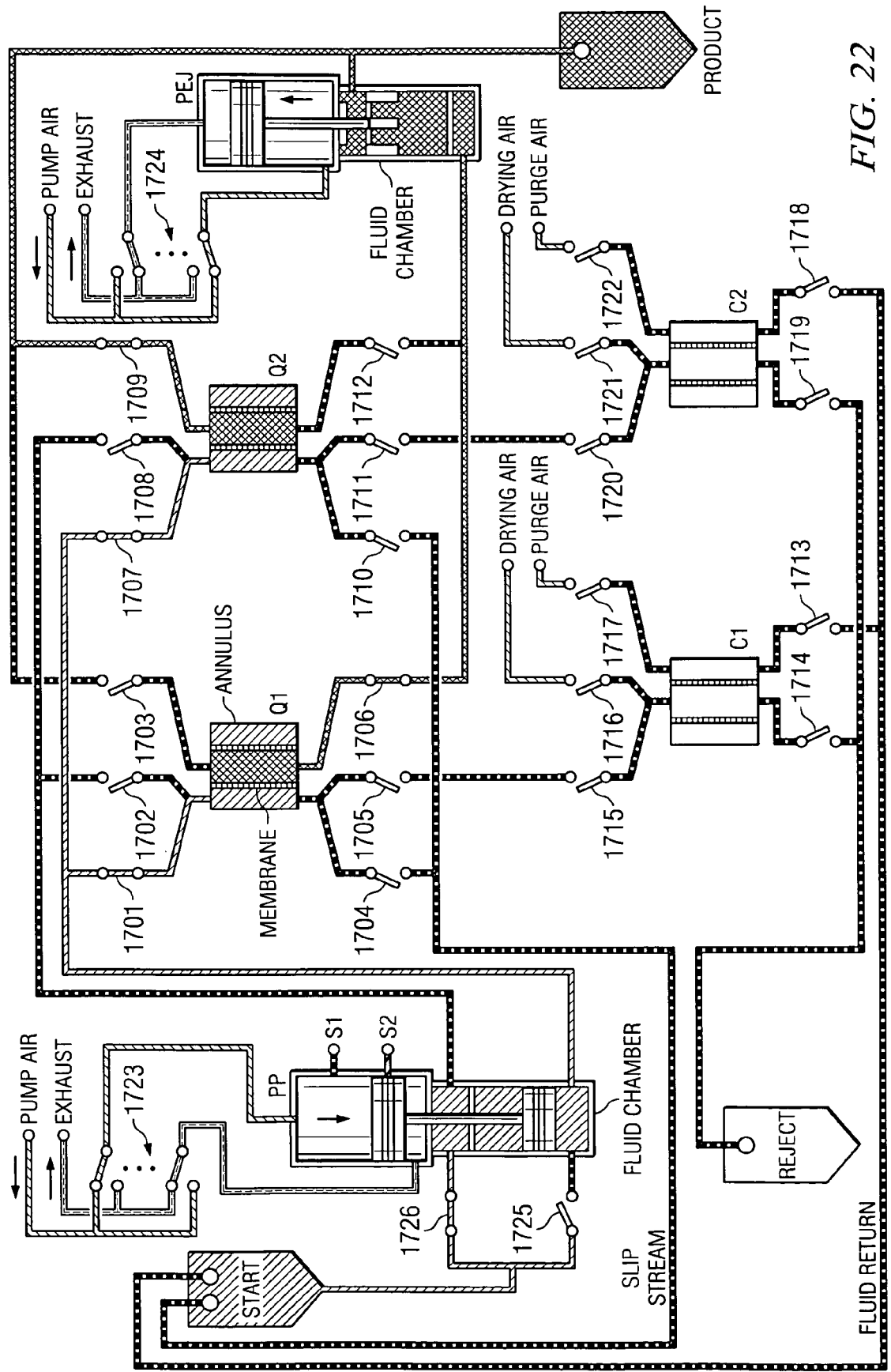
Figure 23:
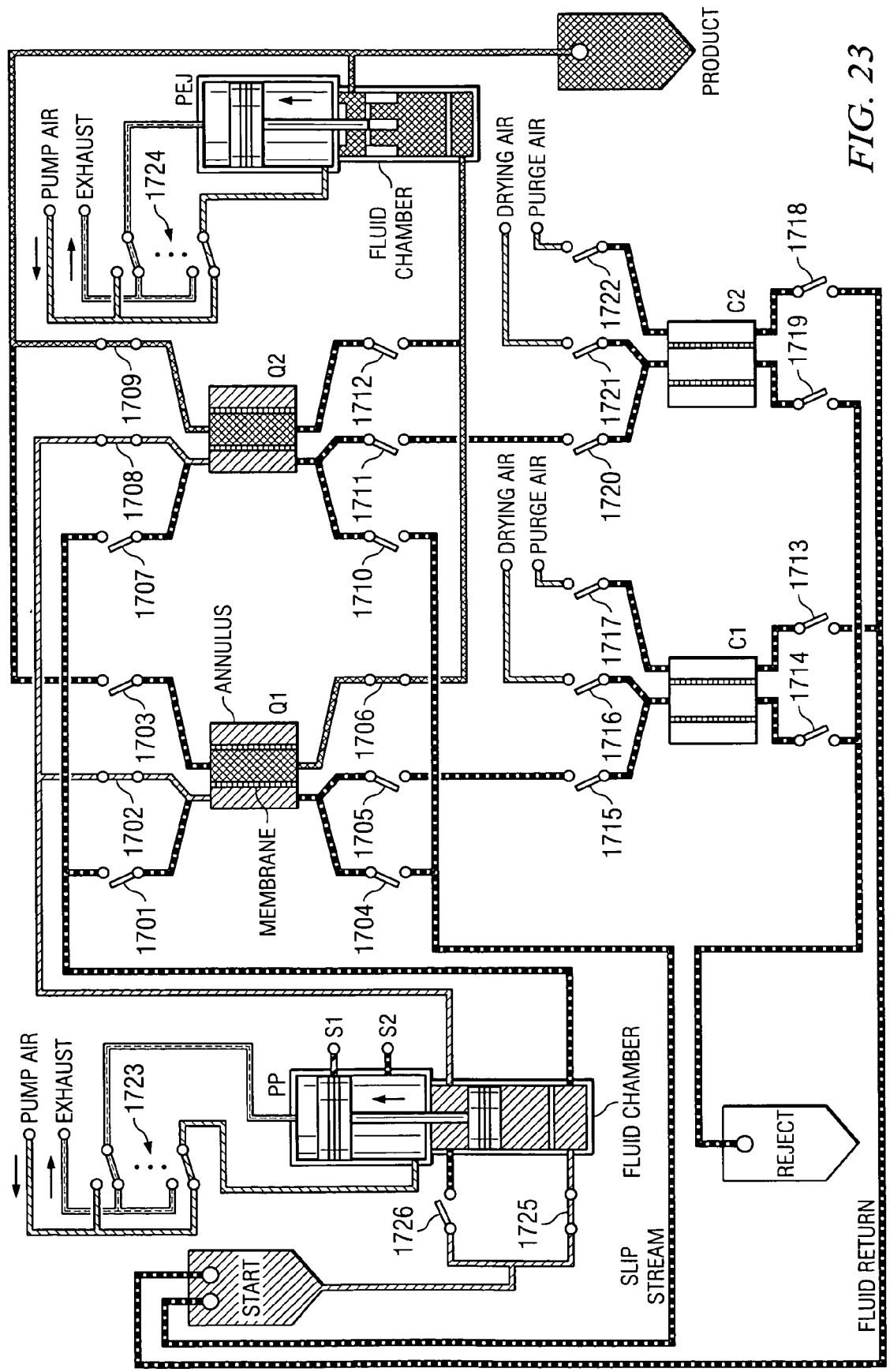
Figure 24:
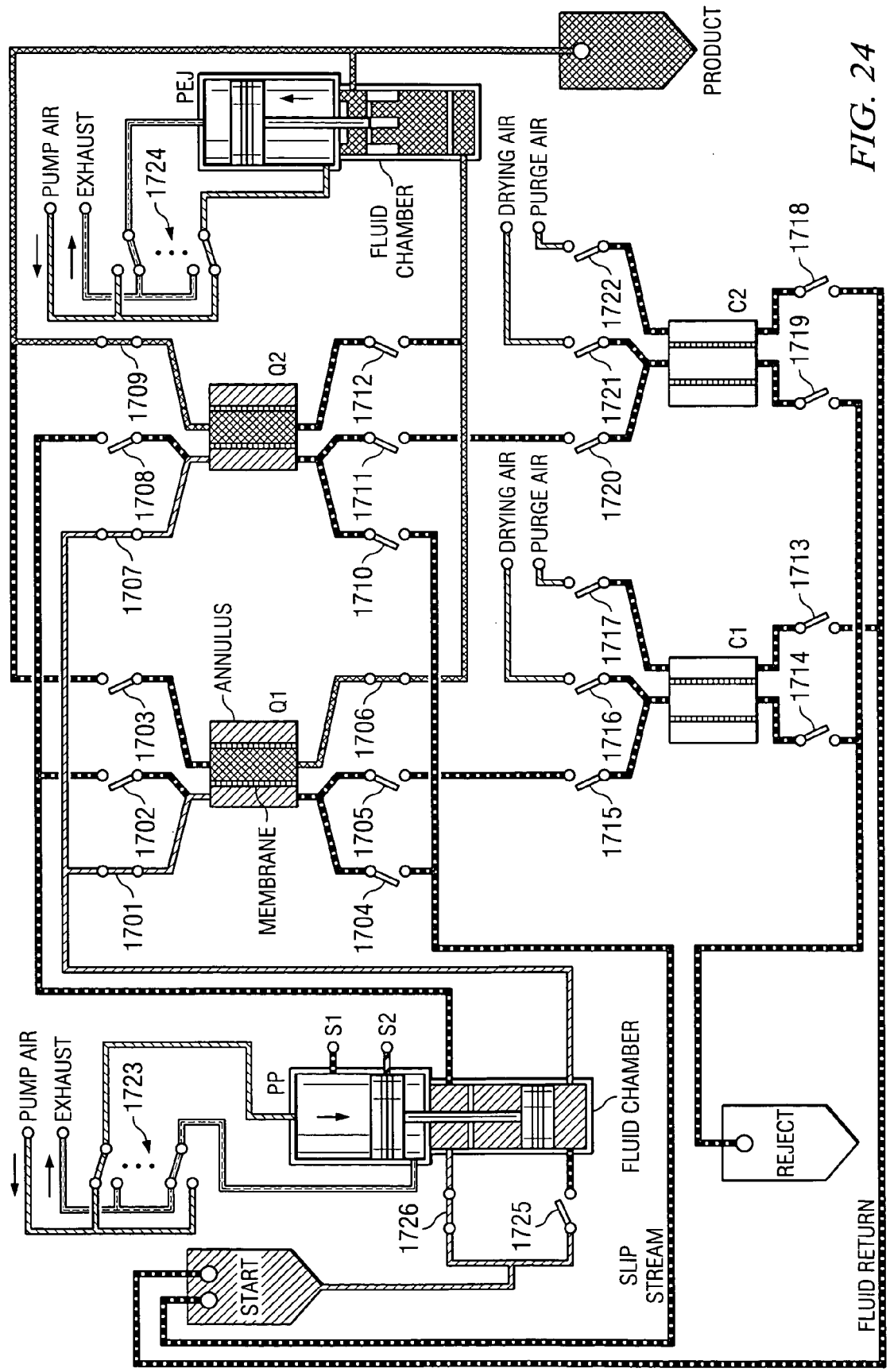
Figure 25:
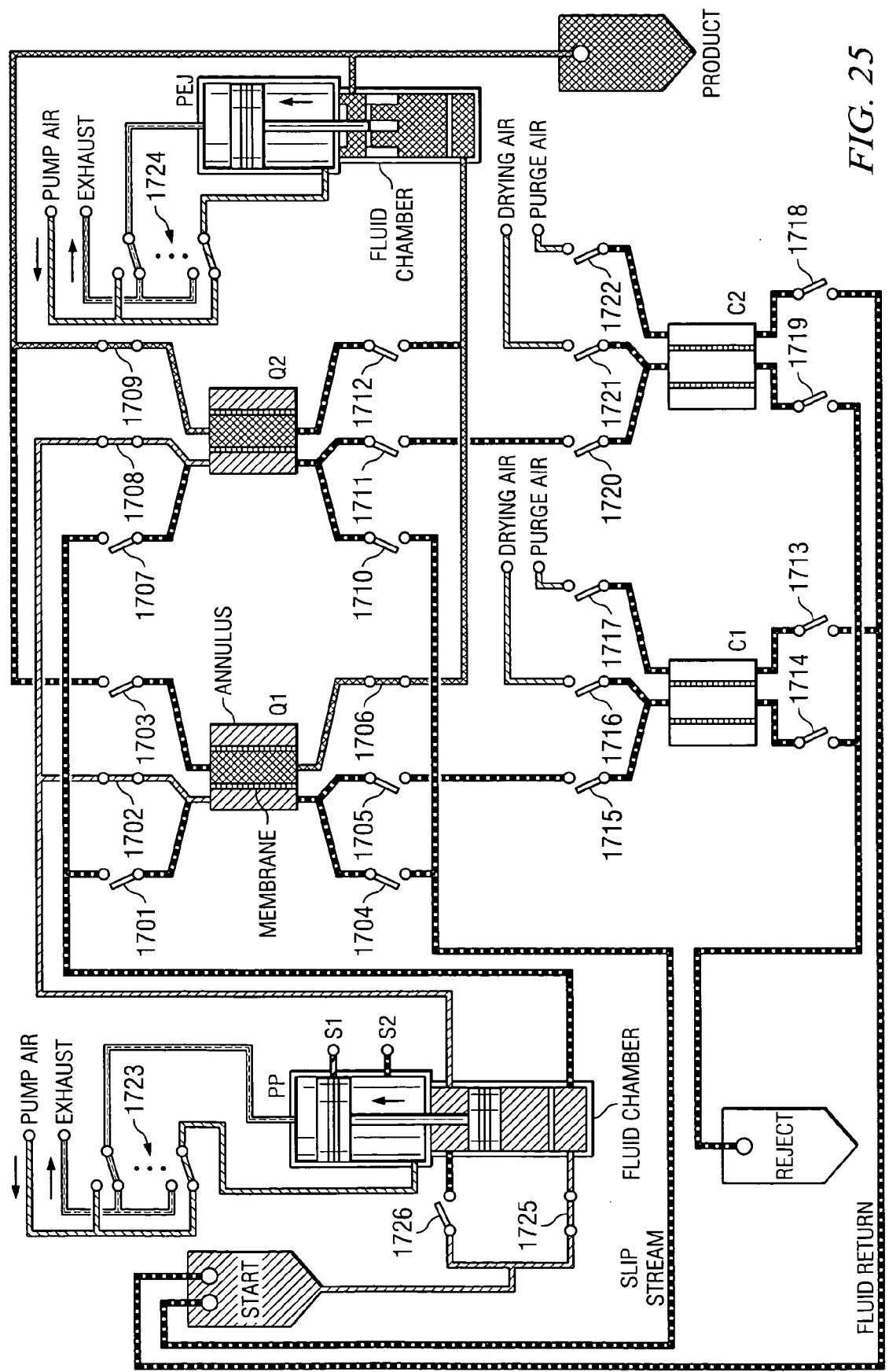
Figure 26:
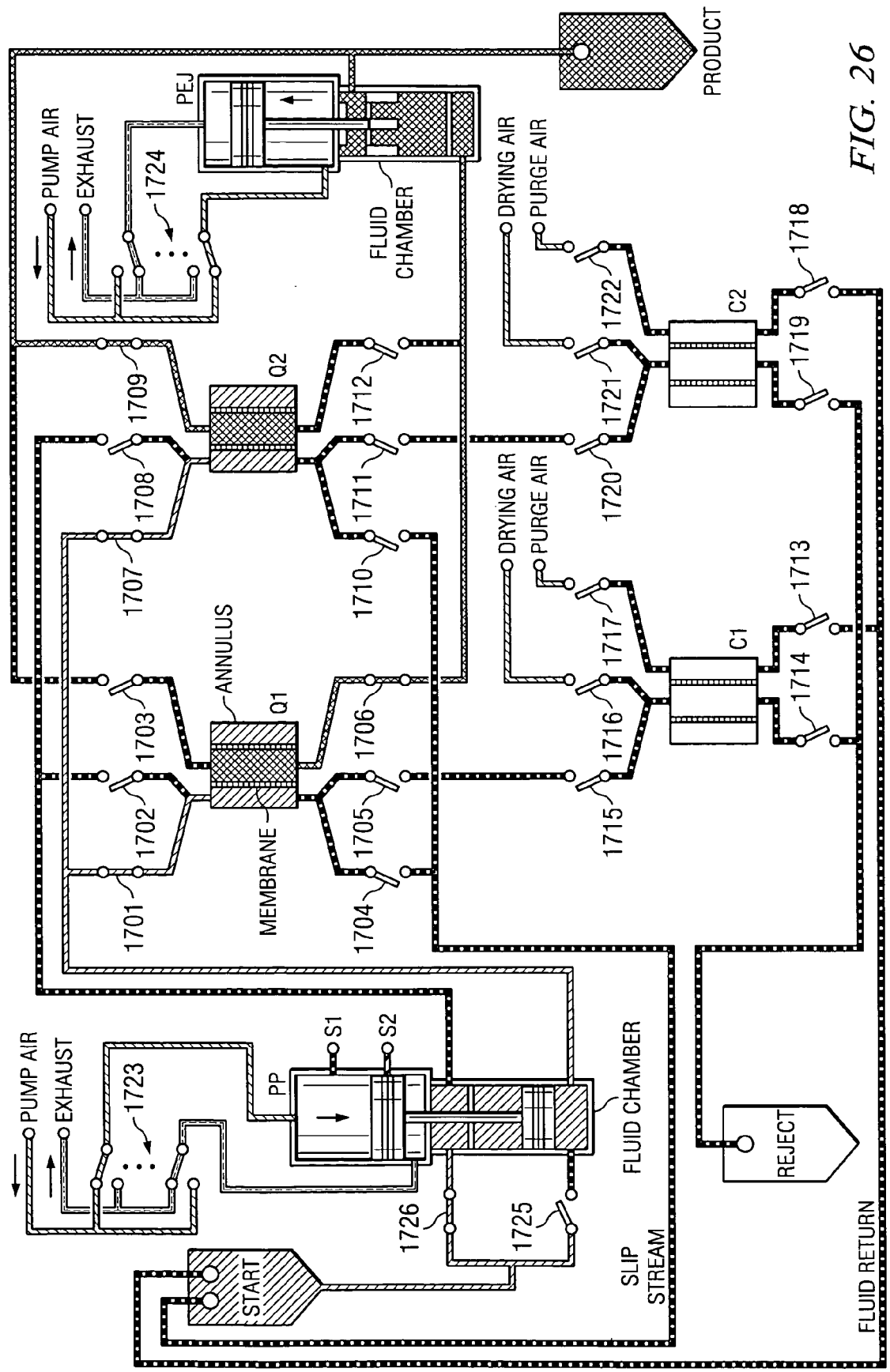

FIG. 19 depicts the next state in the filtration cycle. The air valve 1723 on the pneumatic pump PP changes the direction of the primary pump air and exhaust, causing the pump to reverse direction. Untreated fluid is now drawn into the pneumatic pump PP through the second poppet valve 1725, and is pumped into the separator filter pods Q1, Q2 through the alternate set of fluid inlet valves 1702, 1708, respectively. As in FIG. 18, filtered fluid from separator filter pod Q1 continues to flow through the ejector PEJ, while filtered fluid from pod Q2 bypasses the ejector PEJ and proceeds into the product collection tank.

Figure 27:
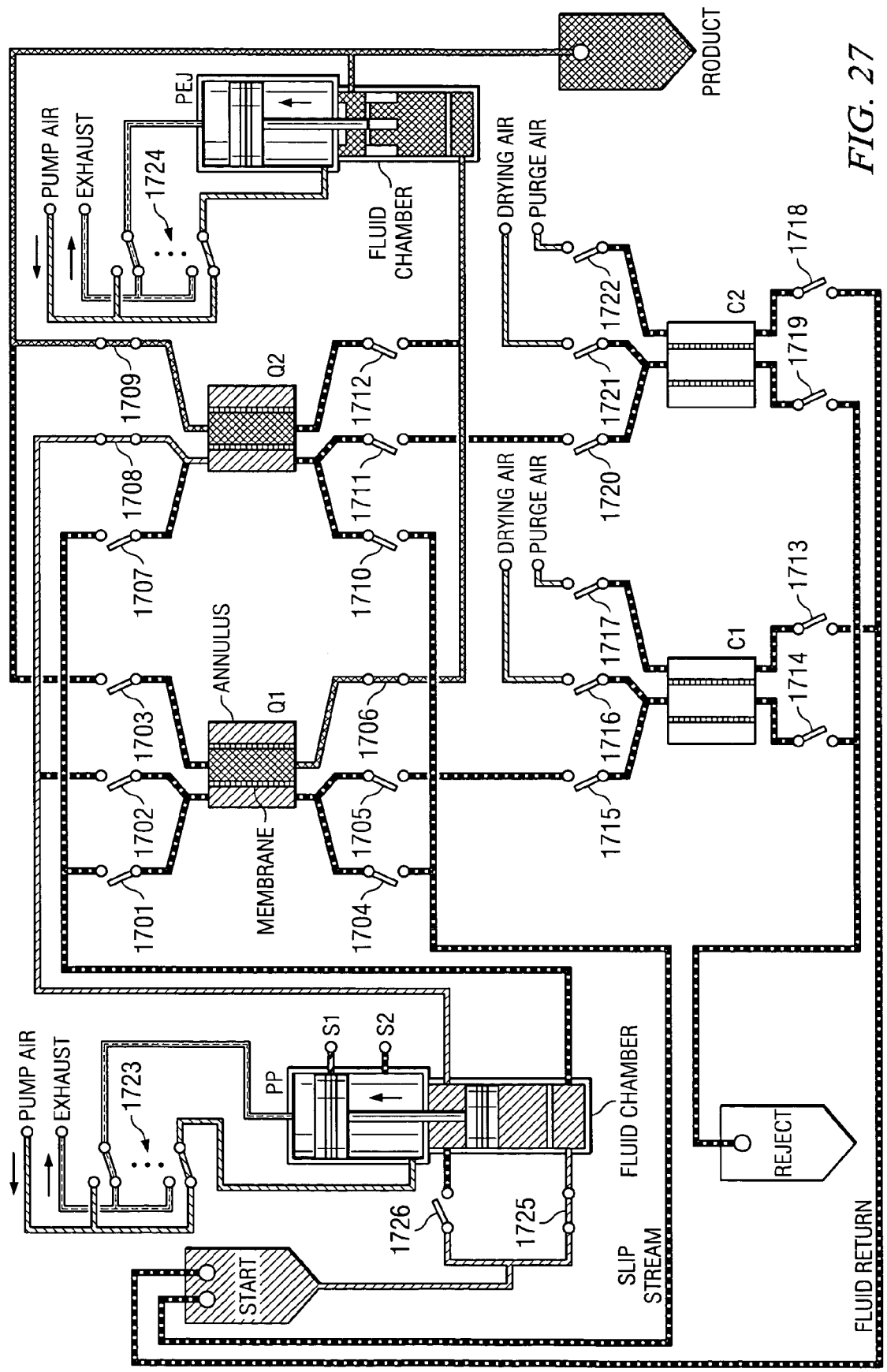

FIGS. 20, 22, 24, and 26 depict states identical to FIG. 18, and FIGS. 21, 23, and 25 depict states identical to FIG. 19, as the pneumatic pump PP alternates its direction up and down, and demonstrates the repetitive, alternating fluid flow and valve positions during the filtration cycle. The process state depicted in FIG. 27 is almost identical to that of FIG. 19, with the exception that the flow of untreated fluid to separator filter pod Q1 has been cut off in anticipation of the ejection cycle.

Figure 28:
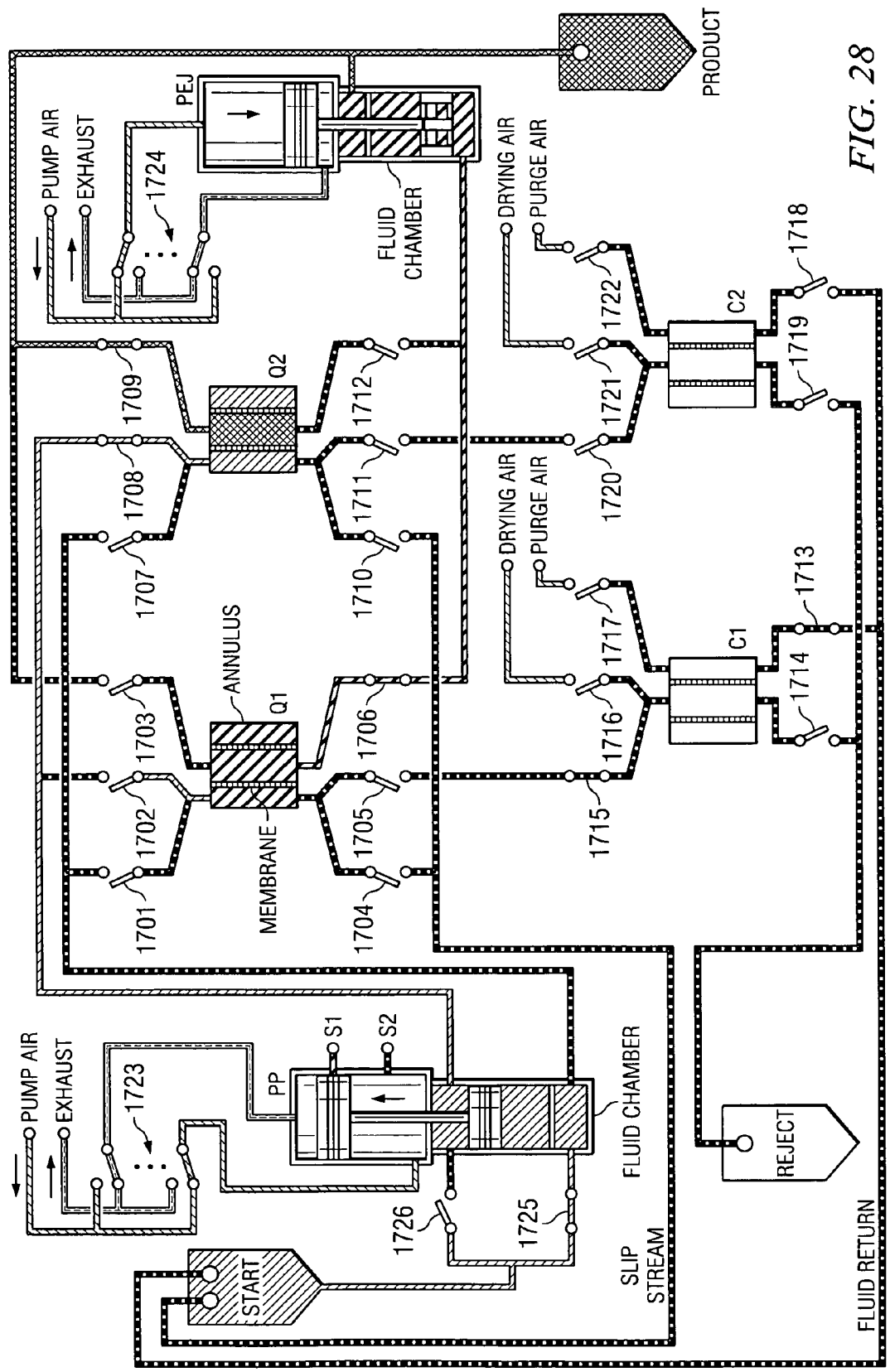

FIG. 28 depicts the first state in the ejection cycle for separator filter pod Q1. The air control poppet valve 1724 for the ejector PEJ switches the direction of primary pump air and exhaust, causing the ejector piston to descend and force fluid back through the membrane in the separator filter pod Q1. Poppet valves 1715 and 1713 on concentrator C1 also open in anticipation of waste fluid being flushed from separator filter pod Q1. Since filtered fluid from the second separator filter pod Q2 is moving through ejector bypass valve 1709, it is unaffected by the ejection cycle and continues to receive and filter untreated fluid from the pneumatic pump PP through poppet valve 1708.

Figure 29:
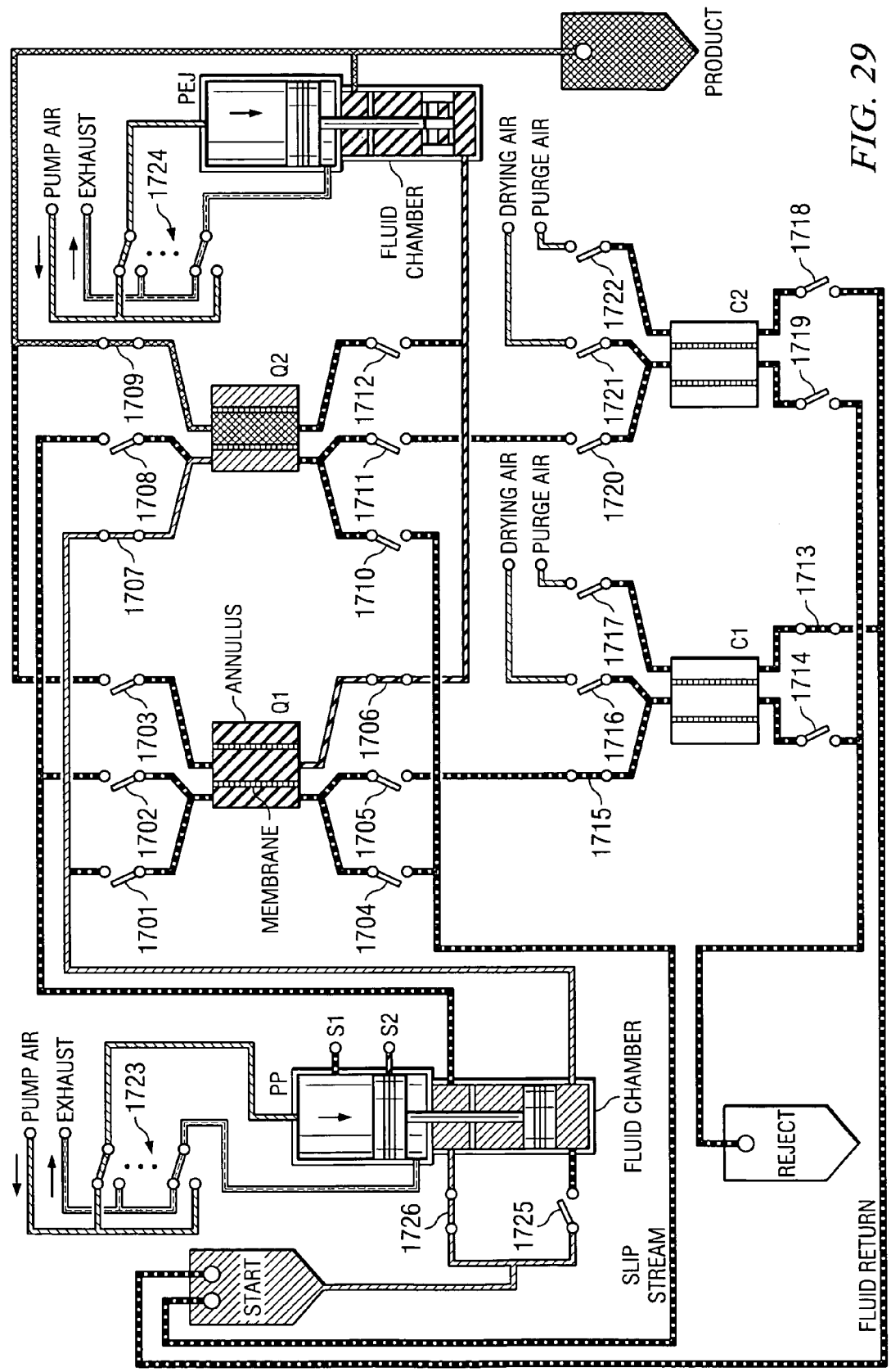
Figure 30:
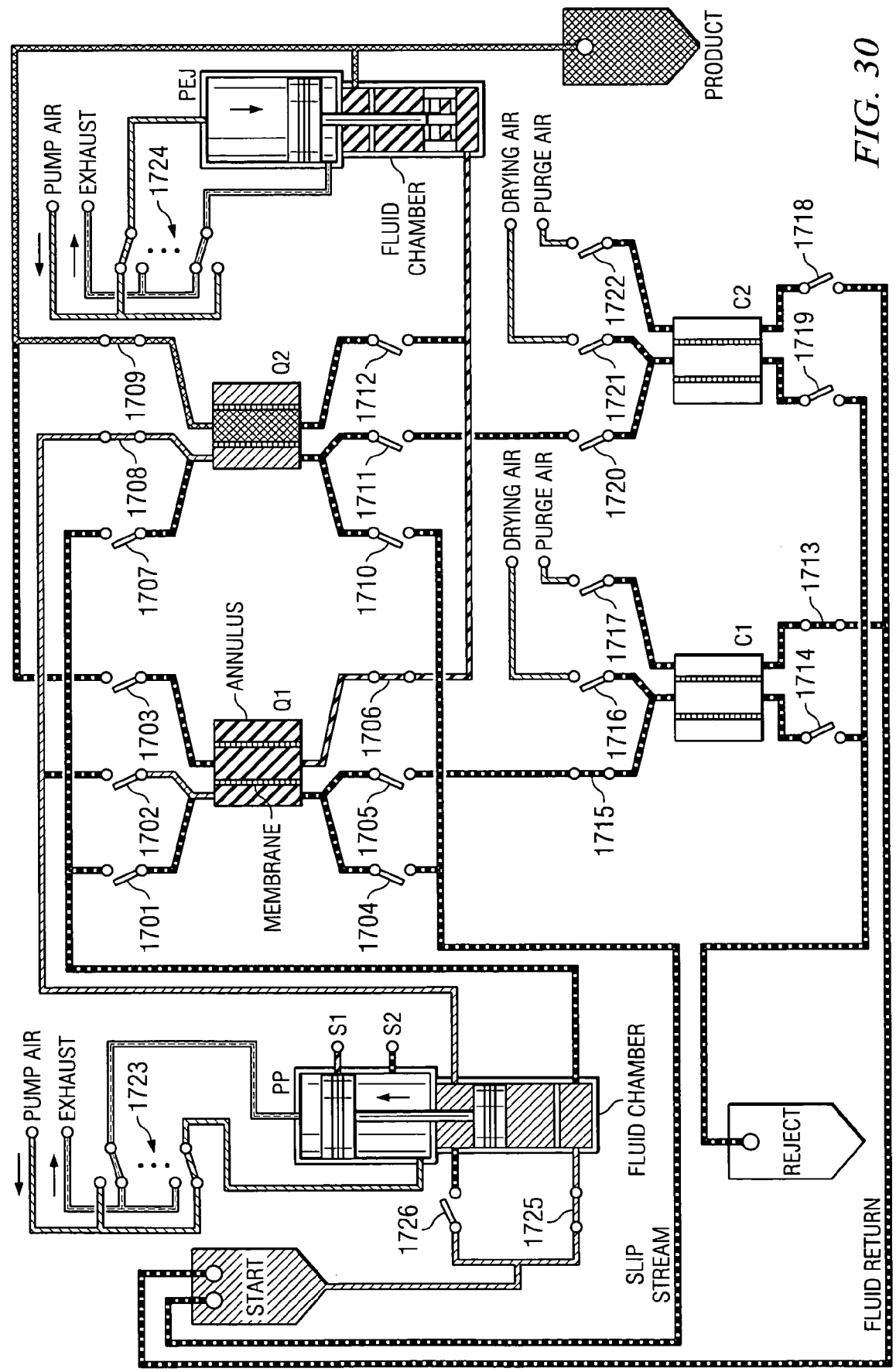

The state depicted in FIG. 29 is a continuation of the ejection flush of separator filter pod Q1. The pump air valve 1723 again switches the pump air stream, causing the pneumatic pump PP to move downward, drawing untreated fluid from the start tank through poppet valve 1726, and pumping untreated fluid into separator filter pod Q2 through inflow poppet valve 1707. Positive pressure is maintained from the ejector PEJ to separator filter pod Q1. The state depicted in FIG. 30 corresponds to the process state depicted in FIG. 28, as the filtration cycle for separator filter pod Q2 continues with the pneumatic pump PP switching direction and moving upward, pumping fluid through inlet valve 1708.

Figure 31:
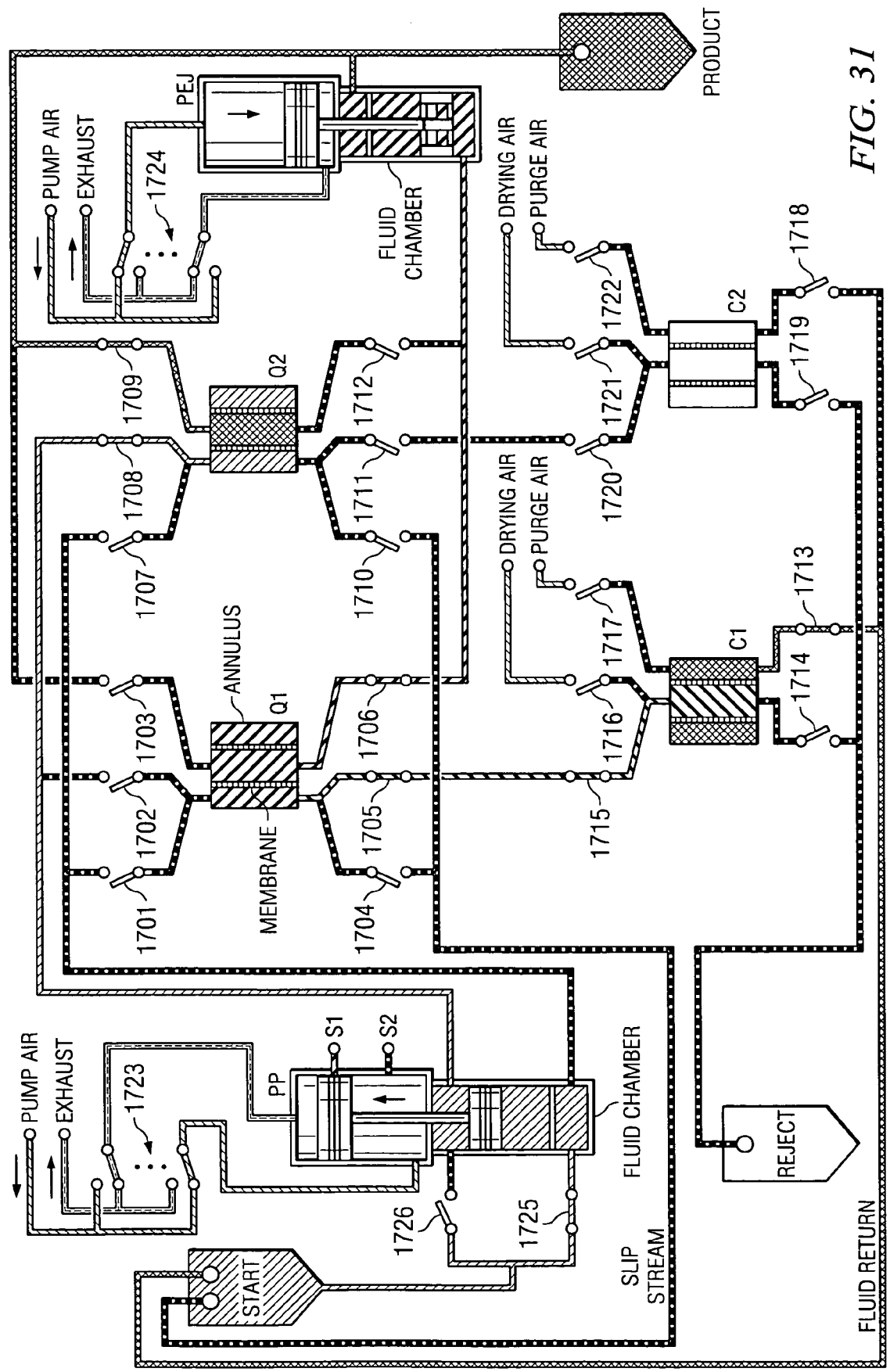

As shown in FIG. 31, the waste outflow valve 1705 opens, allowing pressurized waste fluid to be flushed out of the separator filter pod Q1 and into concentrator C1 open reject in valve 1715. As fluid flows through the membrane in the concentrator C1, it returns to the start tank through the open fluid return poppet valve 1713.

Figure 32:
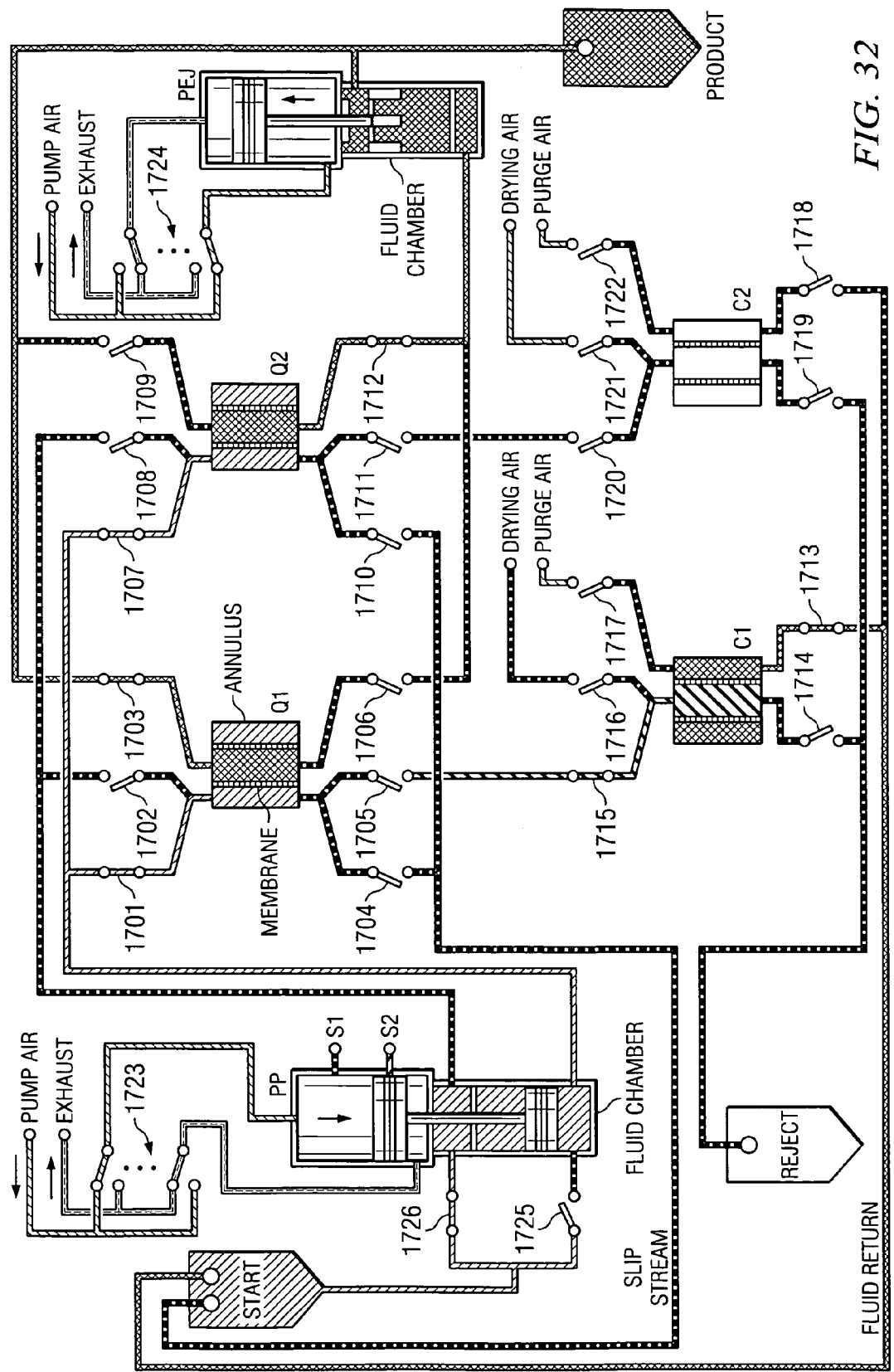

FIG. 32 depicts a reversal of the ejector bypass process as the ejection cycle for separator filter pod Q1 ends. Positive pressure from the ejector PEJ is cut off as poppet valve 1724 switches the direction of primary pump air and exhaust, causing the ejector piston to move upward. Waste outflow valve 1705 on separator filter pod Q1 also closes. As the pneumatic pump PP moves downward, separator filter pod Q1 resumes a new filtration cycle as untreated fluid is pumped into it through open fluid inlet poppet valve 1701. Filtered fluid now flows out of separator filter pod Q1 through the ejector bypass valve 1703 directly to the product tank, rather than through the ejector PEJ. Conversely, filtered fluid leaving separator filter pod Q2 now moves through valve 1712 and the ejector PEJ before reaching the product tank. The concentrator C1, continues to filter fluid from the waste material flushed out of separator filter pod Q1.

Figure 33:
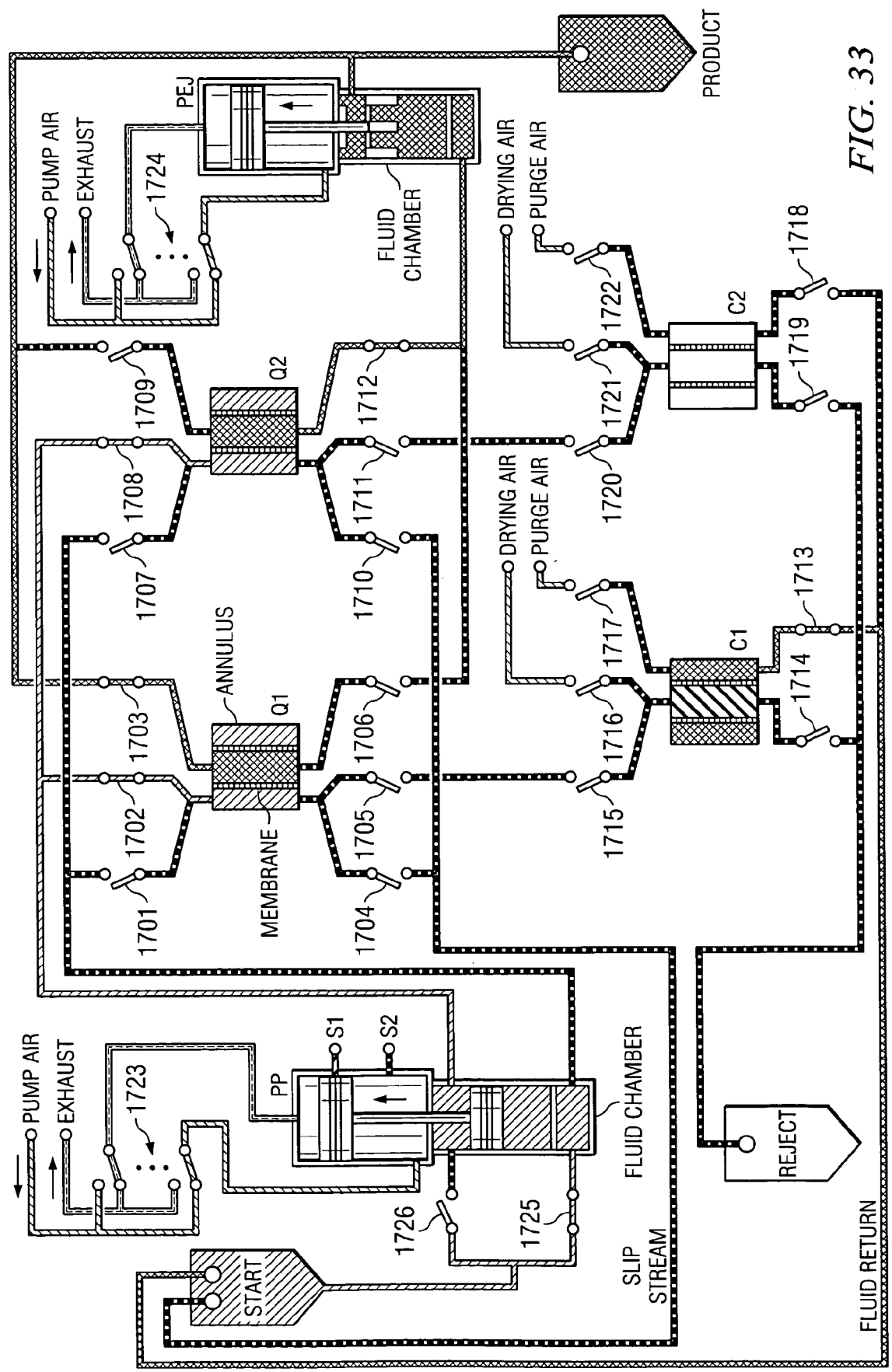

As shown in FIG. 33, the filtration cycle continues as the pneumatic pump PP moves upward, drawing untreated fluid from the start tank through poppet valve 1725 and pumps it into the separator filter pods Q1, Q2 through inflow valves 1702 and 1708, respectively. Waste inflow valve 1715 on concentrator C1 now closes, as fluid continues to filter through the concentrator membrane.

Figure 34:
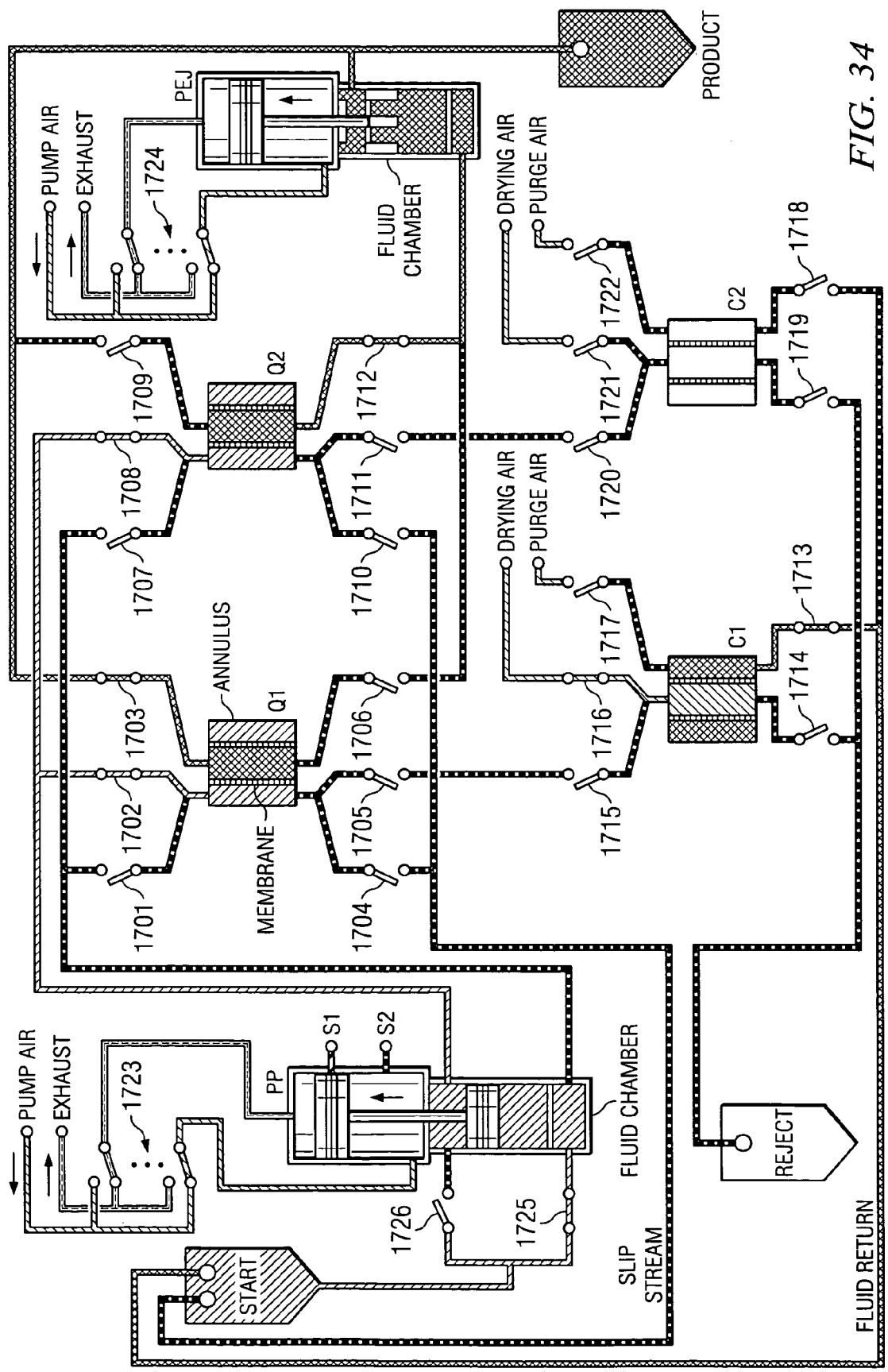

In FIG. 34, drying air flow poppet valve 1716 opens, allowing drying air into the concentrator C1 to dry and dewater the concentrated waste collected within the concentrator. Fluid return valve 1713 remains open to allow filtered waste fluid to return to the start tank via the fluid return line.

Figure 35:
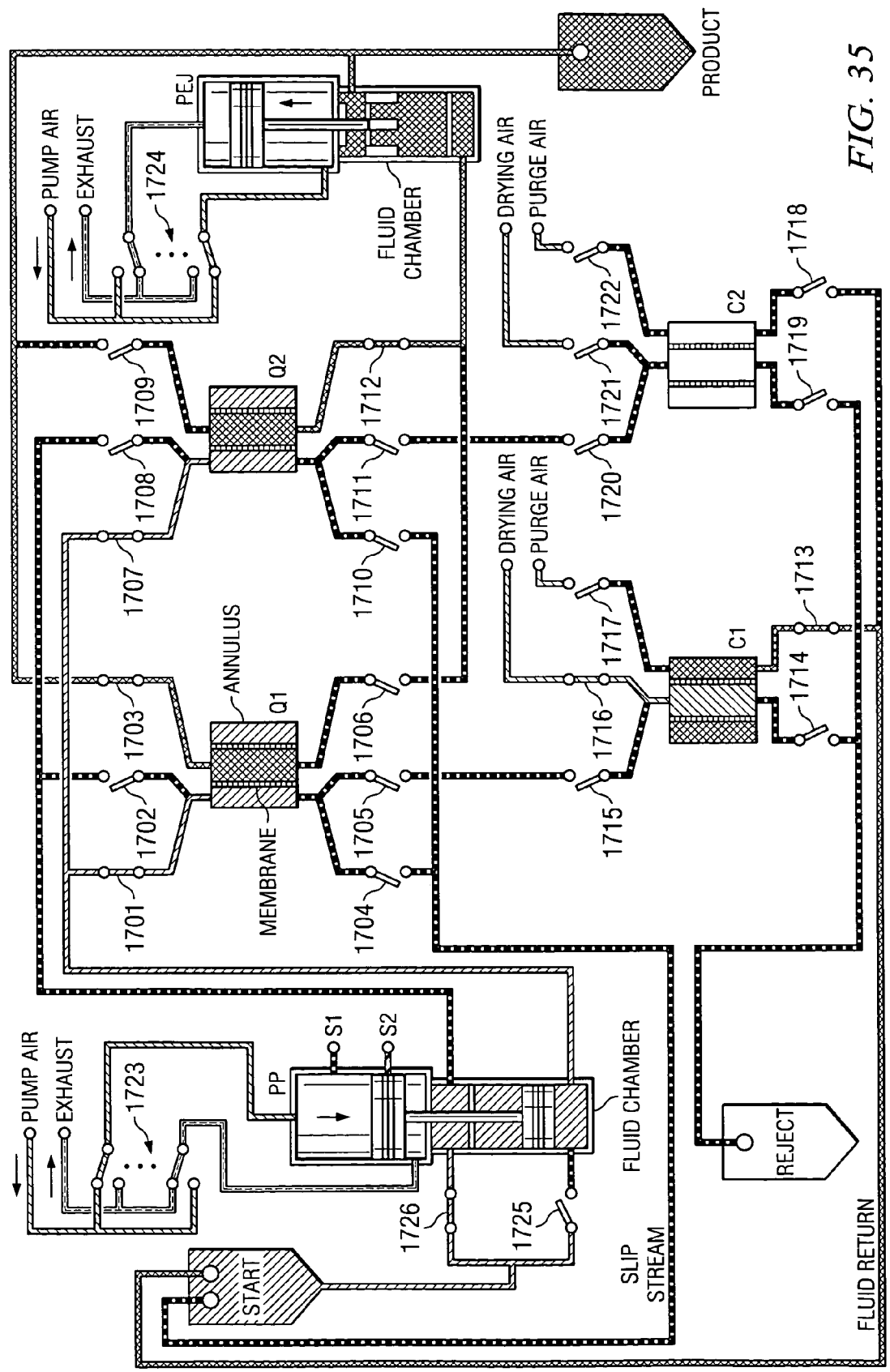

In FIG. 35 the pneumatic pump PP moves downward, pumping fluid into separator filter pods Q1, Q2 through inflow valves 1701, 1707, respectively.

Figure 36:
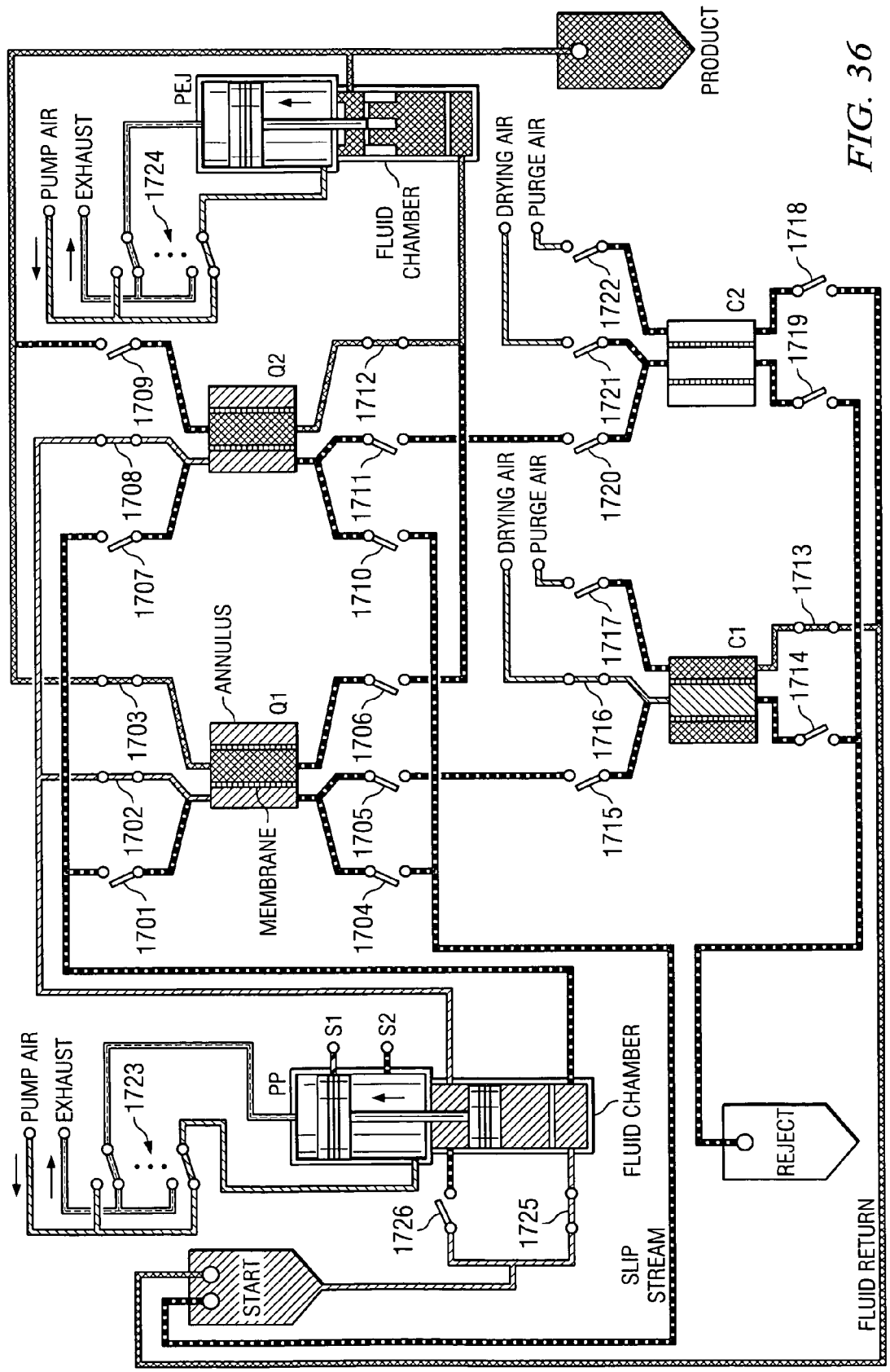
Figure 37:
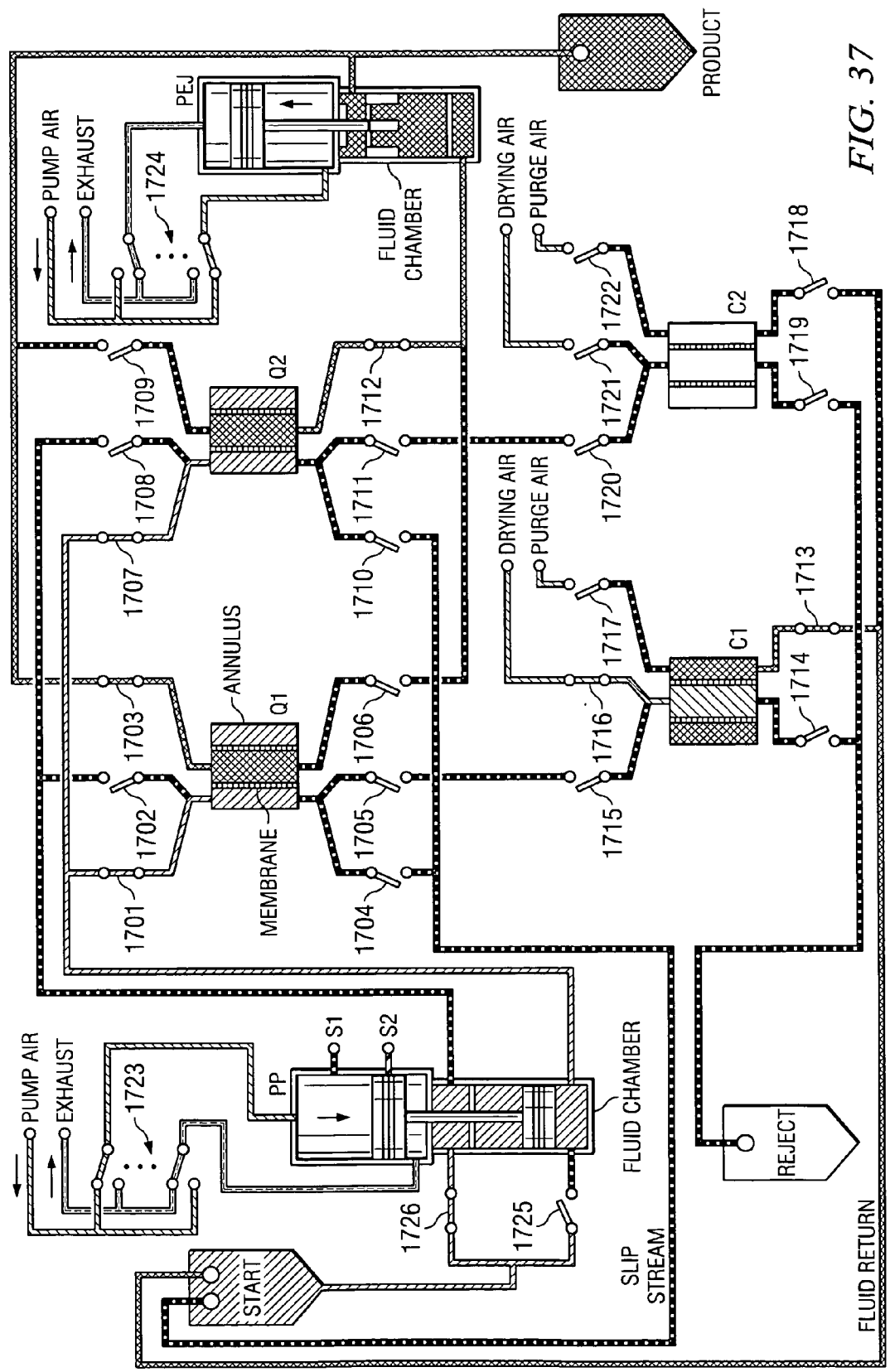
Figure 38:
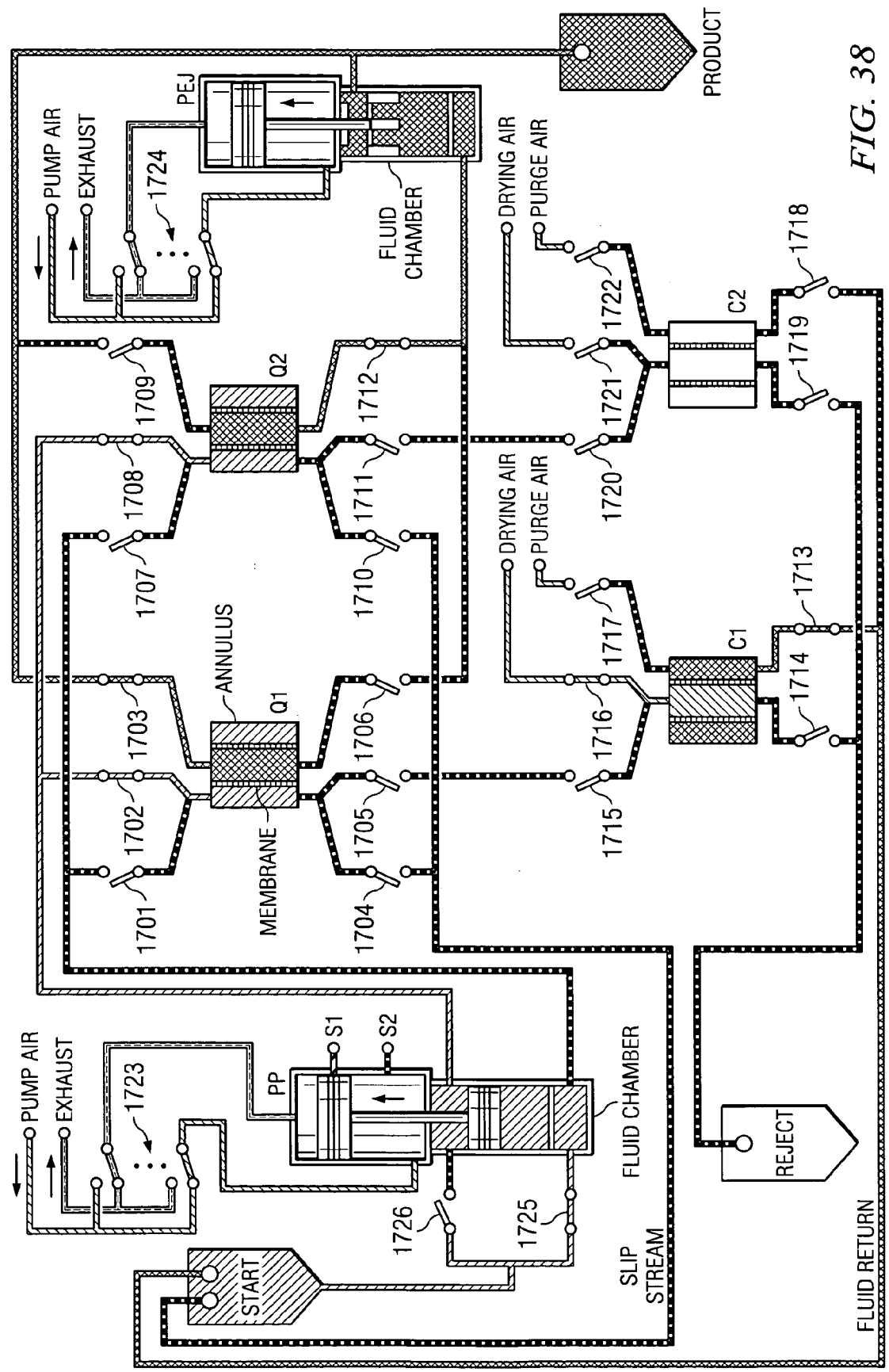
Figure 39:
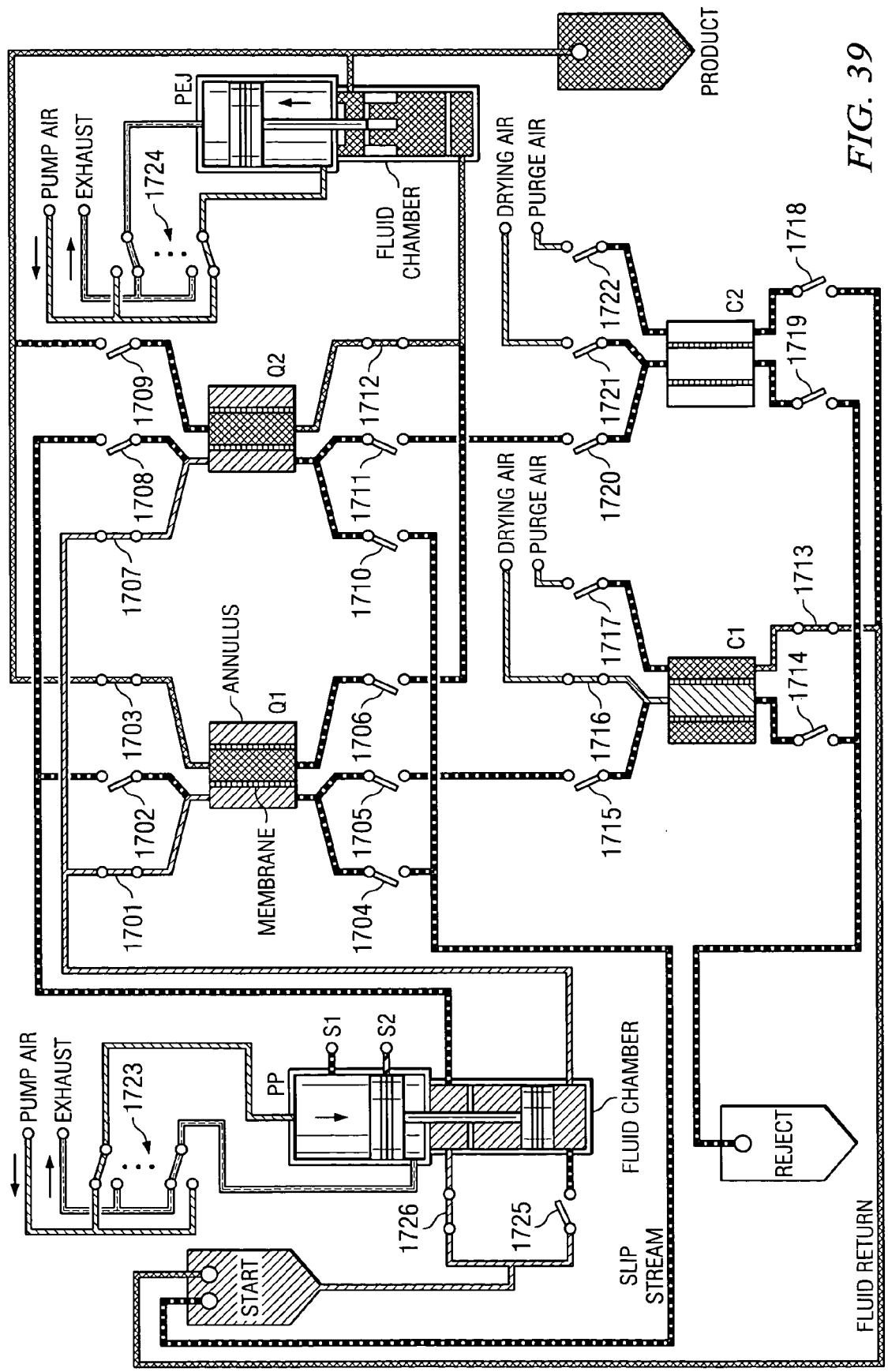
Figure 40:
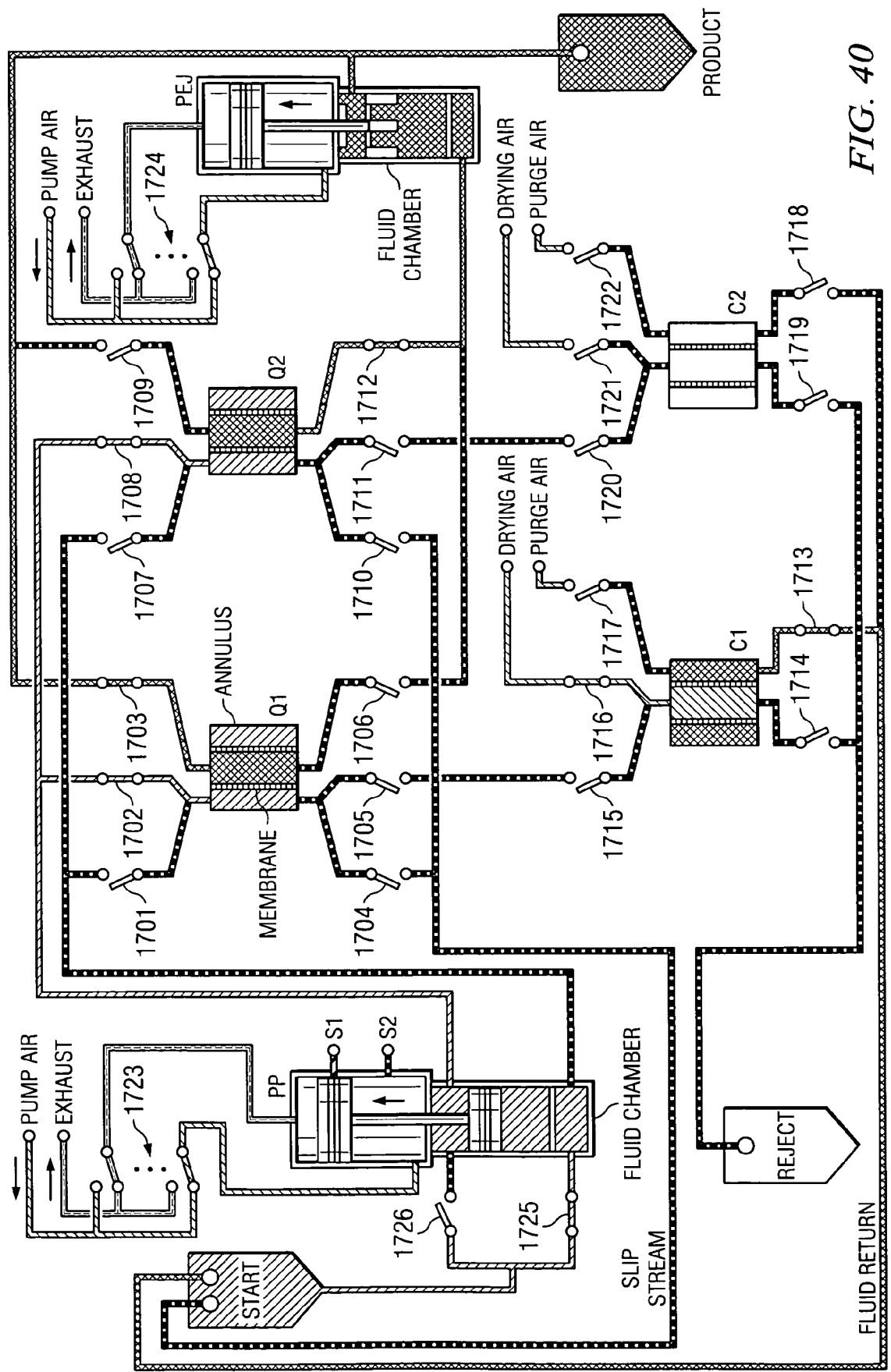
Figure 41:
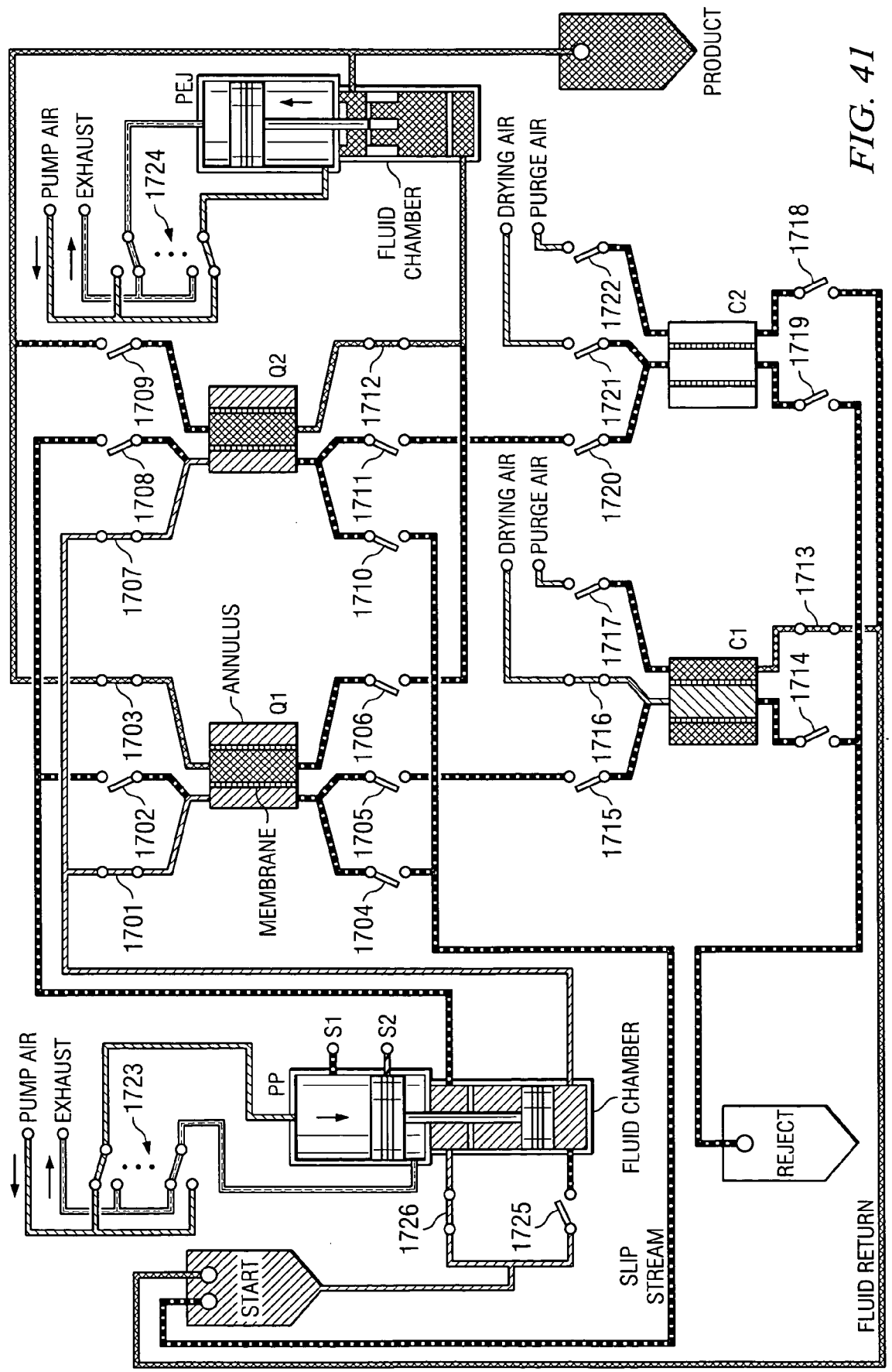

The states depicted in FIGS. 36, 38, and 40 correspond to those described in FIG. 34. FIGS. 37, 39 and 41 correspond to the process described in FIG. 35, as the alternating filtration cycle continues with the waste residue in the concentrator C1 continuing to dry.

Figure 42:
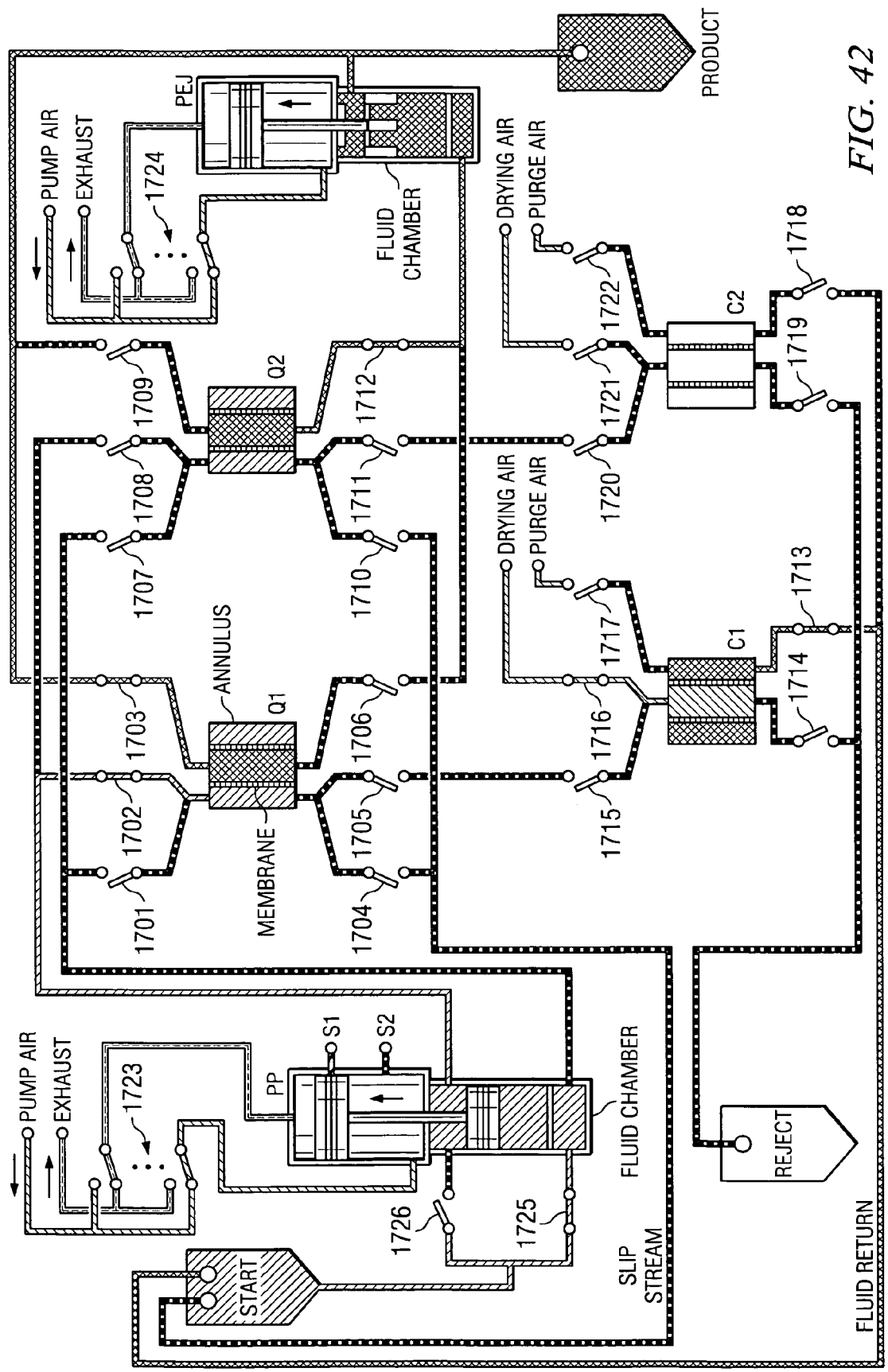

FIG. 42 is similar to FIG. 34, with the exception that all fluid flow from the pneumatic pump PP to the second separator filter pod Q2 has been cut off in anticipation of the oncoming reverse ejection flush of separator filter pod Q2.

Figure 43:
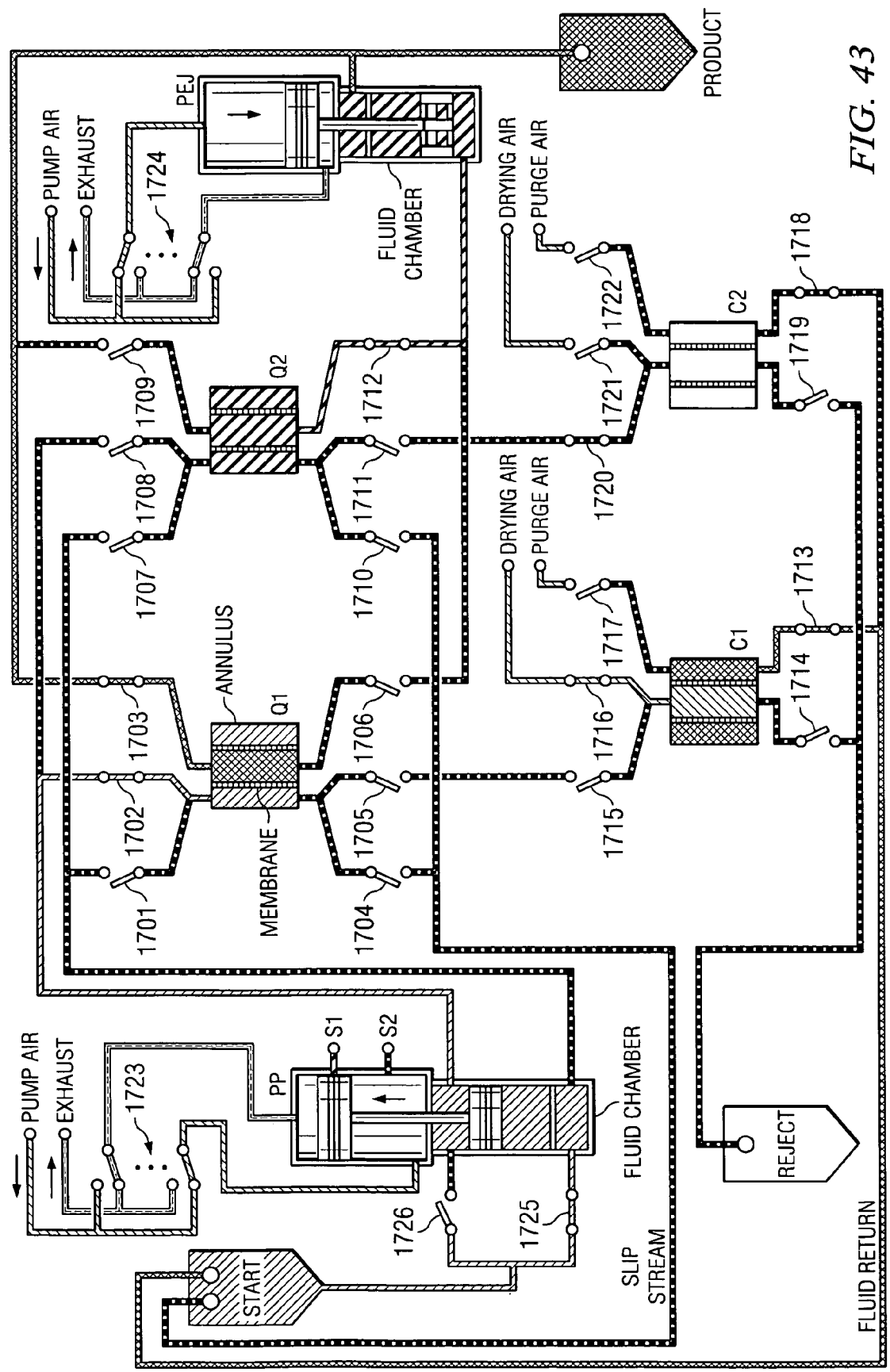

FIG. 43 depicts the first state in the ejection cycle for separator filter pod Q2. The air control poppet valve 1724 for the ejector PEJ switches the direction of primary pump air and exhaust, causing the ejector piston to descend and force fluid back through the flux cartridge membrane in the separator filter pod Q2. Poppet valves 1720 and 1718 on concentrator C2 also open in anticipation of waste fluid being flushed from separator filter pod Q2. Since filtered fluid from the separator filter pod Q1 is moving through ejector bypass valve 1703, it is unaffected by the ejection cycle and continues to receive and filter untreated fluid from the pneumatic pump PP through poppet valve 1702.

Figure 44:
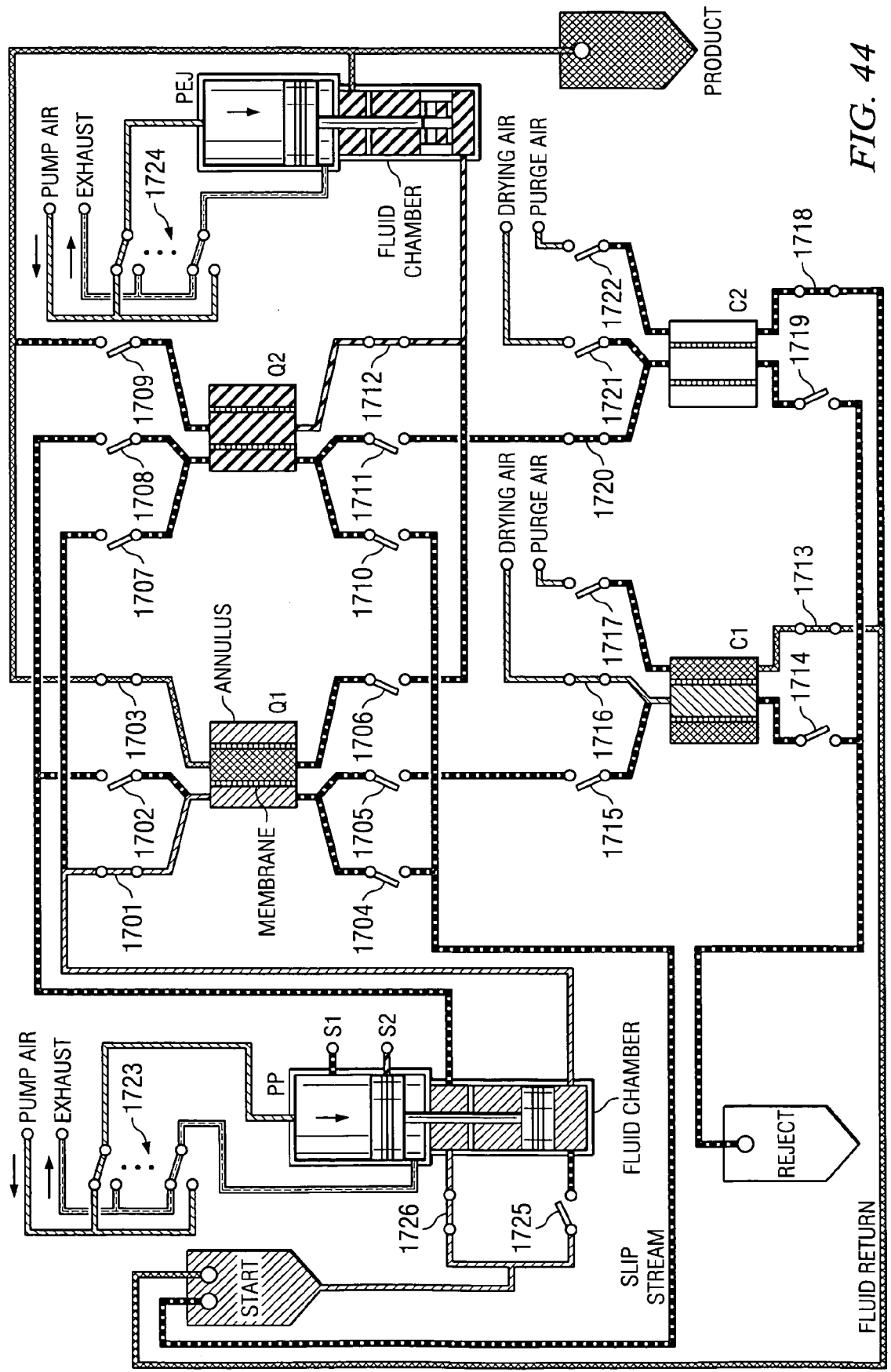

The state depicted in FIG. 44 is a continuation of the ejection flush of separator filter pod Q2. The pump air valve 1723 again switches the pump air stream, causing the pneumatic pump PP to move downward, drawing untreated fluid from the start tank through poppet valve 1726, and pumping untreated fluid into separator filter pod Q1 through inflow poppet valve 1701. Positive pressure is maintained from the ejector PEJ to separator filter pod Q2.

Figure 45:
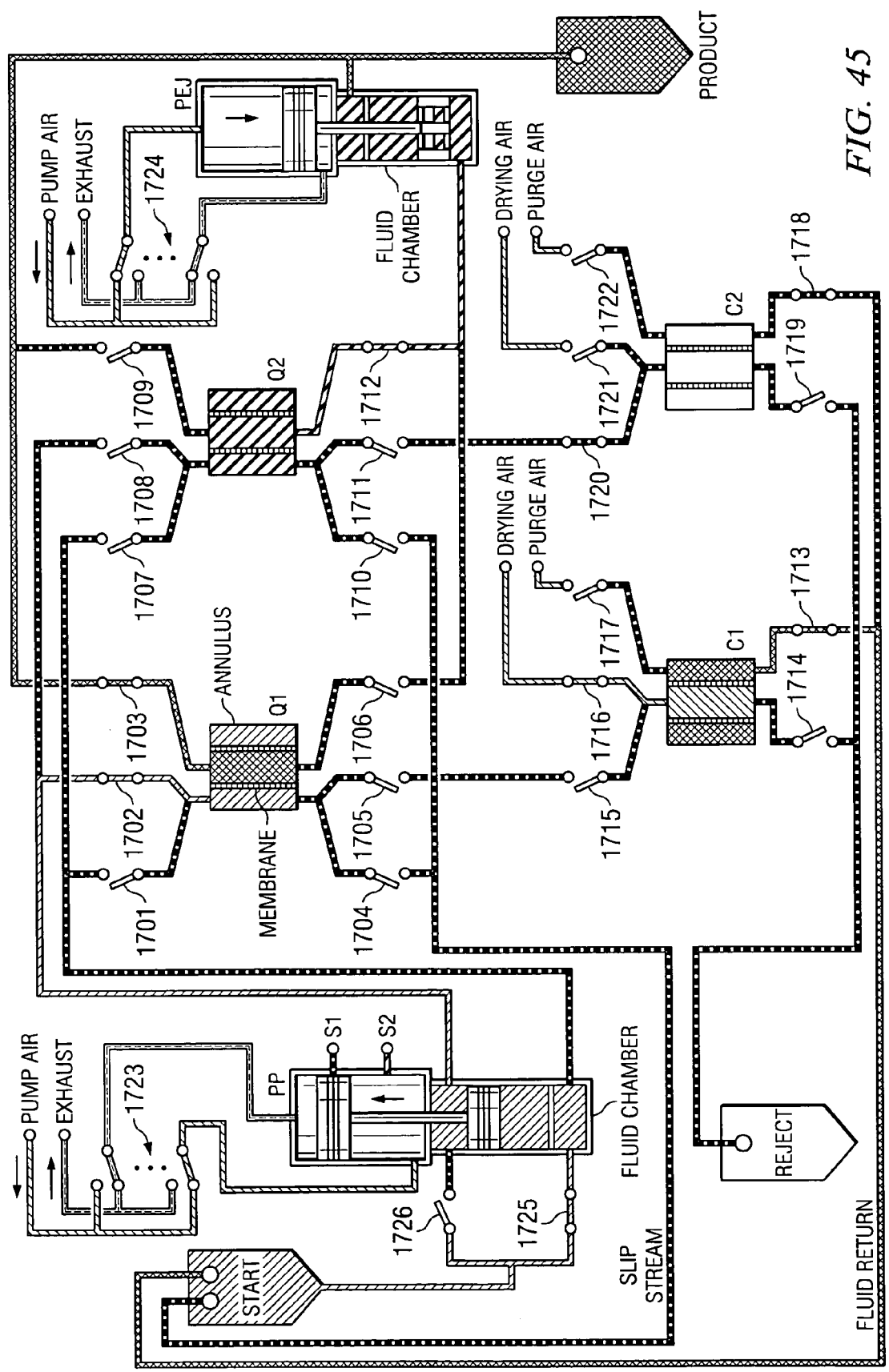

The state depicted in FIG. 45 corresponds to that shown in FIG. 43, as the filtration cycle for separator filter pod Q1 continues with the pneumatic pump PP switching direction and moving upward, pumping untreated fluid through inlet valve 1702.

Figure 46:
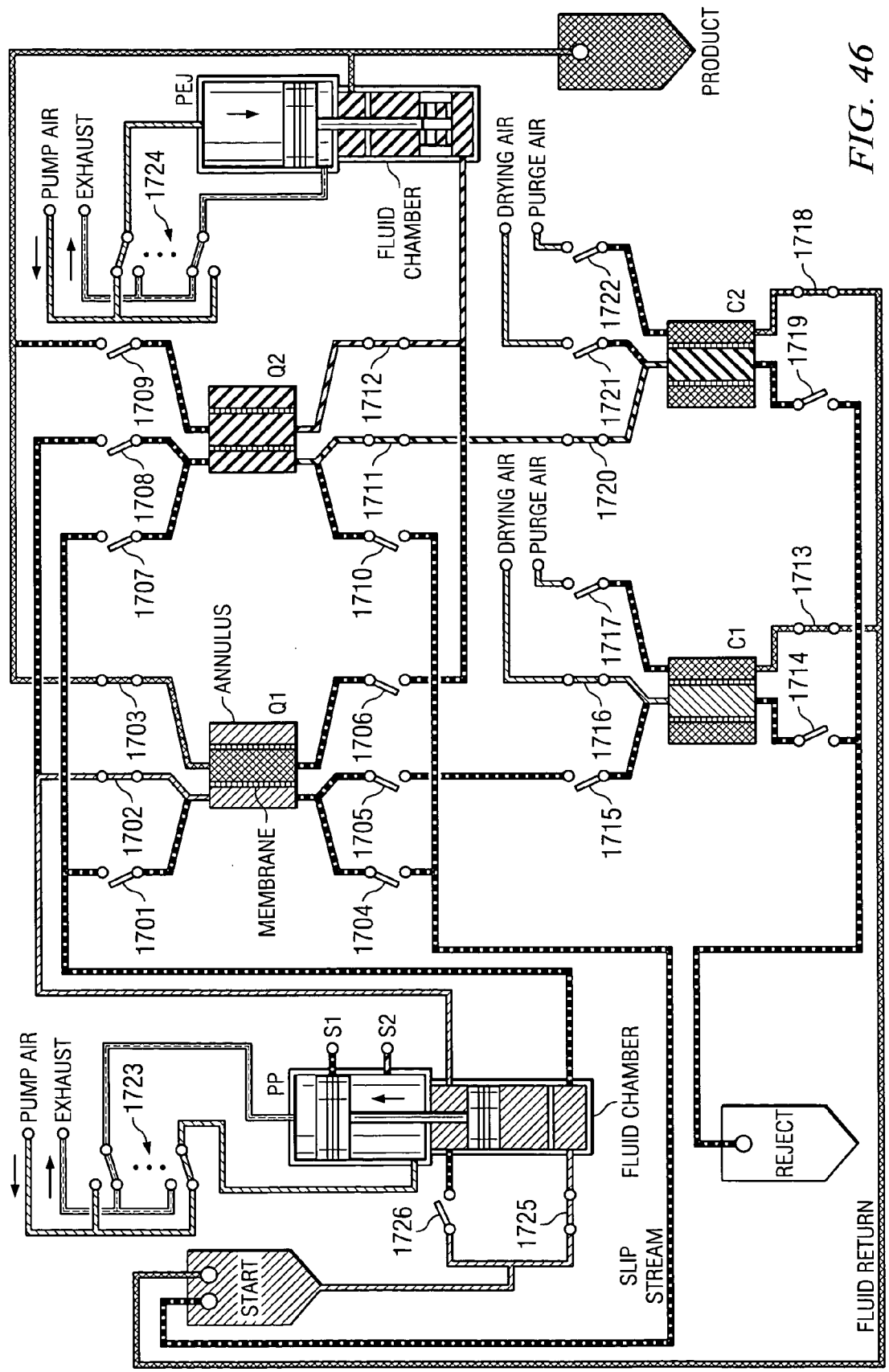

In FIG. 46, the waste outflow valve 1711 is opened allowing pressurized waste fluid to be flushed out of the separator filter pod Q2 and into concentrator C2. As fluid flows through the membrane in the concentrator C2, it returns to the start tank through the open fluid return poppet valve 1718.

Figure 47:
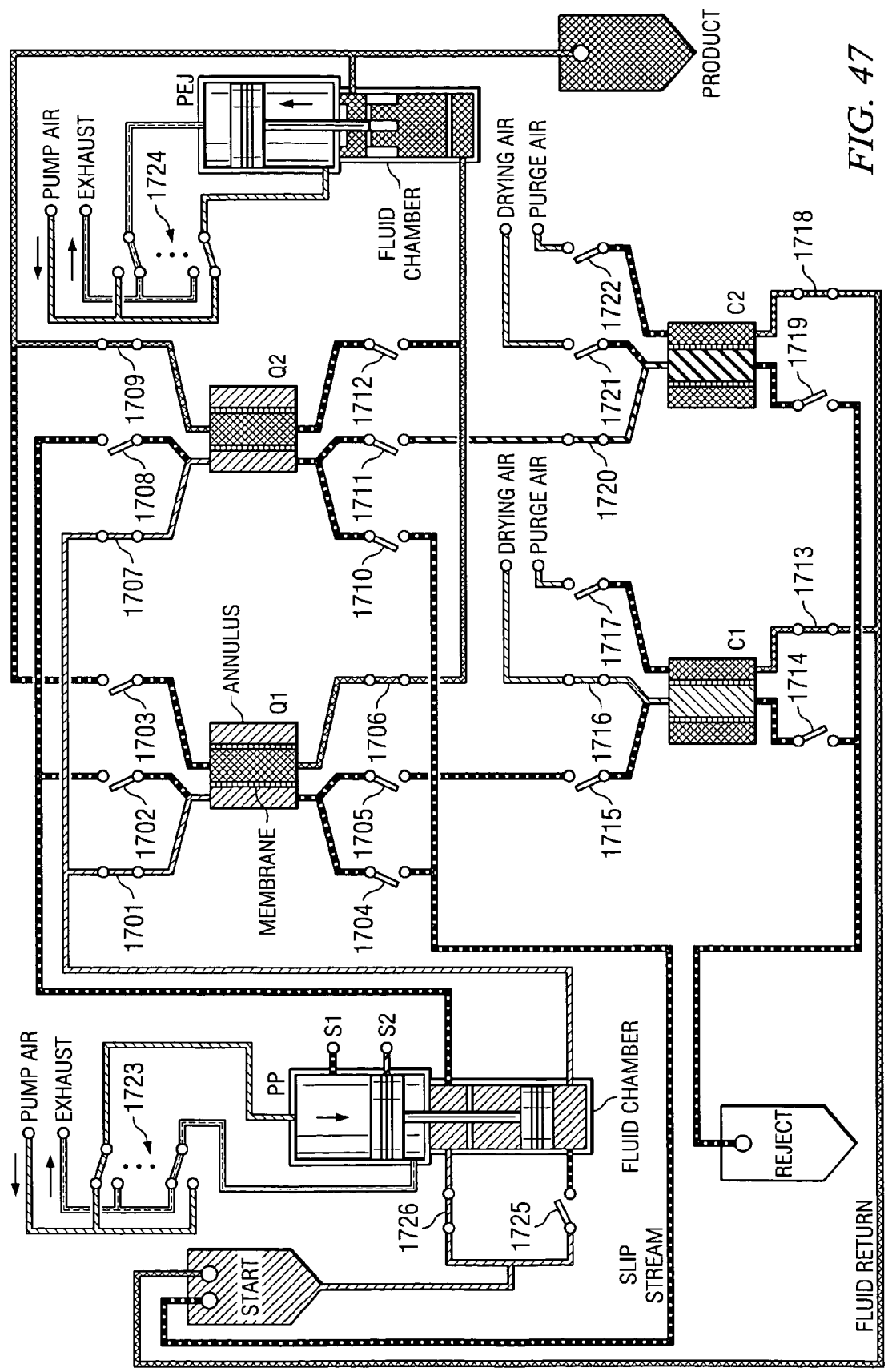

FIG. 47 depicts another reversal of the ejector bypass process as the ejection cycle for separator filter pod Q2 ends. Positive pressure from the ejector PEJ is cut off as poppet valve 1724 switches the direction of primary pump air and exhaust, causing the ejector piston to move upward. Waste outflow valve 1711 on separator filter pod Q2 also closes. As the pneumatic pump PP moves downward, separator filter pod Q2 resumes a new filtration cycle as untreated fluid is pumped into it through poppet valve 1707. Filtered fluid now flows out of separator filter pod Q2 through the ejector bypass valve 1703 directly to the product tank as it did in FIGS. 18-31. Conversely, filtered fluid leaving separator filter pod Q1 again moves through outflow valve 1706 and the ejector PEJ. Both concentrators C1, C2 continue to filter fluid from the waste material with concentrator C1 still exposed to drying air.

Figure 48:
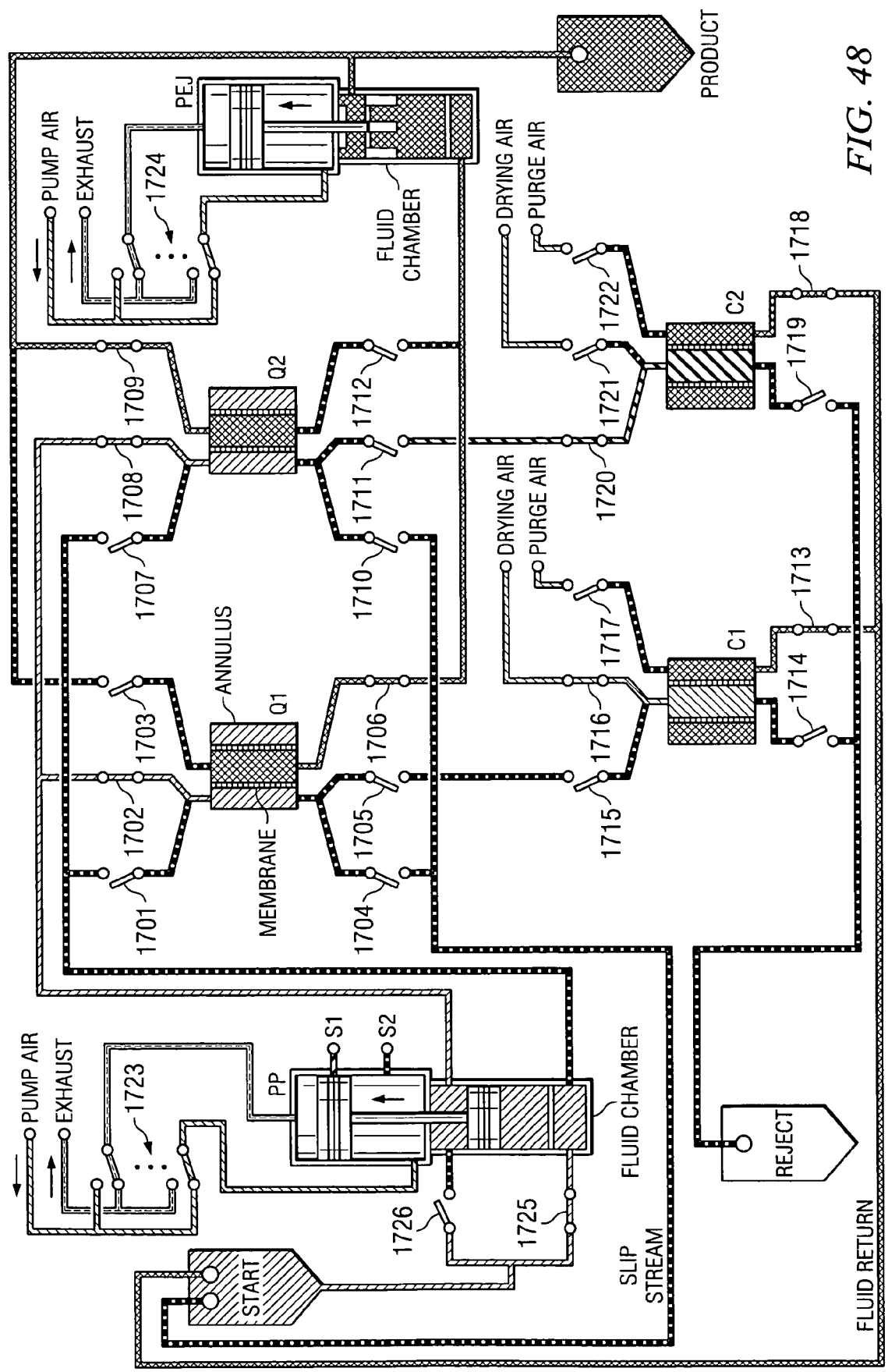

As shown in FIG. 48, the filtration cycle continues as the pneumatic pump PP cycles and pumps fluid into separators Q1, Q2 through inlet valves 1702, 1708 respectively.

Figure 49:
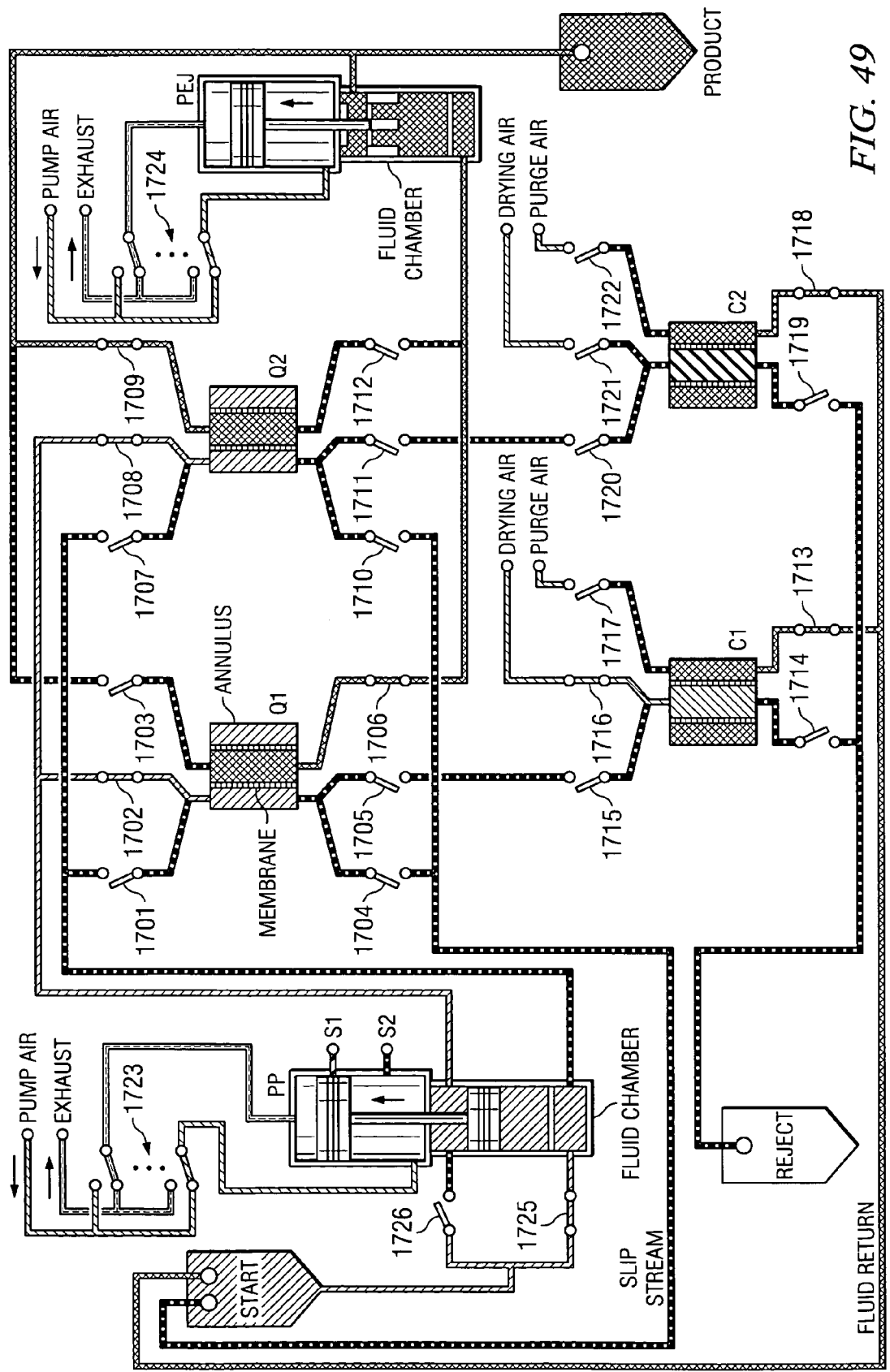
Figure 50:
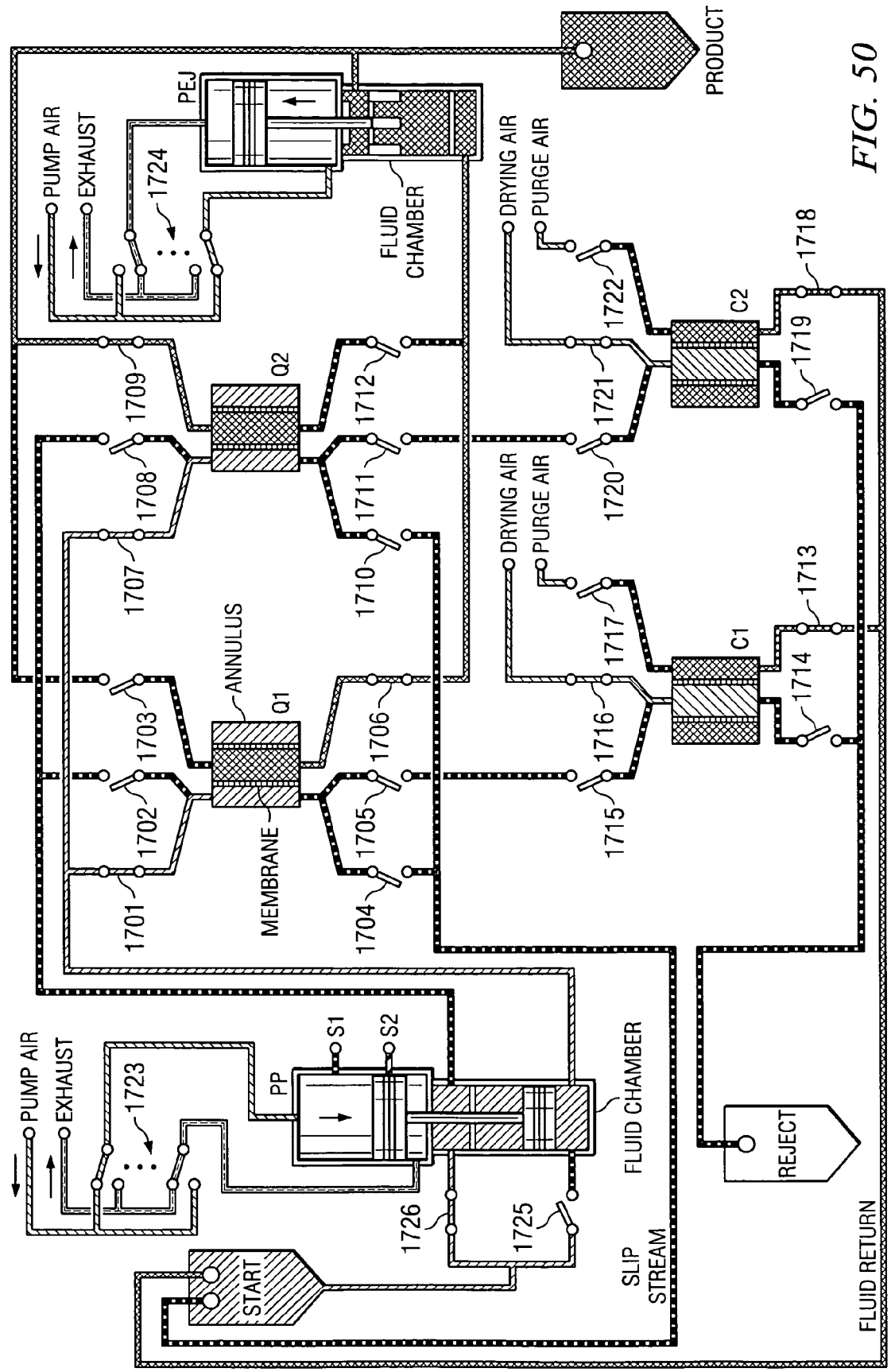
Figure 51:
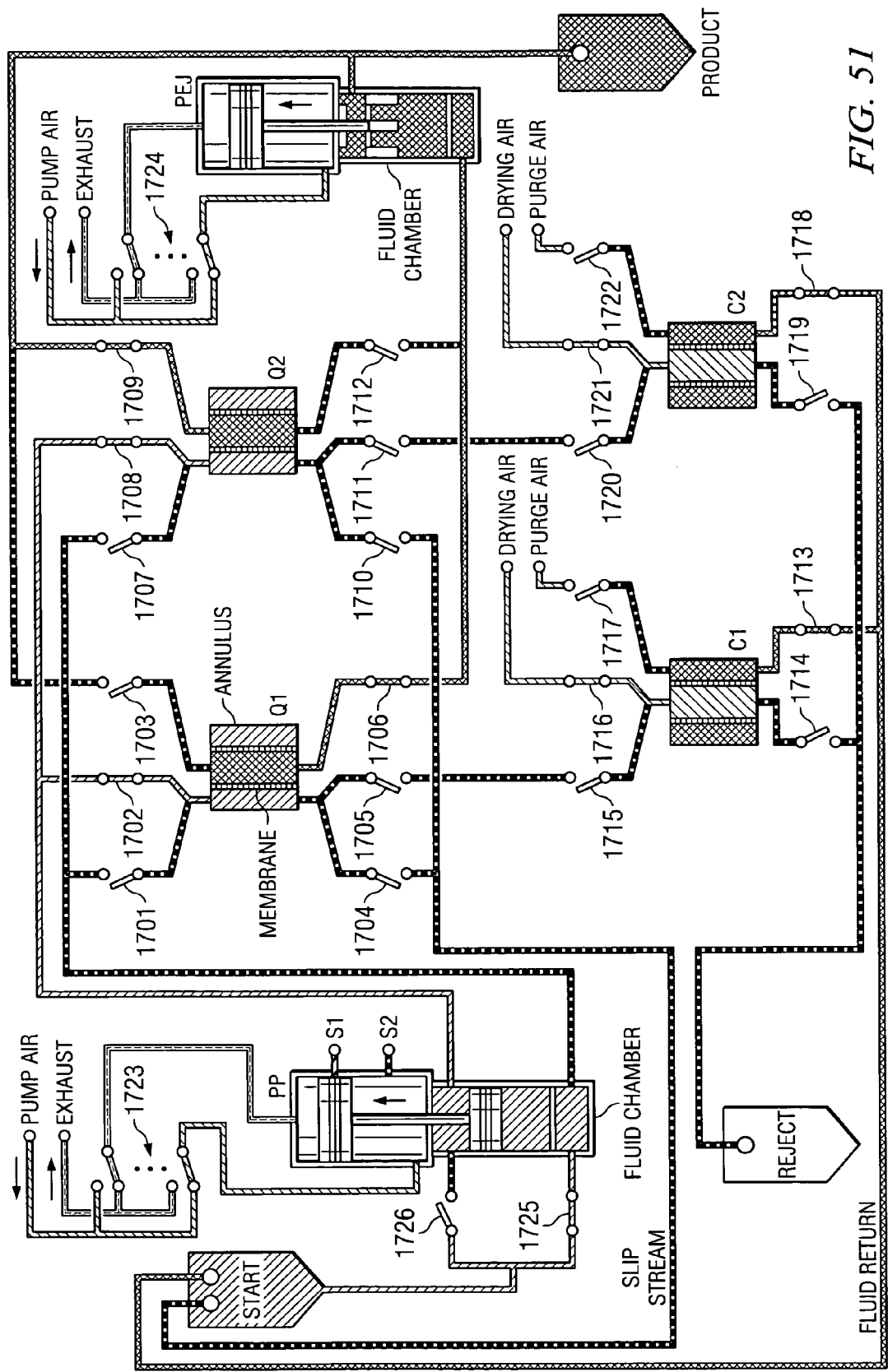

As shown in FIG. 49, waste inflow valve 1720 on concentrator C2 closes, as fluid continues to filter through the concentrator C2 flux cartridge membrane. In FIG. 50, the pneumatic pump continues to cycle as the filter process continues, and drying air poppet valve 1721 opens exposing the waste contents in concentrator C2 to drying air. FIG. 51 depicts the continuation of the filtering cycle, as the pneumatic pump PP continues to cycle.

Figure 52:
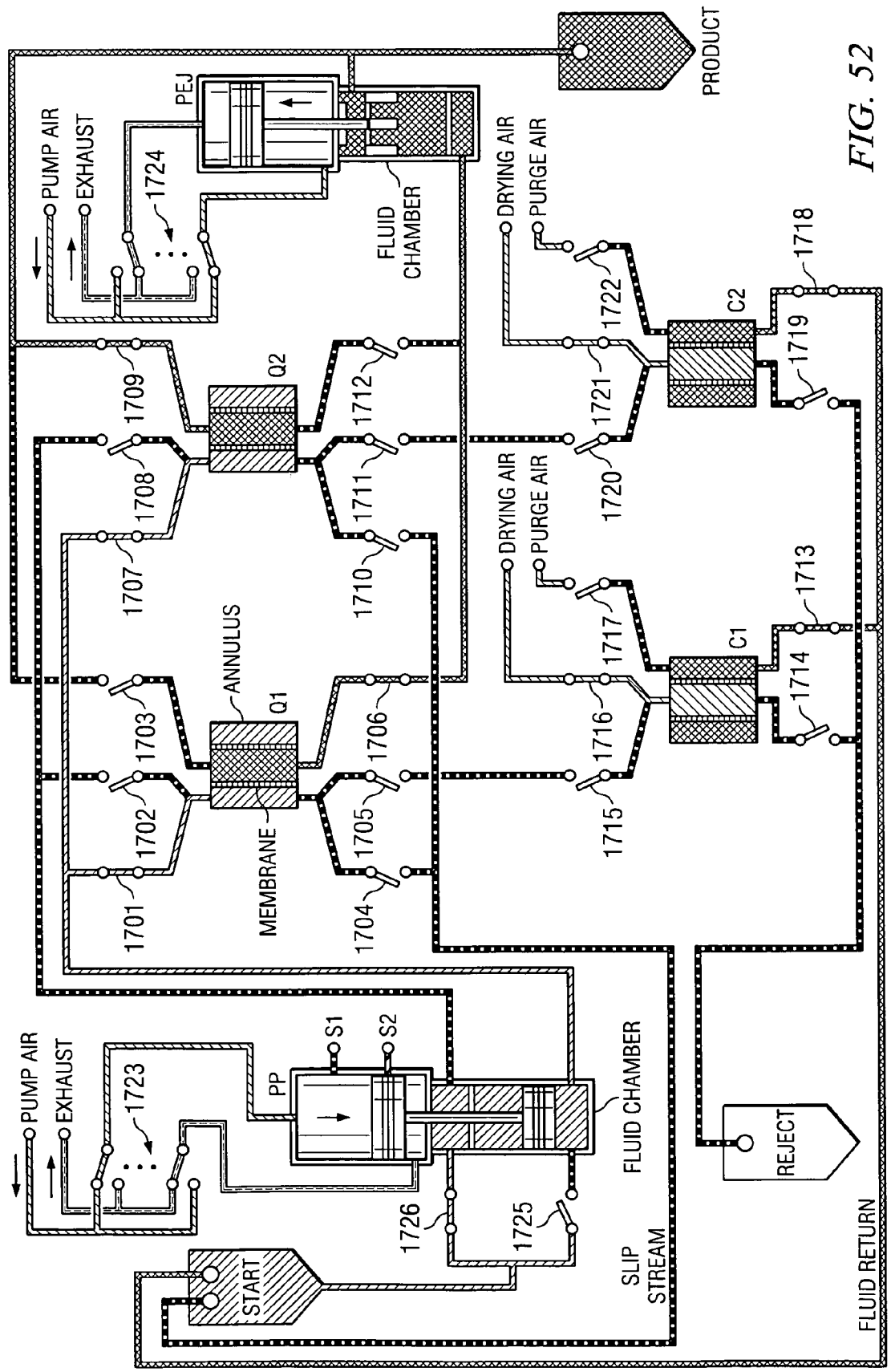
Figure 53:
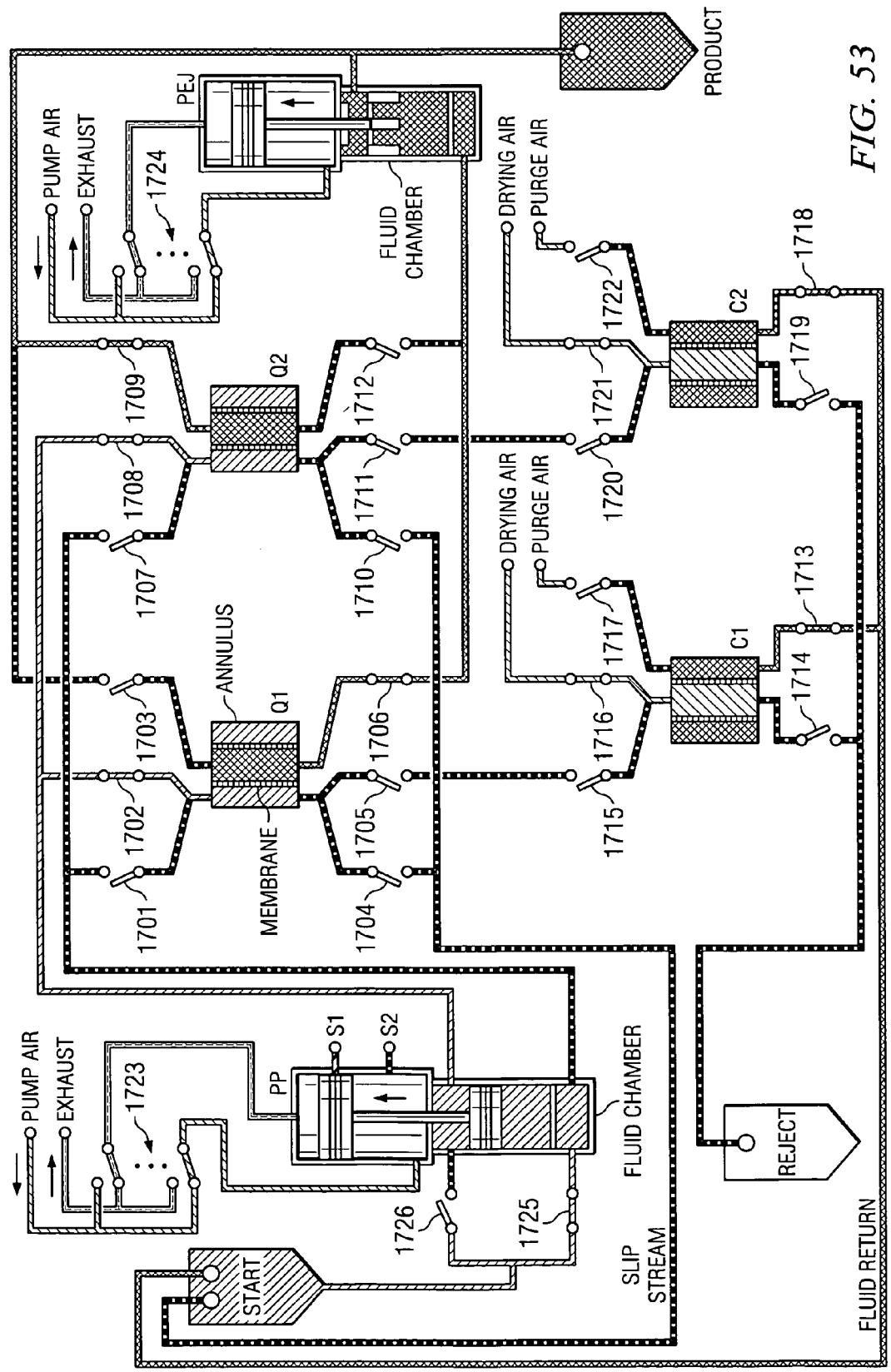
Figure 54:
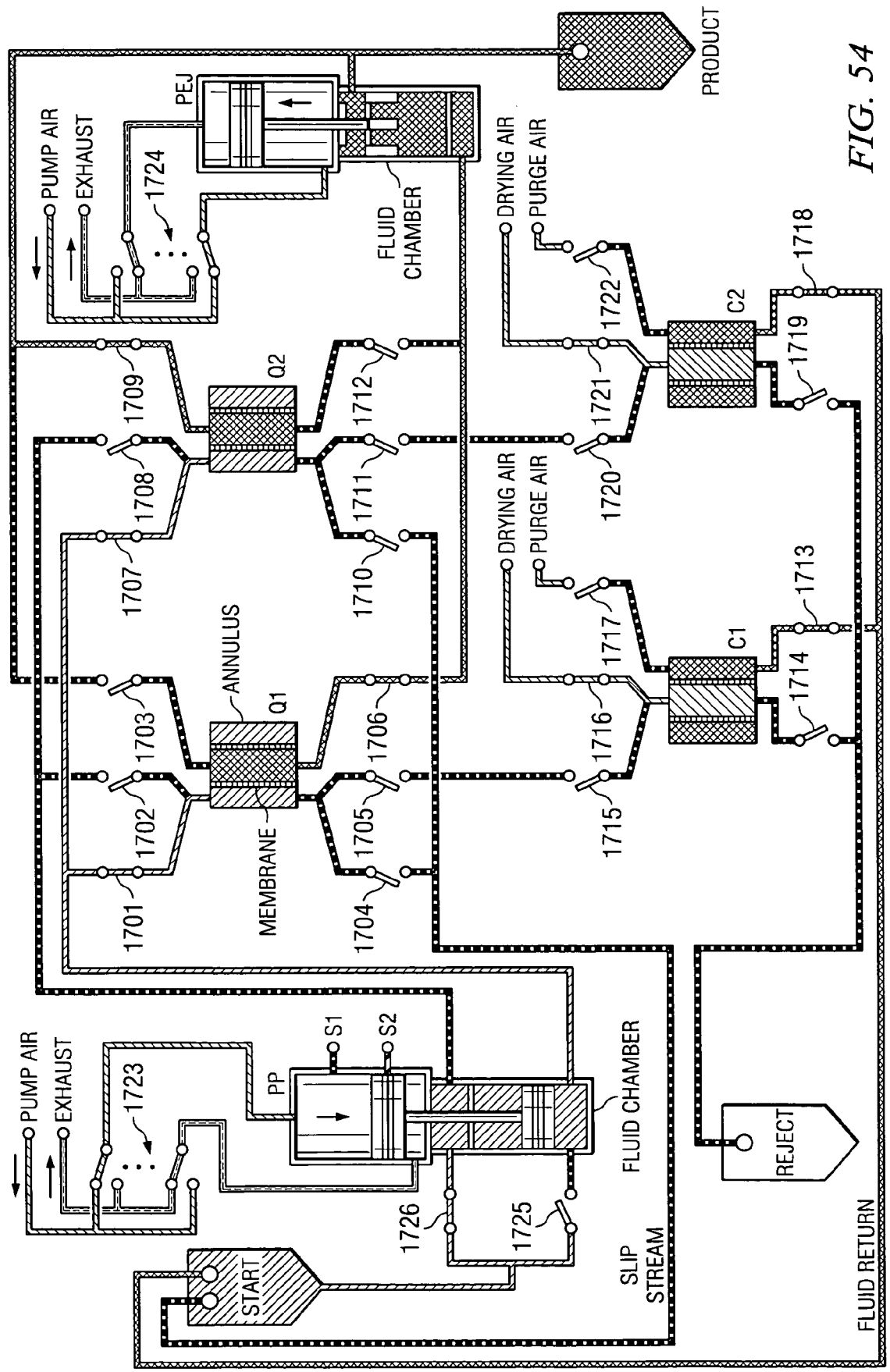
Figure 55:
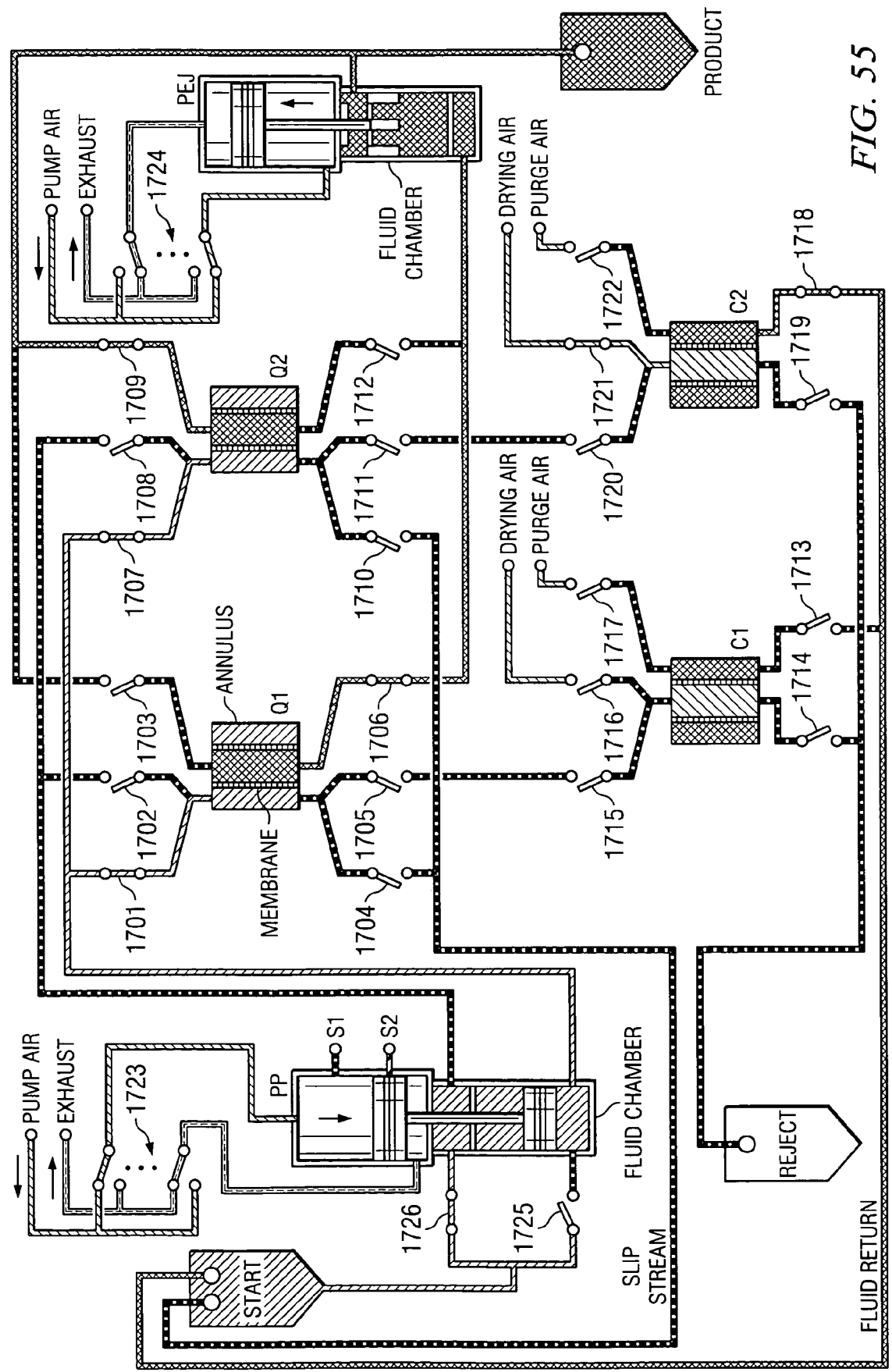

FIGS. 52 and 54 correspond to FIG. 50, and FIG. 53 corresponds to FIG. 51, as the filtration cycles continues and the pneumatic pump PP cycles up and down providing pressure to drive the untreated fluid to be filtered. The process state in FIG. 55 is similar to that of FIG. 51, except poppet valve 1716 on concentrator C1 has closed off the flow of drying air and fluid return valve 1713 has also closed.

Figure 56:
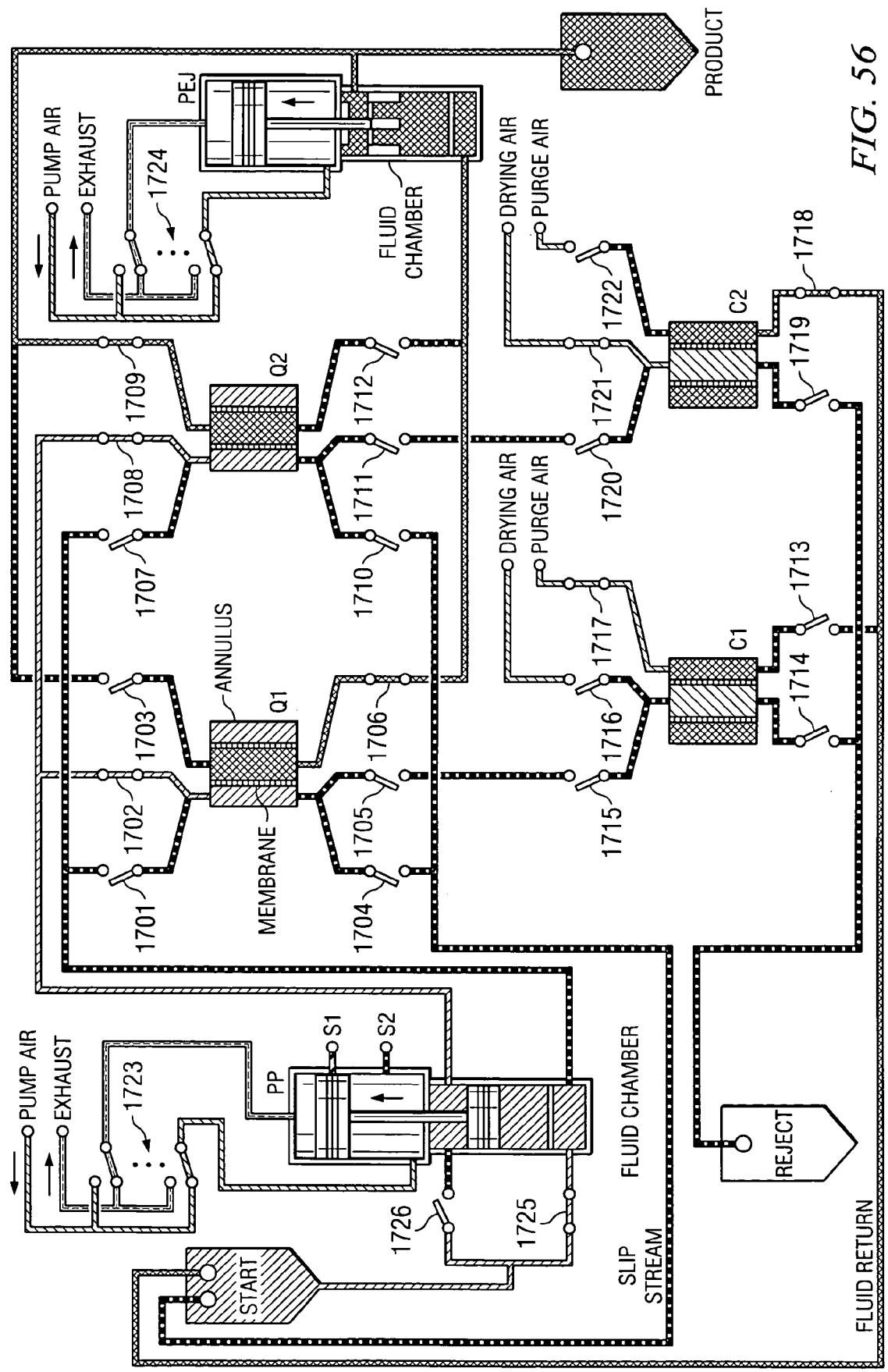
Figure 57:
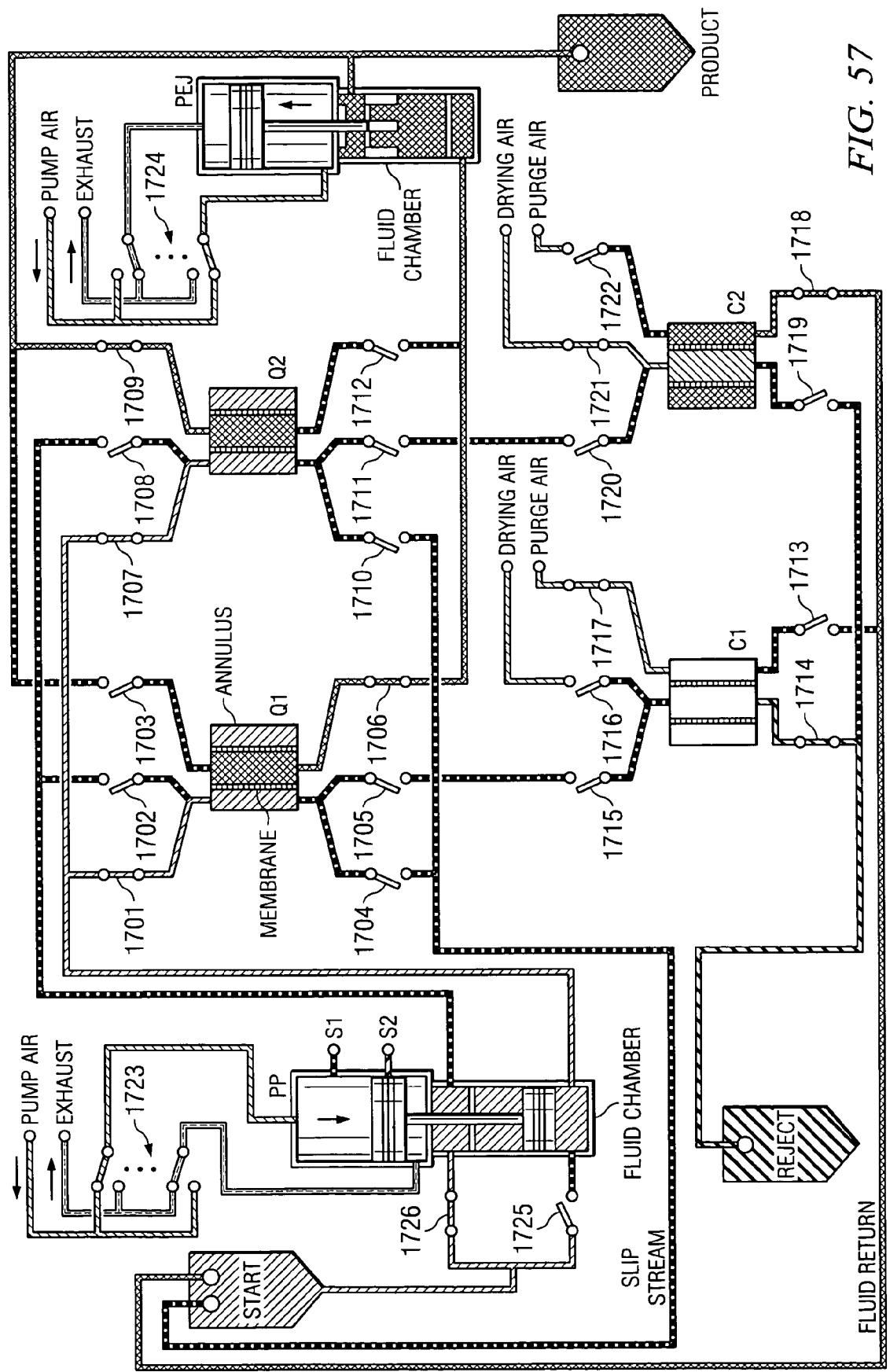
Figure 58:
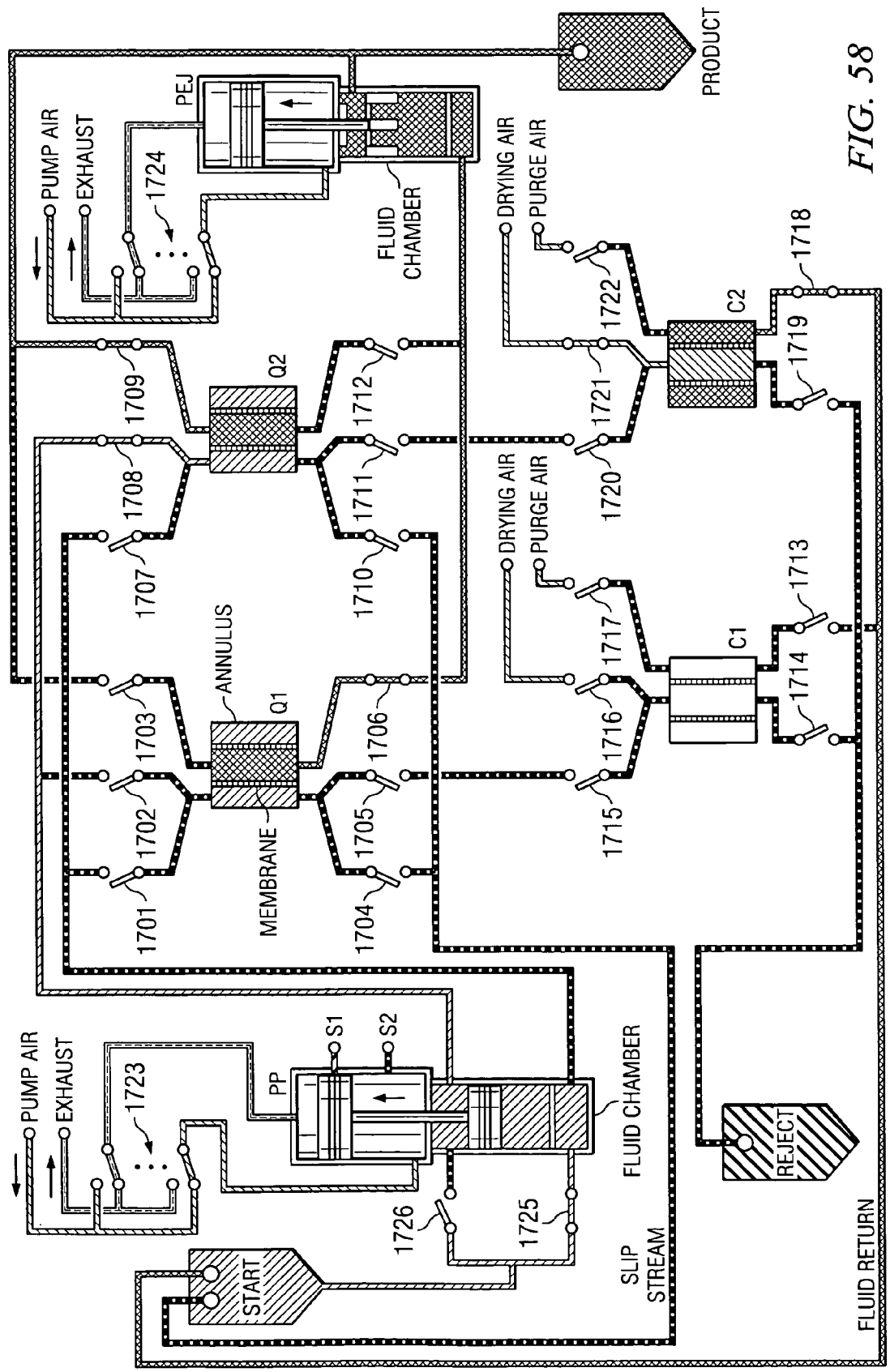

In FIG. 56, the pneumatic pump PP continues to cycle and valve 1717 on concentrator C1 opens, allowing purging air to pressurize the concentrator C1. As shown in FIG. 57, the pneumatic pump PP is shown in the downstroke position and reject outflow valve 1714 opens, thereby creating a pressure differential that flushes the waste out of the concentrator C1 and into a reject collection tank. As the pneumatic pump PP cycles and begins an upstroke as shown in FIG. 58, fluid flow into separator filter pod Q1 is cut off in anticipation of another ejection flush. Waste outflow valve 1714 on concentrator C1 is also closed.

Figure 59:
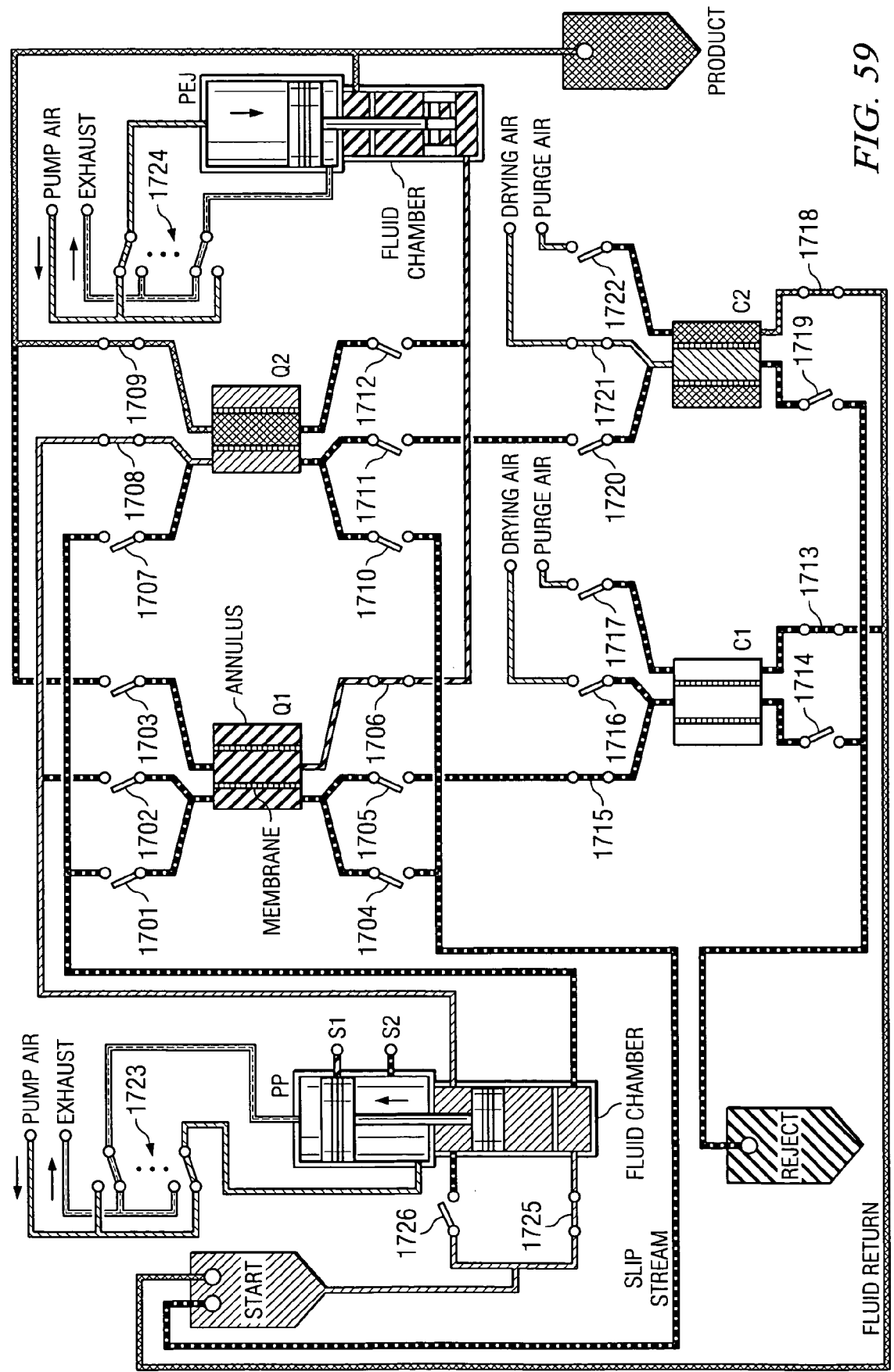
Figure 60:
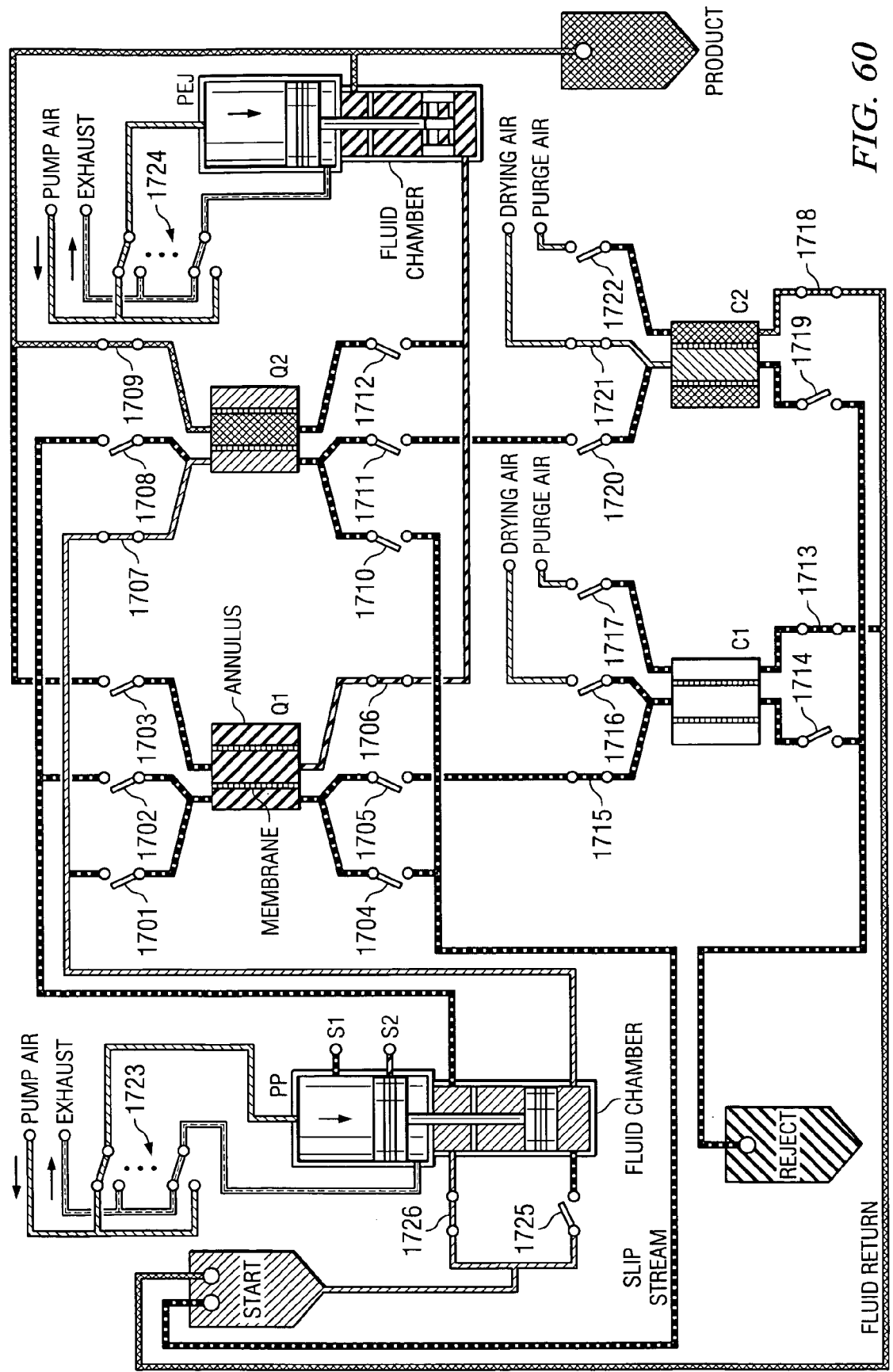
Figure 61:
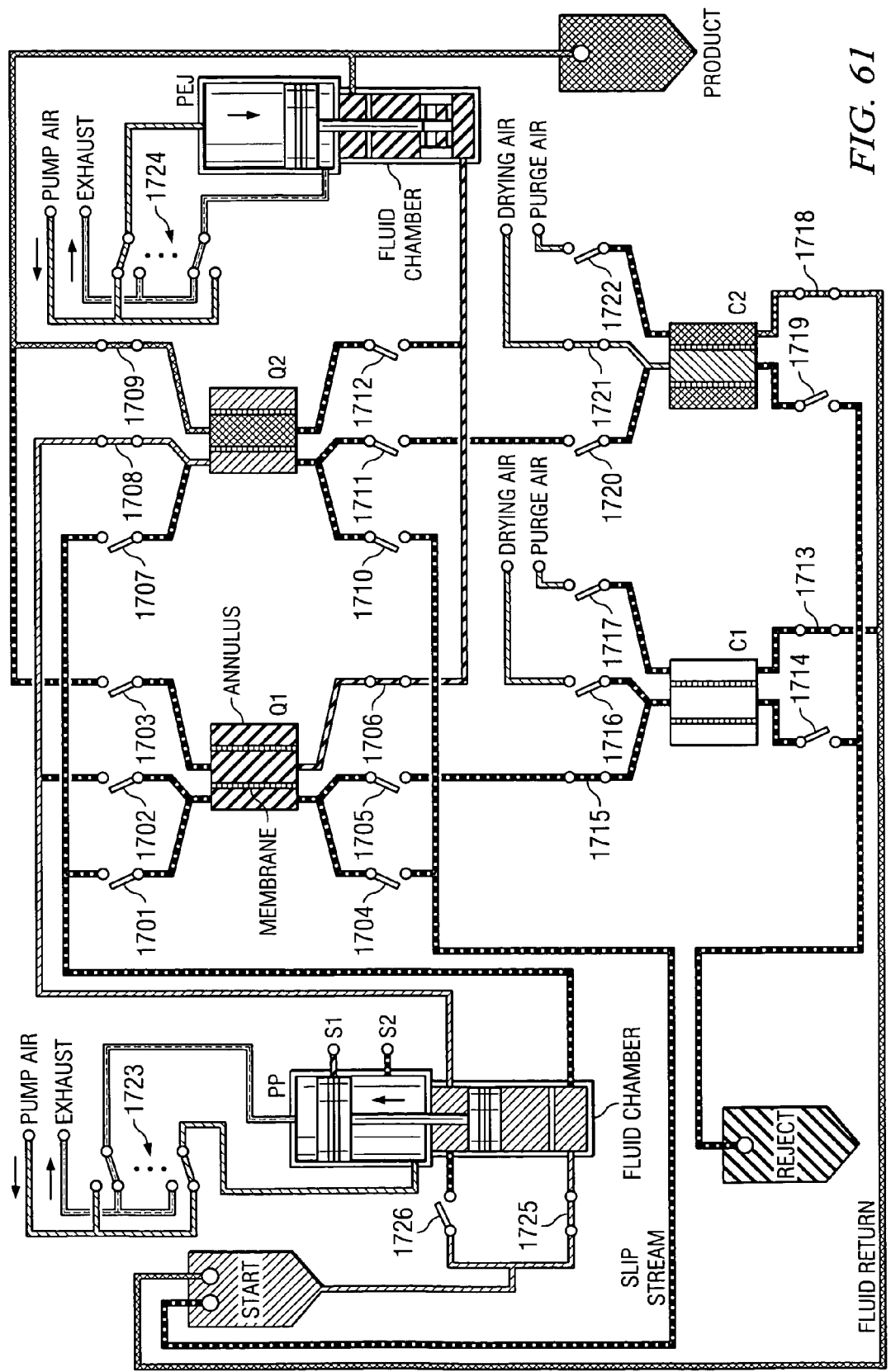
Figure 62:
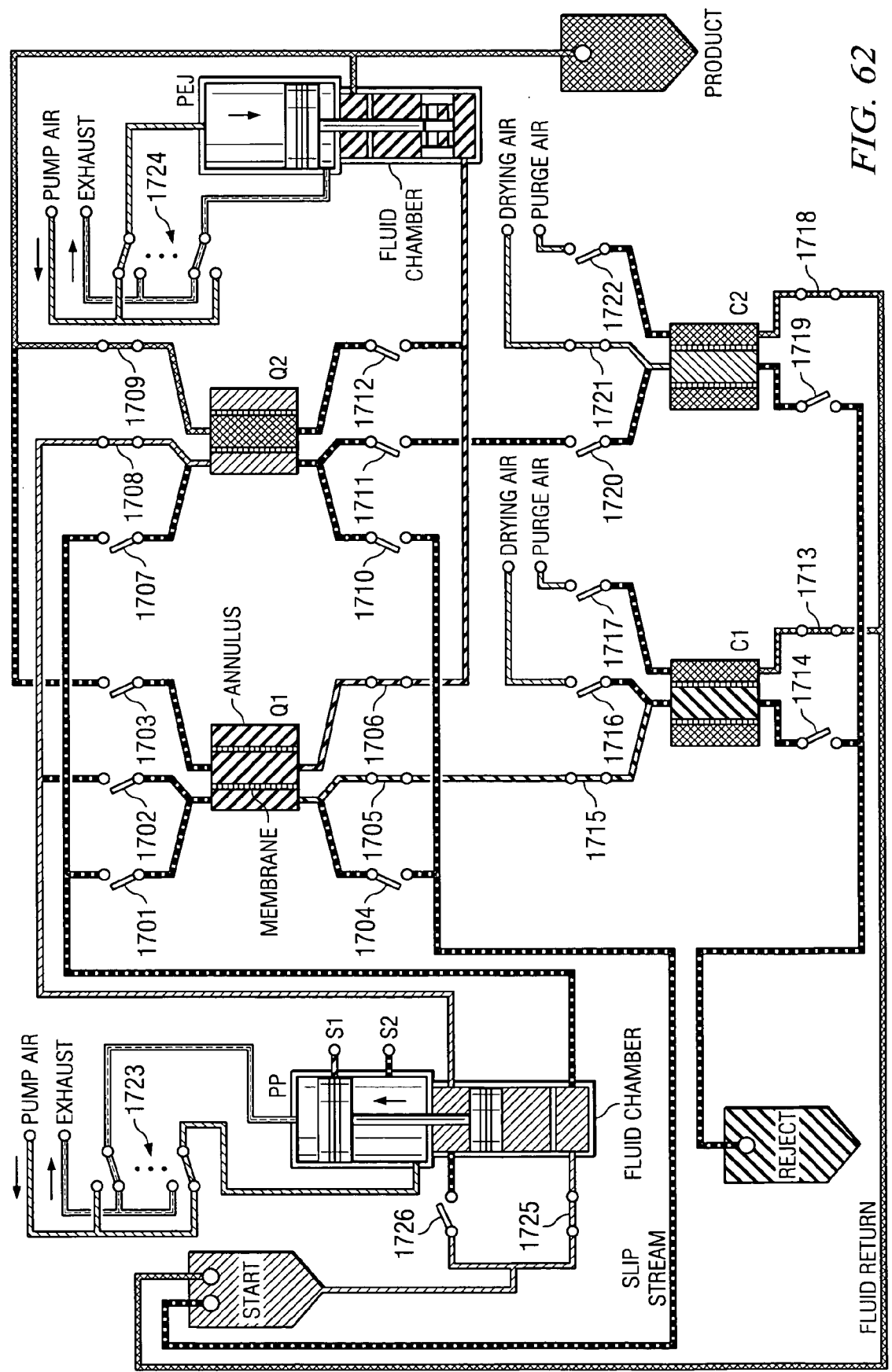
Figure 63:
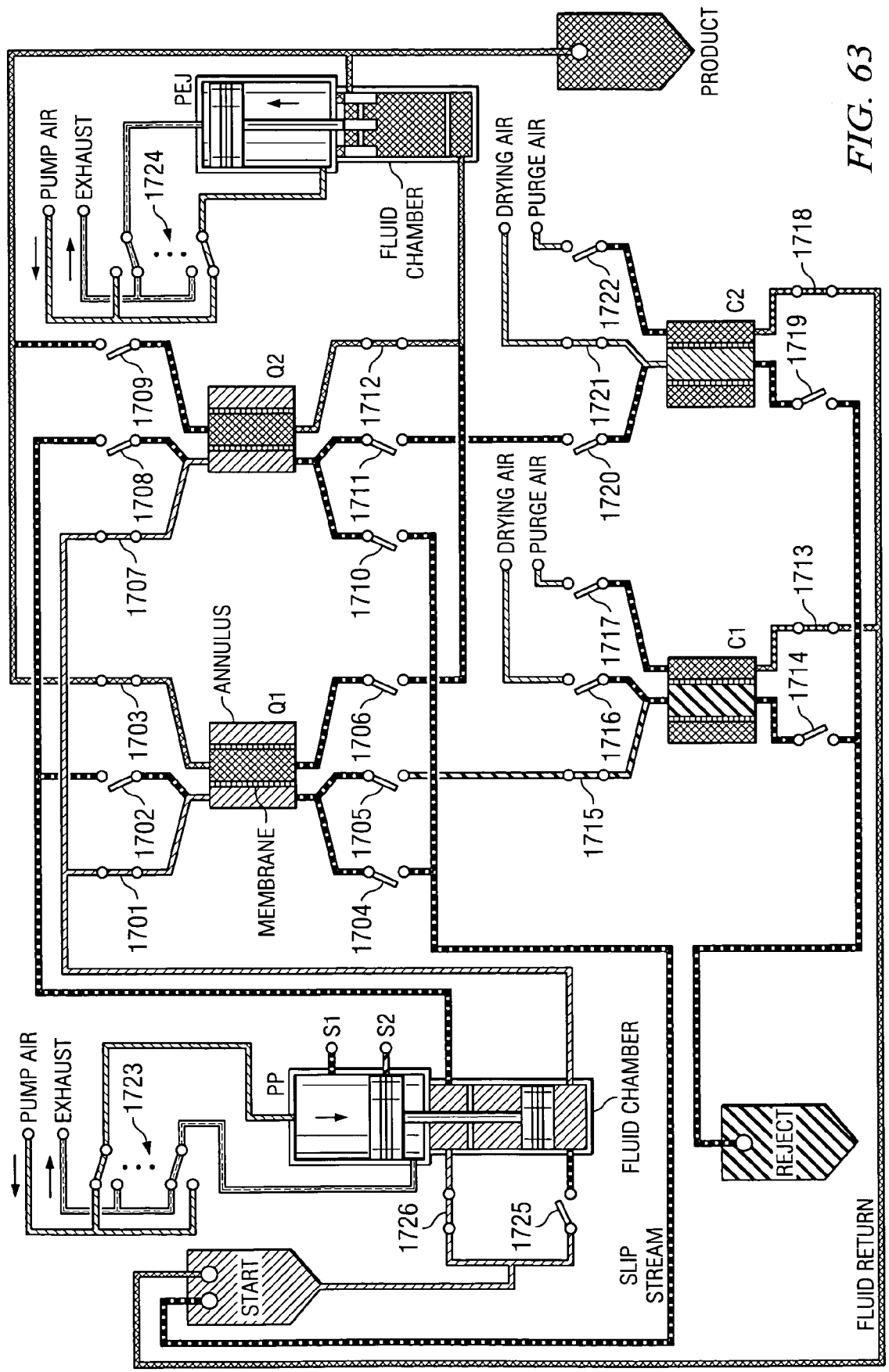
Figure 64:
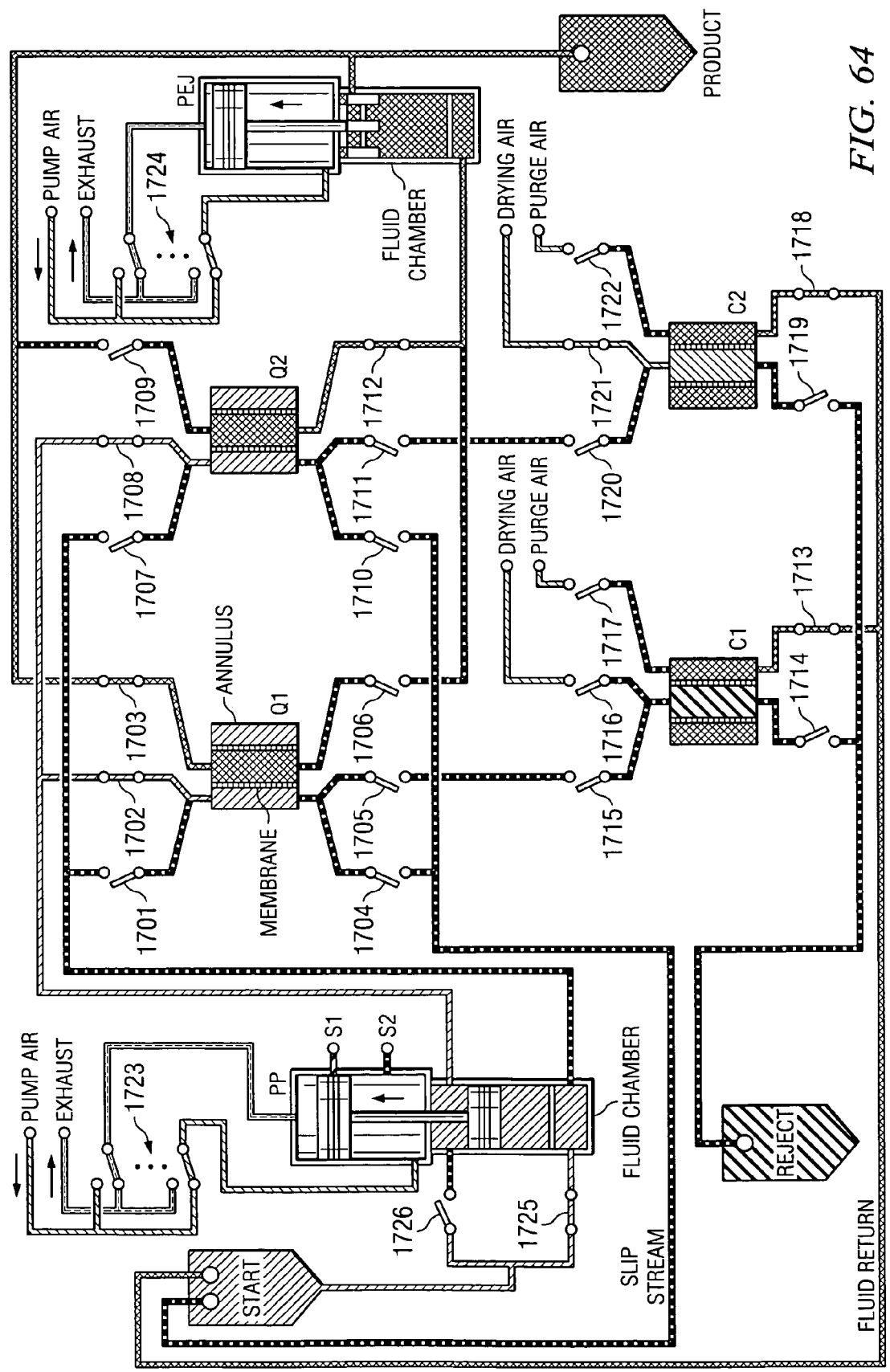
Figure 65:
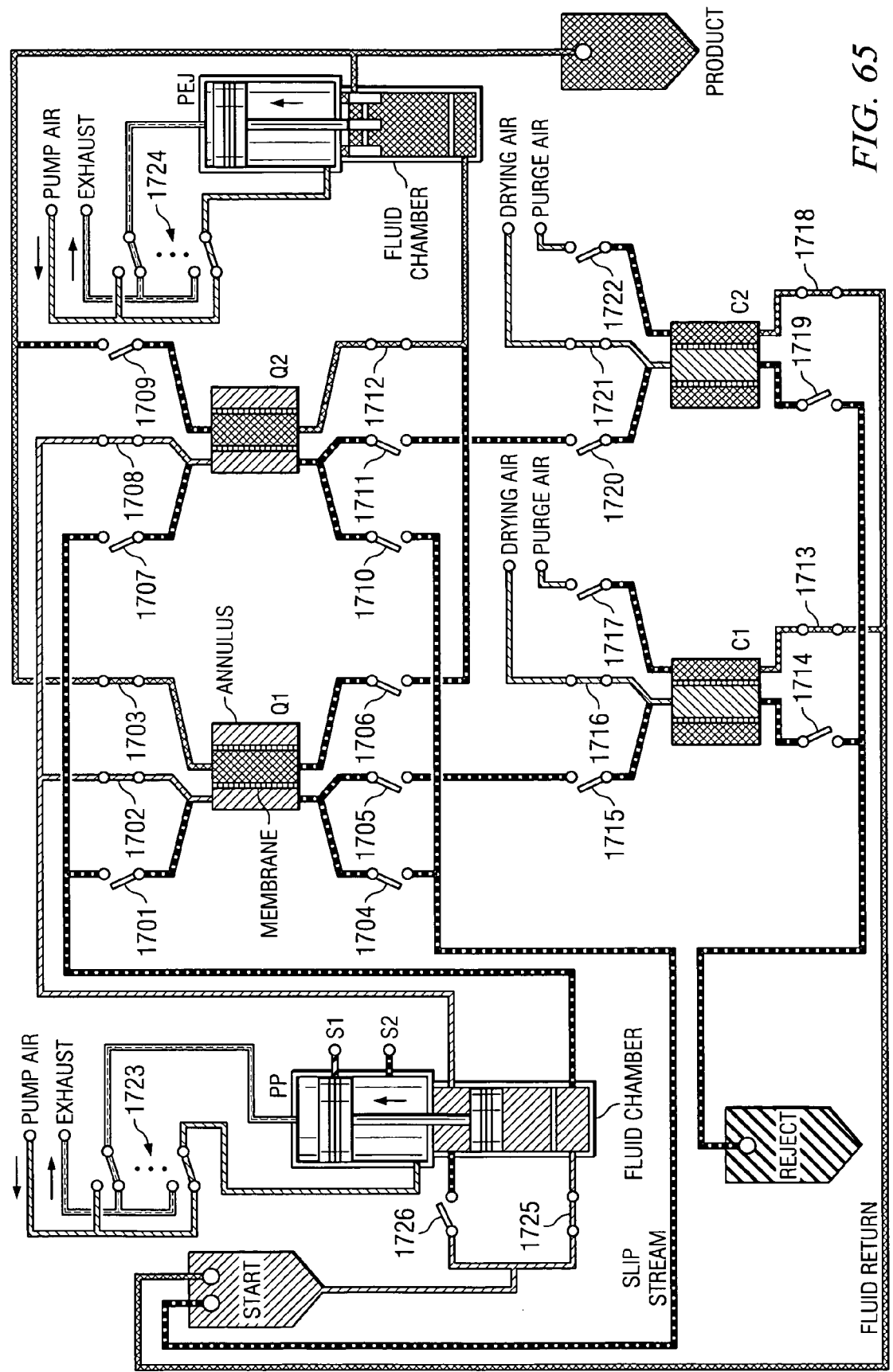
Figure 66:
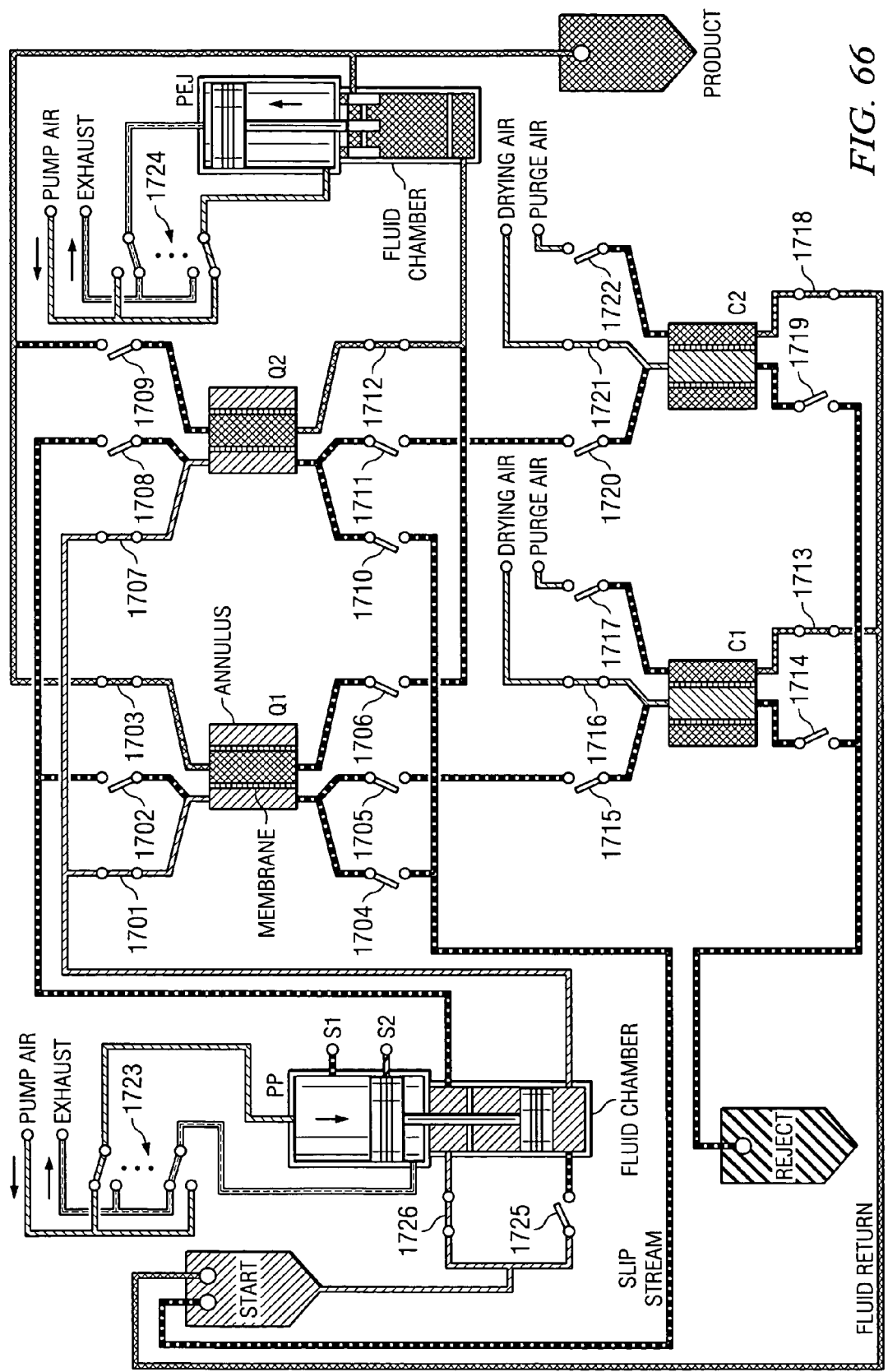
Figure 67:
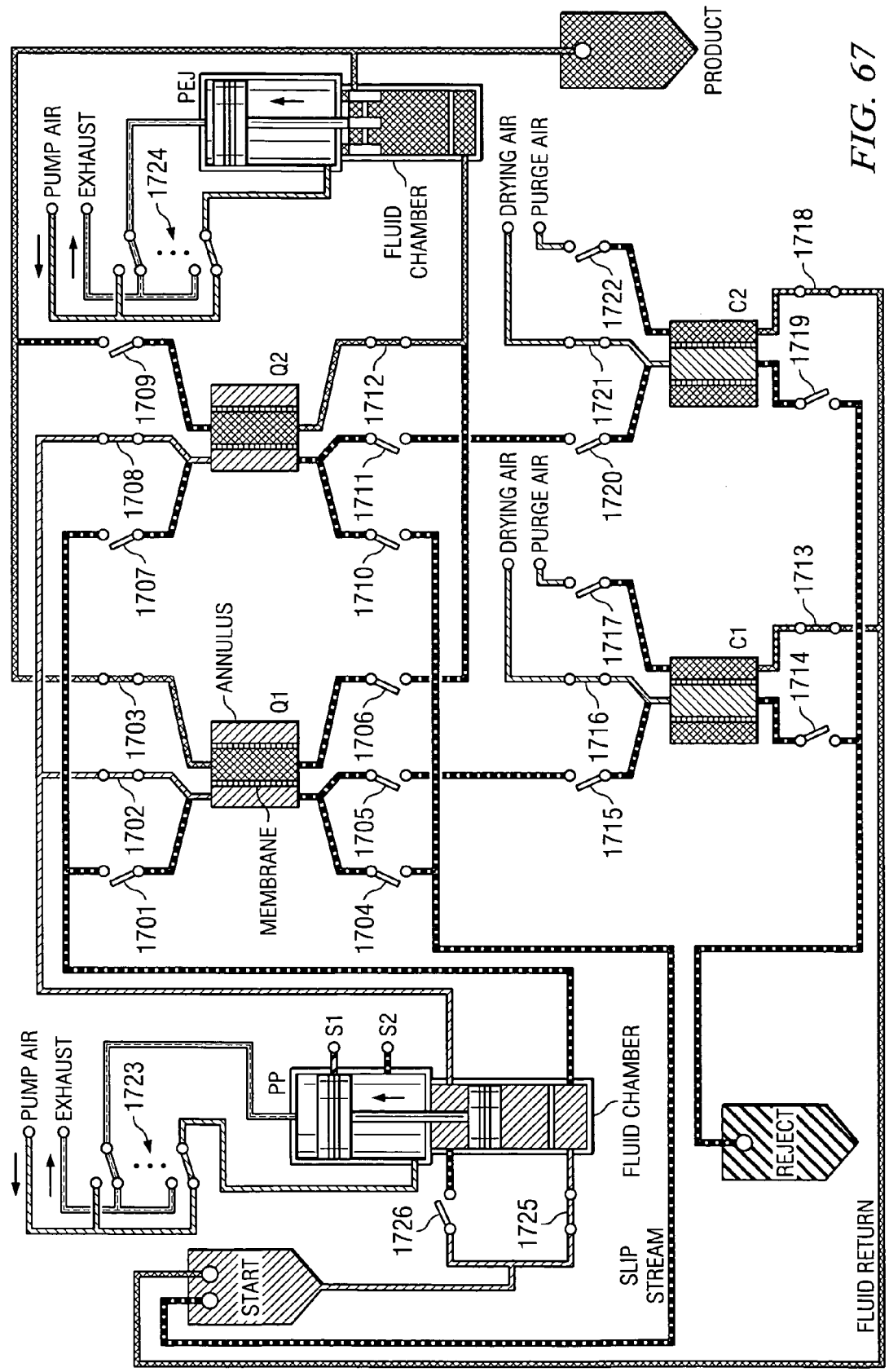
Figure 68:
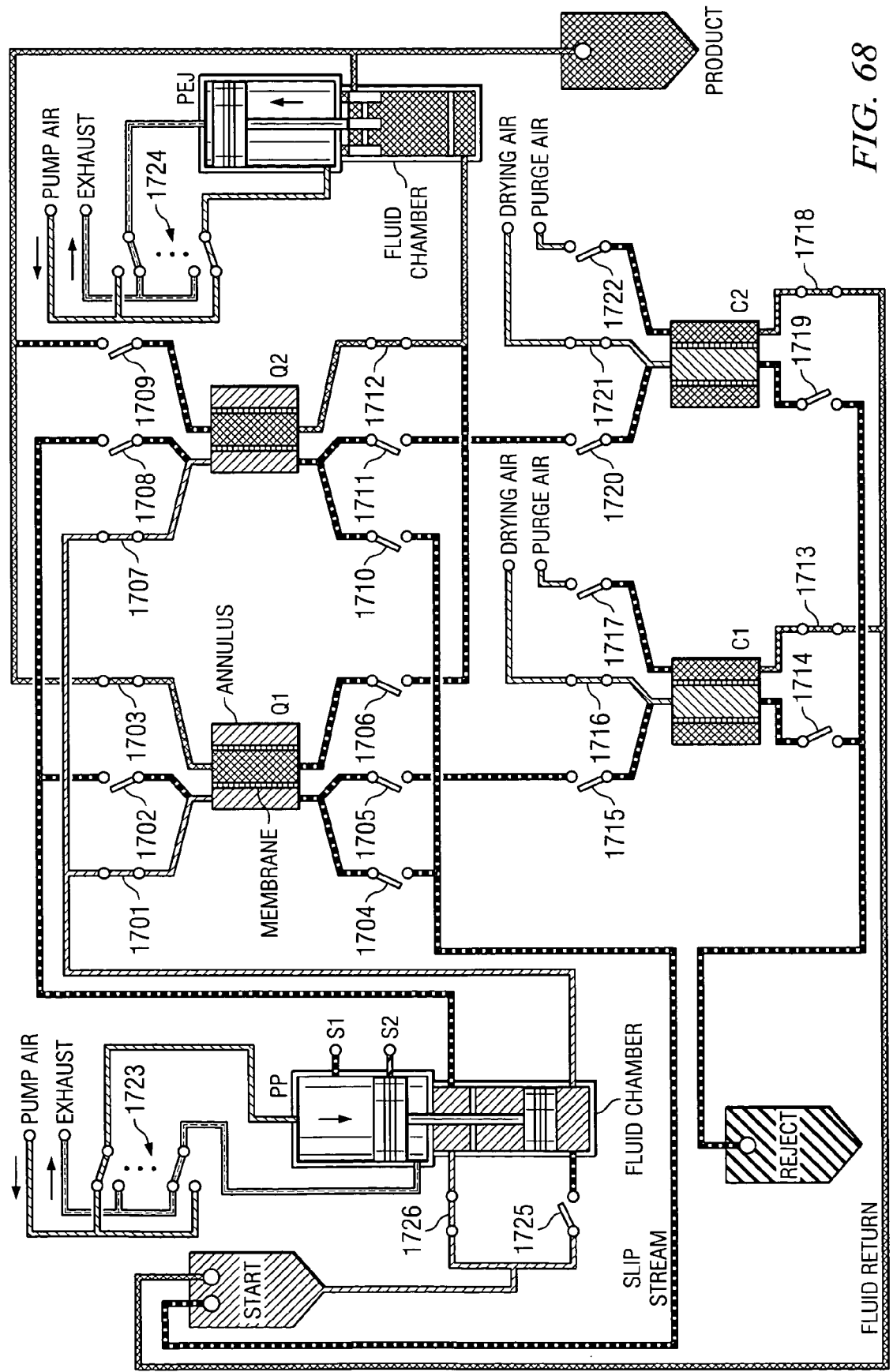
Figure 69:
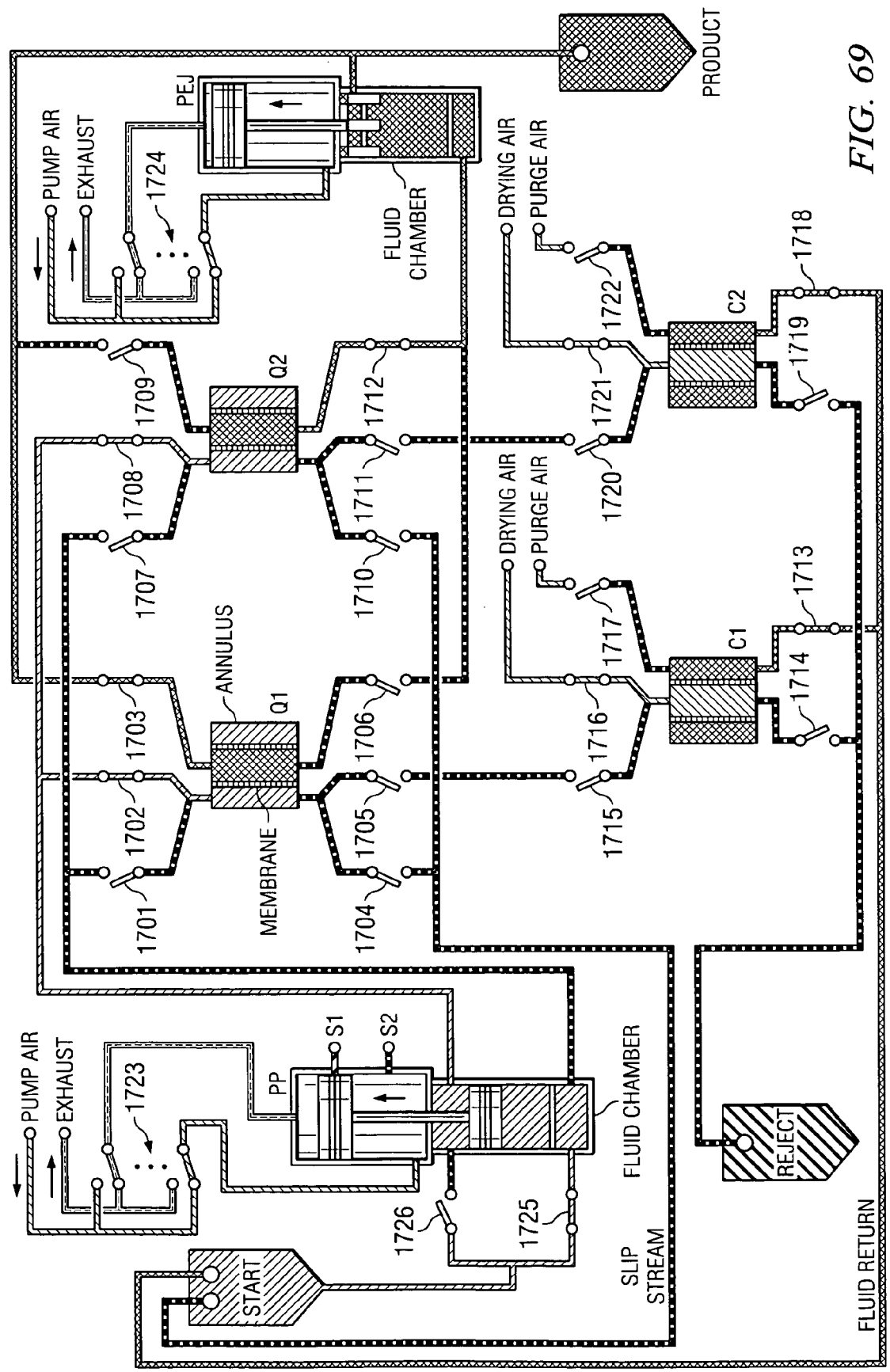

FIG. 59 depicts the beginning of a second reverse flush of separator filter pod Q1 as the ejector pump PEJ piston cycles downward and forces fluid back through the separator flux cartridge membrane. Poppet valves 1715 and 1713 on concentrator C1 open again in anticipation of the ejection of waste from separator pod Q1.

Figure 71:
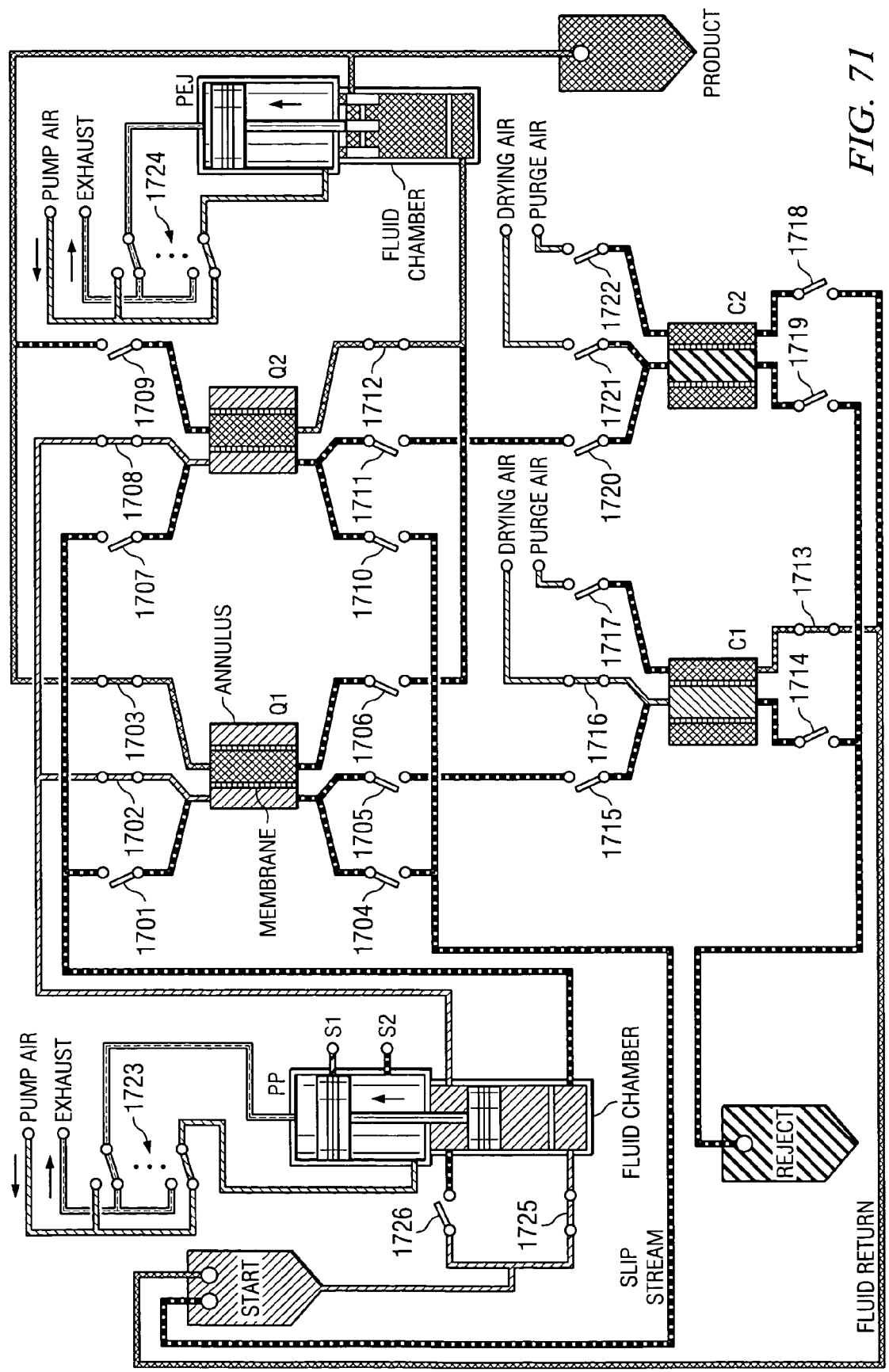
Figure 72:
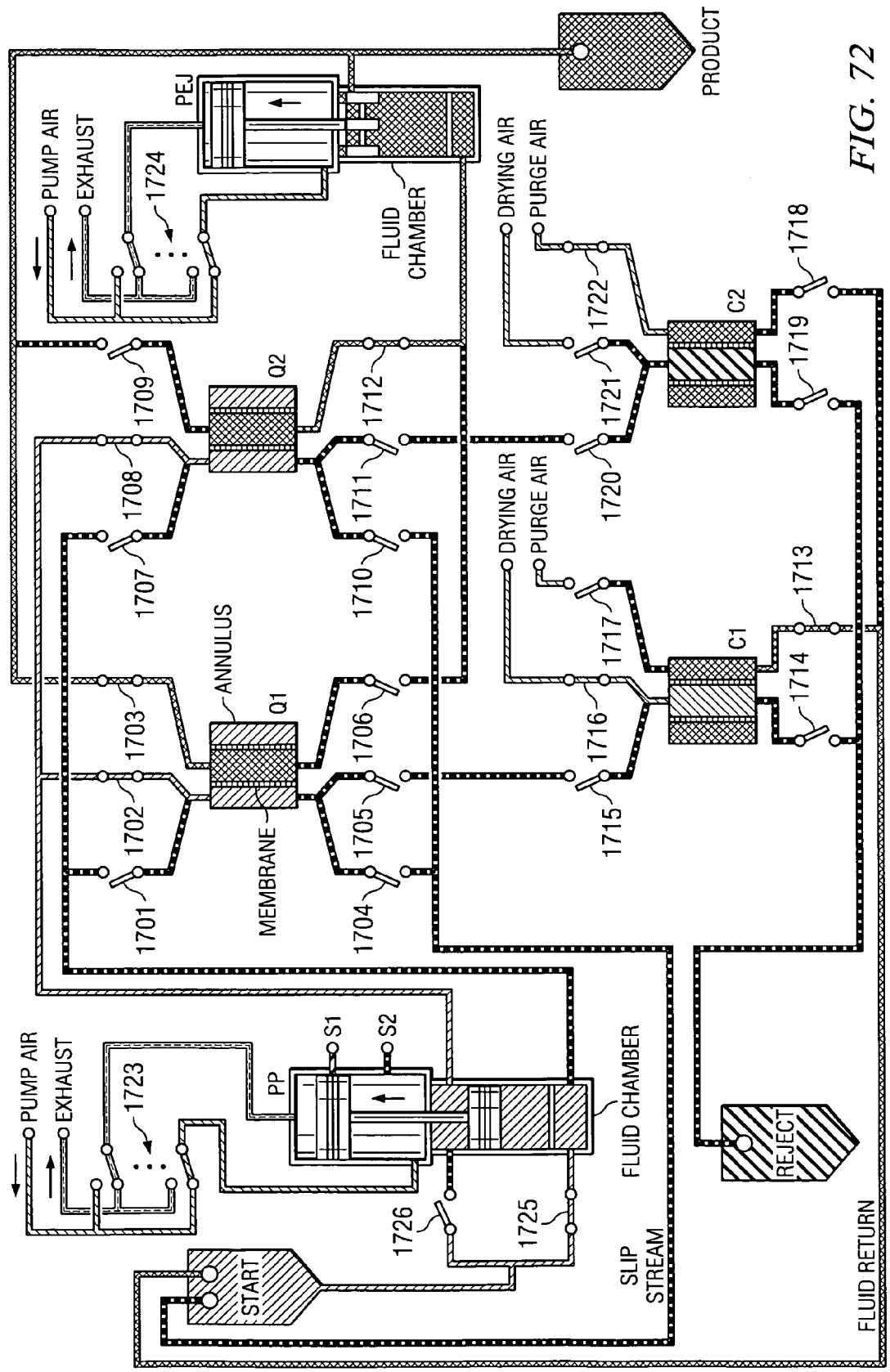

The sequence of states depicted in FIGS. 60-70 is similar to that of FIGS. 29-39, except for the waste material present in concentrator C2 in FIGS. 60-70. After the second ejection flush of separator filter pod Q1, the ejector bypass configuration switches again, and a new filtration cycle begins with Q1 using ejector bypass valve 1703, and separator filter pod Q2 using fluid outflow valve 1712 to the ejector PEJ. Waste from the second flush of separator filter pod Q1 is filtered and dried in concentrator C1, while waste from the first flush of separator filter pod Q2 continues to dry in concentrator C2. As the filtration cycle continues as depicted in FIG. 71, drying air valve 1721 and fluid return valve 1718 on concentrator C2 close in anticipation of the purge air cycle. FIG. 72 depicts the purge air valve 1722 on concentrator C2 opening in preparation for the introduction of purge air into concentrator C2.

Figure 73:
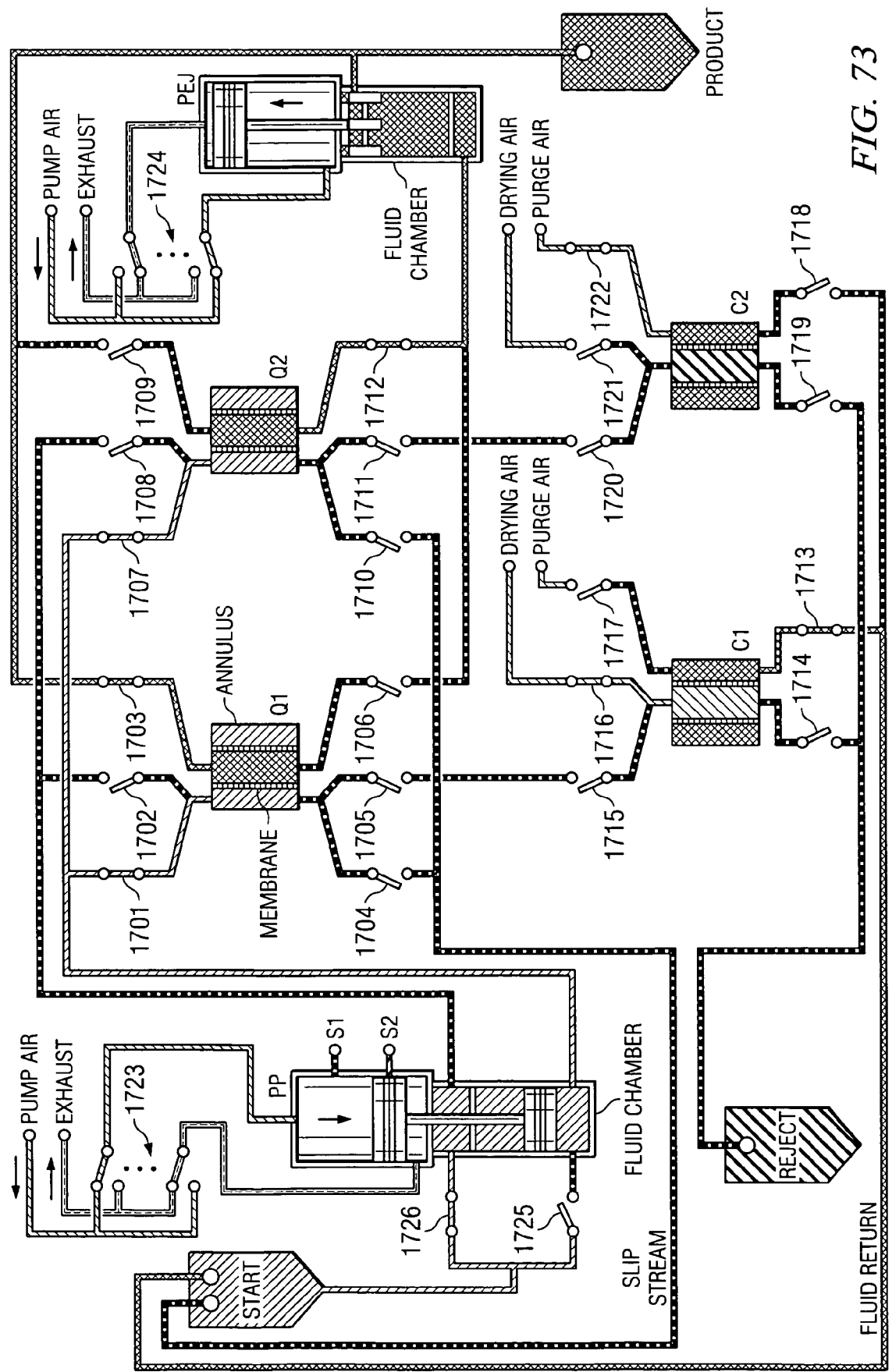
Figure 74:
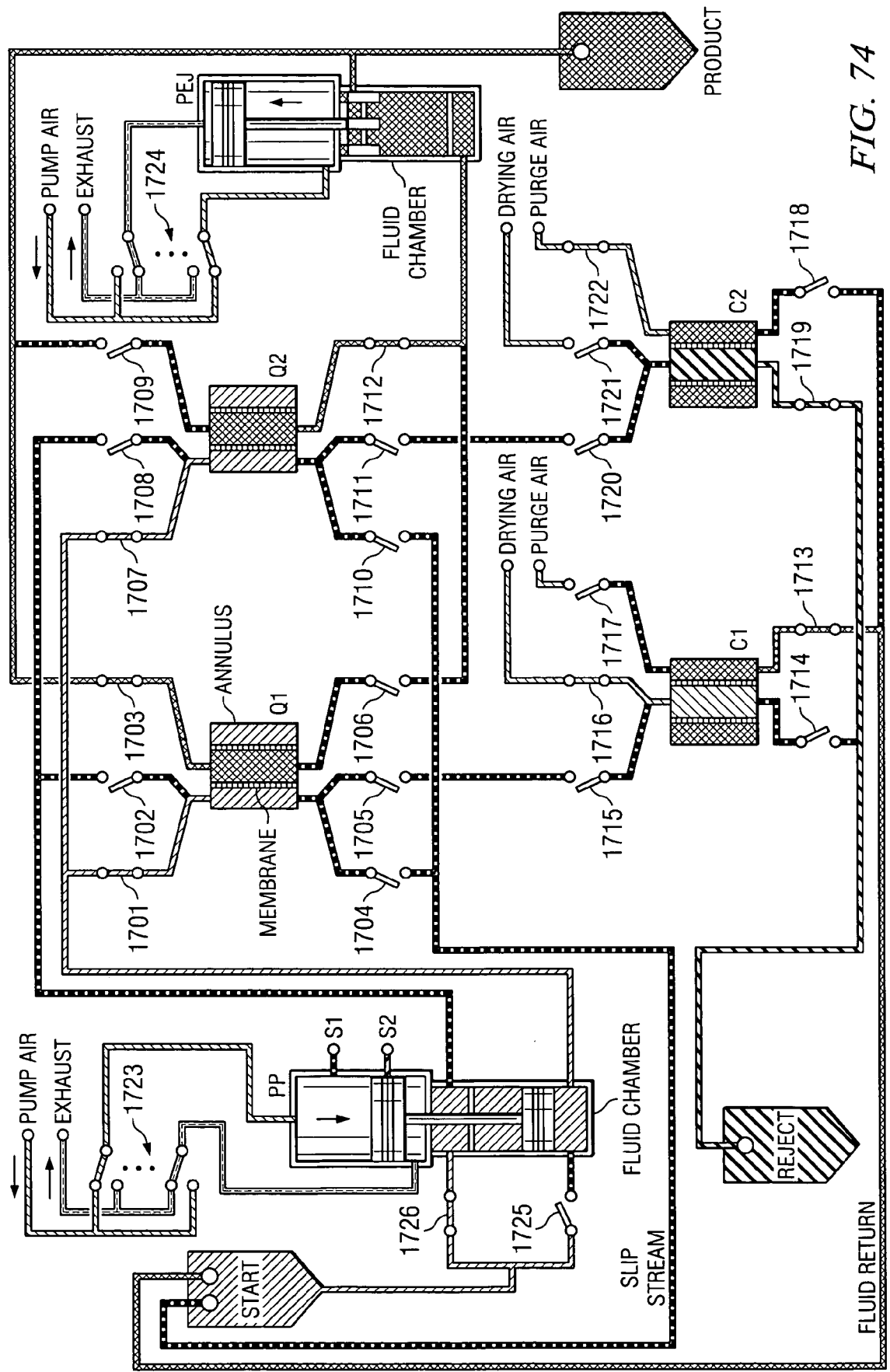

The state depicted in FIG. 73 is a continuation of FIG. 72. As the pneumatic pump PP cycles, waste in concentrator C1 continues to dry, while the introduction of purge air into concentrator C2 pressurizes the waste collected within the concentrator C2 flux cartridge. In FIG. 74, the reject outflow valve 1719 on concentrator C2 opens, creating a pressure differential and allowing the pressurized waste residue to escape into the reject collection tank. Also, poppet valve 1713 is opened, allowing the drying air and any fluid located in the fluid ring of concentrator C1 to be transported to the start fluid tank for recycling through the system.

Figure 75:
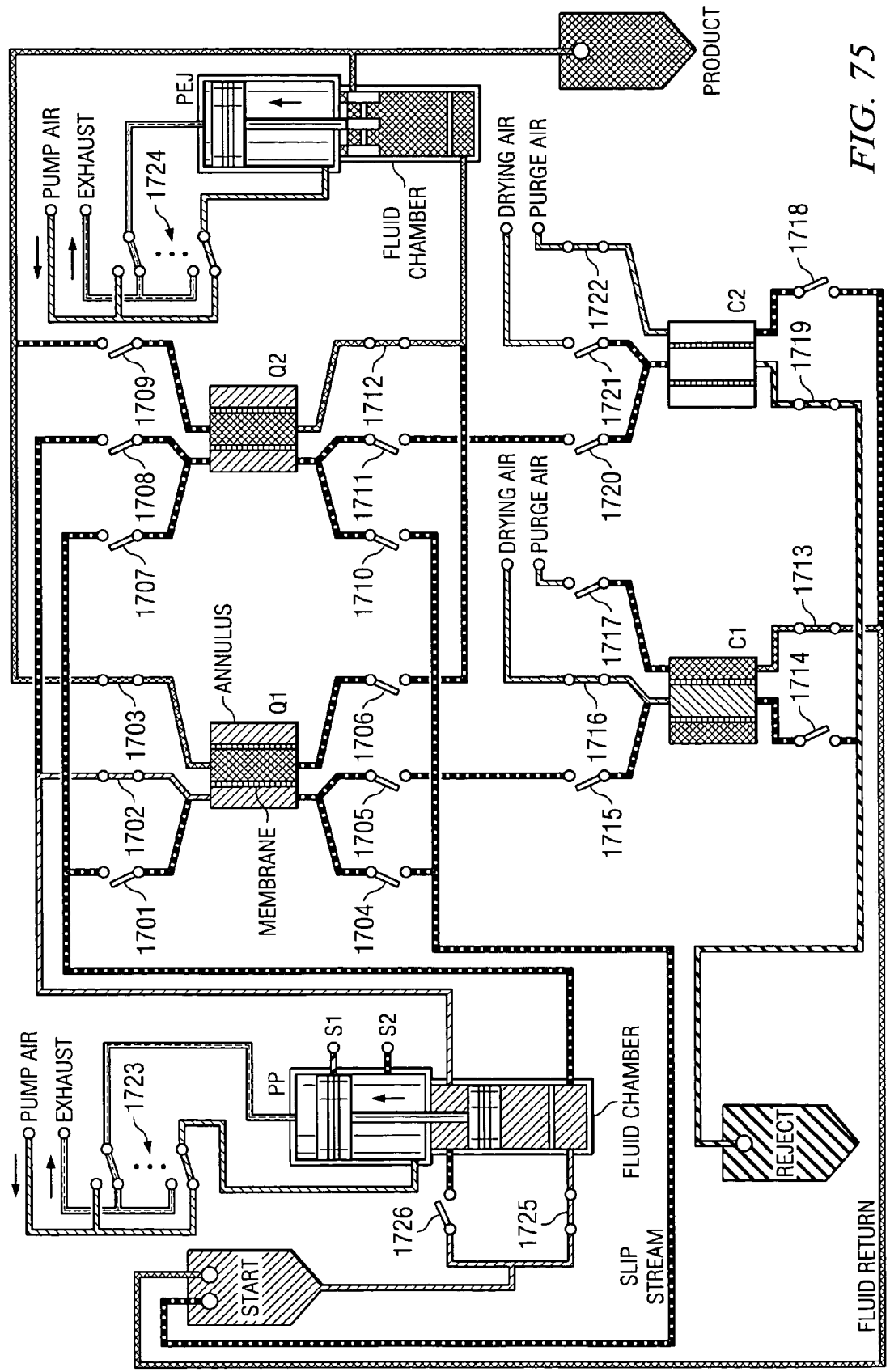

In the state depicted in FIG. 75, the remainder of the waste in concentrator C2 moves into the reject tank. As the pneumatic pump PP continues to cycle and enters an upstroke movement, fluid flow to separator filter pod Q2 is cut off by the close of poppet valve 1707 in anticipation of a second reverse ejection flush.

Figure 76:
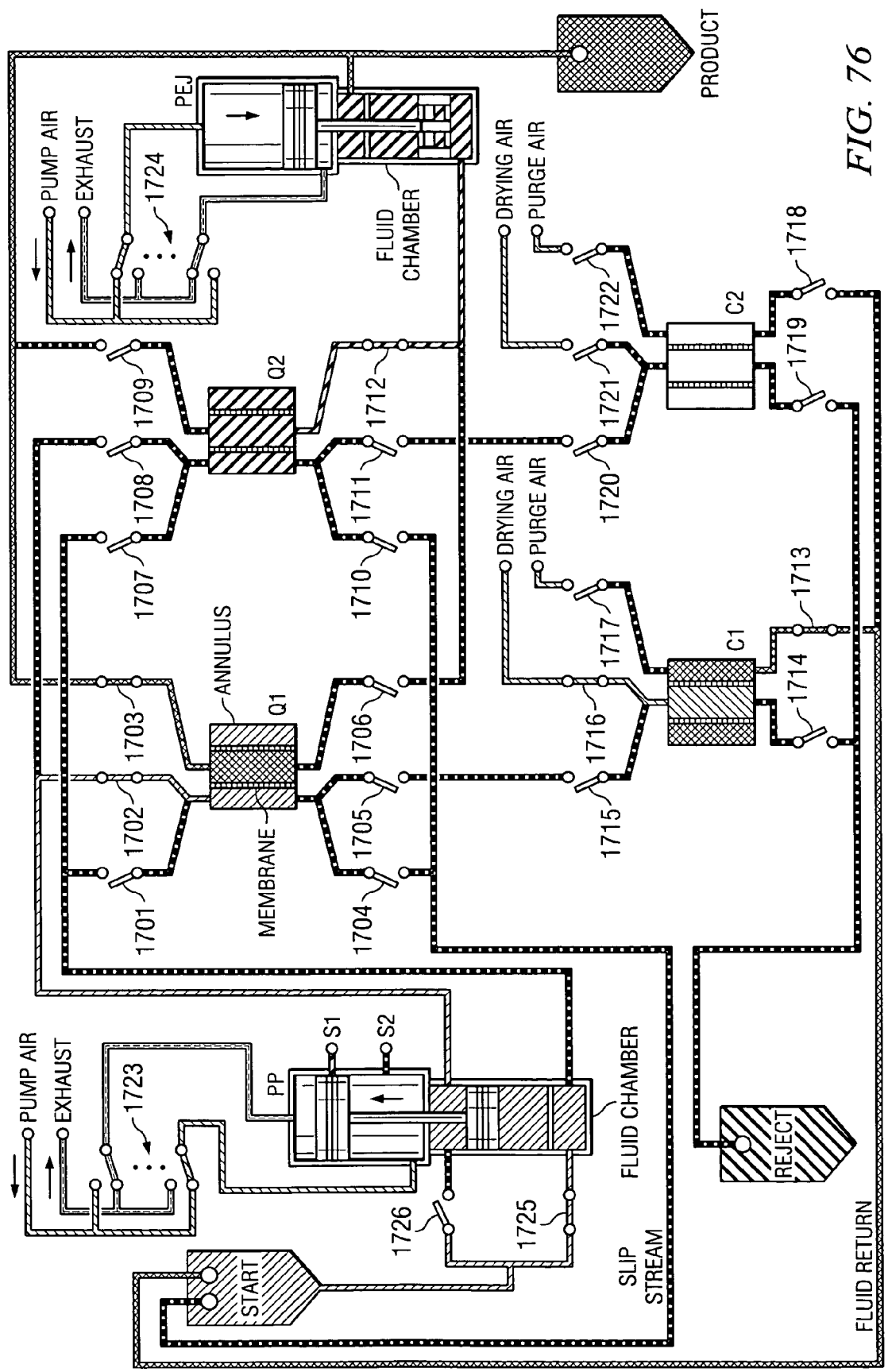

In FIG. 76 the ejector PEJ pumps fluid back through the membrane of separator filter pod Q2. Both the purge air valve 1722 and reject outflow valve 1719 on concentrator C2 close. As the reverse flush cycle of separator filter pod Q2 continues in FIG. 77, waste inflow valve 1720 and fluid return valve 1718 on concentrator C2 open in anticipation of the waste material to be flushed out of Q2. Separator filter pod Q1 continues its normal filtration cycle as fluid inflow valve 1702 closes and valve 1701 opens. The waste residue in concentrator C1 continues to dry.

Figure 77:
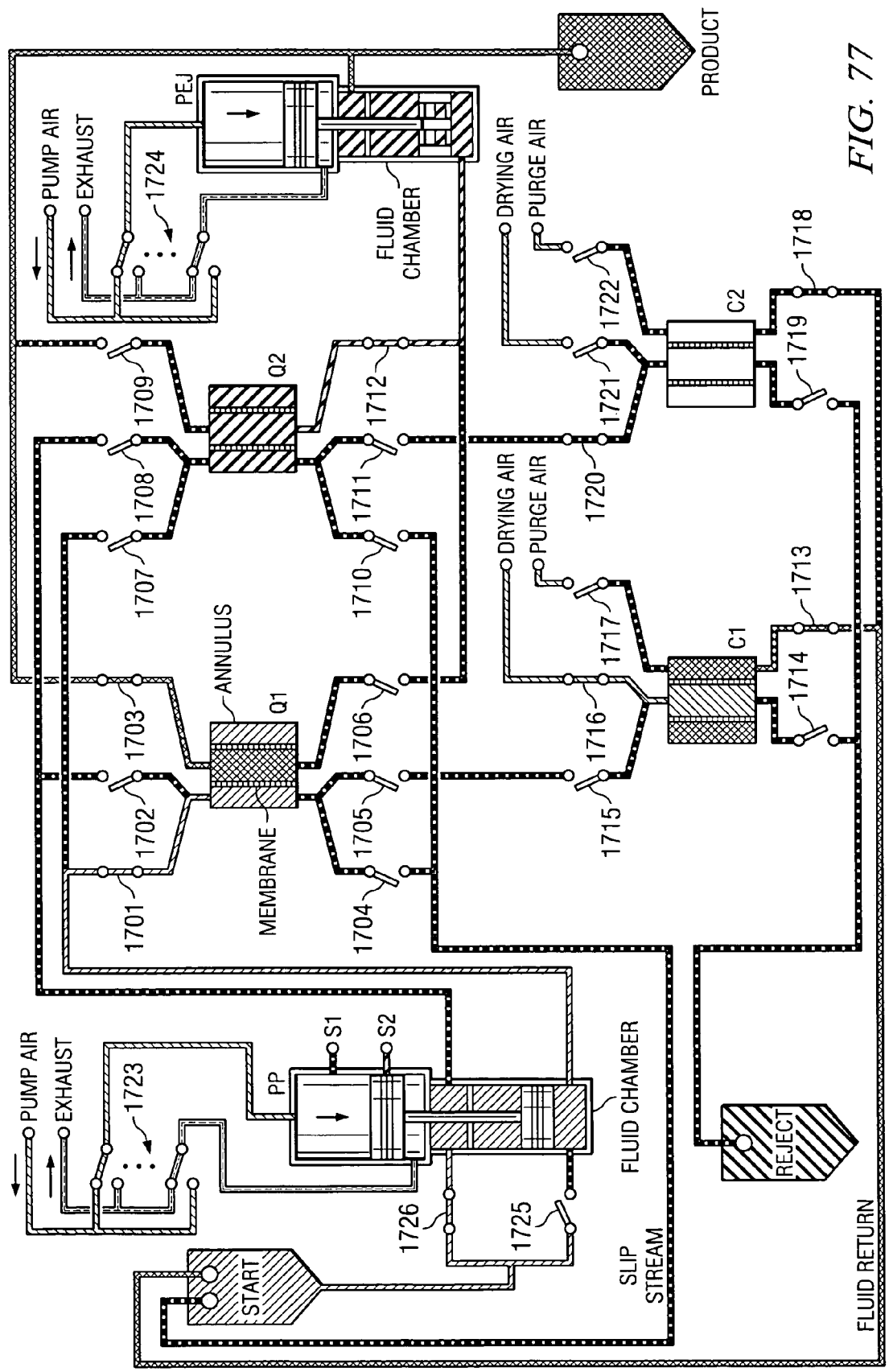
Figure 78:
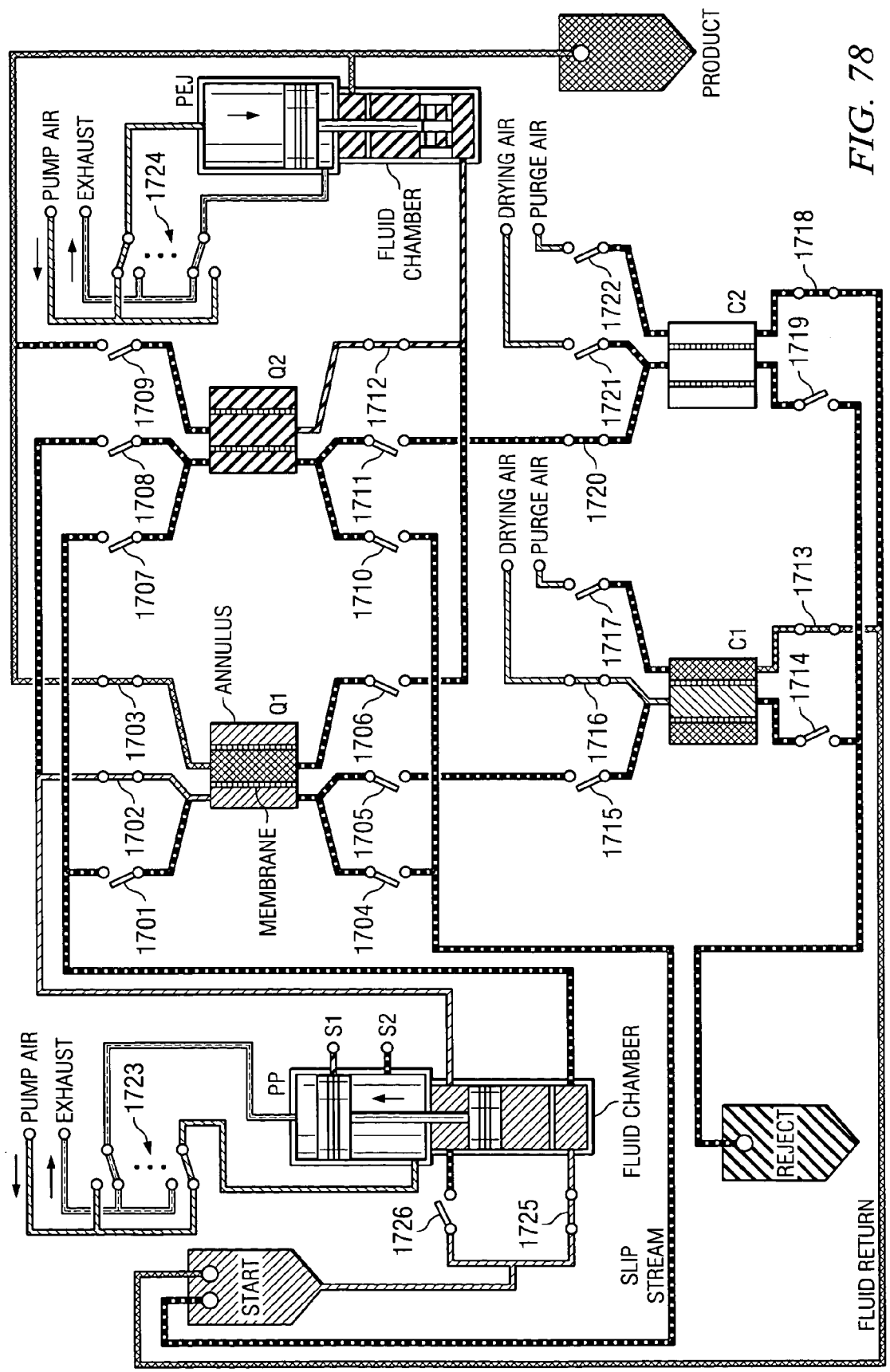

FIG. 78 continues the filtration and ejection cycles depicted in FIG. 77, with separator filter pod Q2 remaining under positive pressure from the ejector PEJ and the pneumatic pump PP switching direction as fluid inflow to filter Q1 switches from valve 1701 to 1702. As shown in FIG. 79, the waste outflow valve 1711 on separator filter pod Q2 opens, allowing the waste material to be flushed into the concentrator C2.

The process disclosed herein continues until the desired components are removed or separated from the untreated fluid tank or as desired by the operator of the system.

Figure 80:
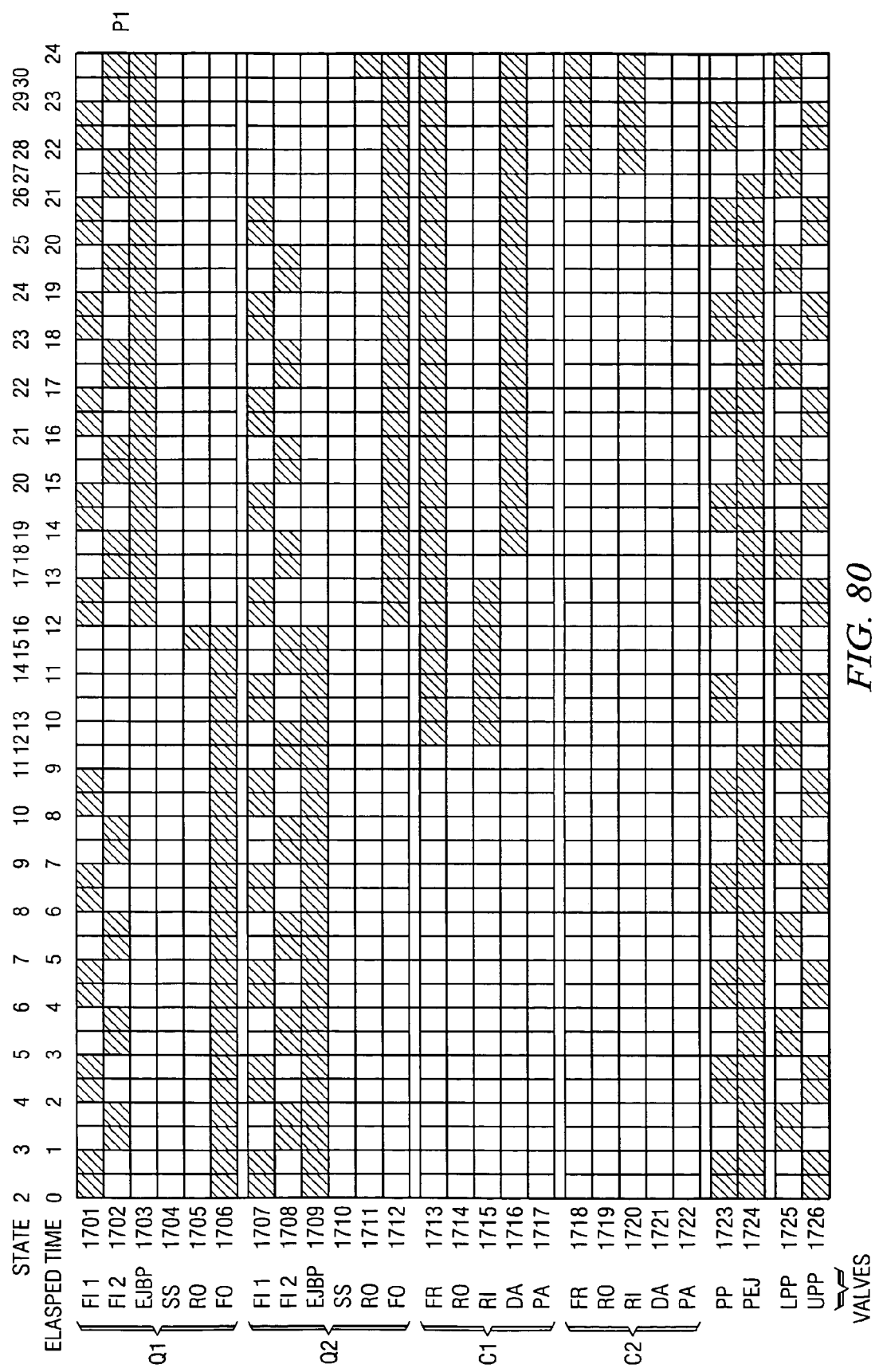

FIGS. 80 and 81 are tabular representations of the poppet valve operational positions during the referenced operational states for the flow process depicted in FIGS. 17-79. A shaded block indicates that the referenced valve is in the open position allowing the flow of fluid there through for the referenced approximated time interval at the referenced state in the process.

The present invention allows multiple separator filter pods and concentrators to be combined in several configurations to improve particular operating characteristics of the system and reduce costs. The separator filter pods provided by the present invention may be operated in parallel (as described above) or in series. Parallel filtration maximizes the volume of fluid that can be treated within a given time frame. However, when separator filter pods are operated in series (meaning filtered fluid flows from one pod directly into the next), they can progressively filter or separate particles and molecule of progressively smaller dimensions. For example, if four separator filter pods are operated in series, the first separator pod might filter particles 20 microns or greater in dimension, the second separator pod at 10 microns, the third separator pod at five microns, and the fourth separator pod at one micron. The size of the particles to be filtered in the above example is arbitrary, but is meant to merely illustrate how multiple separator pods can be configured in series to increase filter and separation efficiency.

Similarly, concentrators may also be used in parallel or series. Similar to the separator filter pods, parallel operation of multiple concentrators maximizes the volume of waste residue that is processed in a given time frame. Operating concentrators in series progressively decreases the fluid remaining in the waste product as the residue move from one concentrator directly into the next concentrator in the formation. The example apparatus shown in FIG. 5A includes two concentrators 510, 511. If these concentrators were operated in series, the resulting reject waste is significantly drier than if the concentrators operate in parallel. In a preferred embodiment of the present invention, if a third concentrator is added in the series, the reject waste product which would be discharged after the completion of the process would comprise dry dust. In this form, many considerable advantages of dry waste disposal would be evident, including the decreased volume of space required to dispose of dry dust versus wet sludge.

The present invention can be applied to many industries. Examples include the petroleum industry for separation of waste streams, the aircraft industry for clear water rinses for corrosion control on aircraft, and the pharmaceutical industry. Likewise, the present invention has myriad applications in the polymerization industry, municipal water and waste water treatment, desalinization, catalyst recovery and steel manufacturing. Whereas prior art filter applications lose roughly 30-40% of their efficiency after initial contact with a waste stream, the present invention maintains its effectiveness over extended periods of continual use. For example, a single apparatus of the present invention can process 22,000 gallons of crude oil in 20 hours, bringing it to pipeline grade in one day. Similarly, the inventive apparatus and method disclosed herein can process and convert up to 60,000 gallons of non-potable water into potable water in one day.

Most prior art methods can only process up to 5000 ppm of solids in an incoming influent. In contrast, the present invention can process up to 140,000 ppm solids in the incoming influent. It will be recognized that filtration and treatment rates will vary according to the porosity of the filter media, size and concentration of contaminate fluid to be filtered, and other variable affecting the treatment process. As such, any reference to operating pressures or treatment capacity, timing and the like are presented as approximate values, and are not to be construed as limitations on the inventive disclosure set forth herein.

Depending on the embodiment utilized, the power requirement to power the apparatus and method discussed herein is generally 120 Volts-7 Amperes. The invention is lightweight, weighing approximately 2000 pounds in the preferred embodiment, is highly mobile and maybe stationed on a skid, pallet or wheeled trailer for easy transport to the site. The flow lines and hoses which provide fluid communication pathways between the components of the inventive apparatus disclosed herein may be manufactured as machined stainless steel piping, Hatalloy or from other materials as appropriate for handling the fluids to be treated as well as the operational environment. They may be fitted to the various components of the disclosed invention using threaded connectors, quick connect/disconnect fittings, or by other attachment means as is known in the art.

The description of the present invention has been presented for purposes of illustration and description, and is not intended to be exhaustive or limited to the invention in the form disclosed. Many modifications and variations will be apparent to those of ordinary skill in the art. The embodiment disclosed was chosen and described in order to best explain the principles of the invention, the practical application, and to enable others of ordinary skill in the art to understand the invention for various embodiments with various modifications as are suited to the particular use contemplated.

We claim:

1. A molecular separator apparatus, comprising:
   at least one separator with at least one annulus disposed therein;
   a flux cartridge with a semi-permeable membrane seated inside said annulus, wherein a fluid ring exists between an interior surface of the annulus and an exterior surface of the flux cartridge;
   a first pump in fluid communication with the separator capable of delivering an influent fluid containing at least one contaminant into the separator, wherein the pressure delivered by the first pump provides kinetic energy to the influent fluid to promote turbulent flow within the fluid ring of the separator which results in the retention of contaminant particles on the exterior surface of the flux cartridge and the collection of the filtered fluid within an interior chamber of the flux cartridge;
   wherein the first pump delivers contaminated fluid influent into the fluid ring of the separator through two alternating fluid paths comprising a first fluid path and a second fluid path wherein the contaminated fluid influent is delivered through the first fluid path to the fluid ring by the movement of a piston inside the first pump from a first position to a second position and is delivered through the second fluid path to the fluid ring by the movement from said second position of said piston toward the first position and,
   a second pump in fluid communication with the separator capable of reversing the flow of fluid through the flux cartridge, wherein filtered fluid is pumped into the fluid ring from the interior chamber of the flux cartridge which provides for the removal of the contaminant particles from contact with the exterior surface of the flux cartridge and transports a substantial portion of the contaminant particles out of the separator.

2. The apparatus according to claim 1, further comprising:
   at least one concentrator in fluid communication with the separator, containing at least one annulus disposed therein; and,
   a flux cartridge with a semi-permeable membrane seated inside the concentrator annulus, wherein a fluid ring exists between the interior surface of the annulus and the exterior surface of the flux cartridge, wherein the contaminant particle waste and fluid flushed from the separator enters the interior chamber of the flux cartridge seated within the concentrator and wherein contaminant particles of a desired dimension are retained on the interior surface of the flux cartridge and the filtered fluid is collected in the fluid ring of the concentrator.

3. The apparatus according to claim 2, further comprising:
   a purge air source in fluid communication with the concentrator capable of providing pressurized air into the fluid ring of the concentrator for removing concentrated waste from contact with the interior surface of the concentrator flux cartridge and transporting the concentrated waste out of the concentrator.

4. The apparatus according to claim 2, further comprising:
   a drying air source in fluid communication with at least one concentrator capable of dewatering the concentrated waste particles located within the concentrator.

5. The apparatus according to claim 2 wherein the flow of fluid into and out of the concentrator is controlled by at least one poppet valve.

6. The apparatus according to claim 2 further comprising a plurality of concentrators which are operated in at least one of a series or parallel configuration.

7. The apparatus according to claim 2 wherein at least one poppet valve controls the flow of fluid into the concentrator.

8. The apparatus according to claim 2 wherein a plurality of poppet valves are cycled incrementally to control the flow of fluid through the concentrator.

9. The apparatus according to claim 1, further comprising:
   a slipstream fluid path in fluid communication with the separator which acts to increase the turbulent flow of contaminated influent within the separator thereby enhancing the filtration efficiency of the separator.

10. The apparatus according to claim 1 further comprising a control panel which includes a plurality of control inputs for monitoring and operating the molecular separator apparatus by a user.

11. The apparatus according to claim 1 wherein the flow of fluid into and out of the separator is controlled by at least one poppet valve.

12. The apparatus according to claim 1 wherein the separator can separate contaminant particles larger than fifty angatroms in dimension from a fluid.

13. The apparatus according to claim 1 comprising a plurality of separators which are operated in at least one of a series or parallel configuration.

14. The apparatus according to claim 1 wherein only one separator is in fluid communication with the second pump and wherein the flow of fluid received from the second pump is alternated between a plurality of separators at regular intervals and the filtered quid from the plurality of separators that are not in fluid communication with the second pump bypass the second pump and flow directly into a collection reservoir.

15. The apparatus according to claim 1 wherein at least one poppet valve controls the flow of fluid into the separator.

16. The apparatus according to claim 1 wherein a plurality of poppet valves are cycled incrementally to control the flow of fluid through the separator.

17. The apparatus of claim 1 wherein the molecular separator is detachably secured to a wheeled transport.

18. The apparatus of claim 1 further comprising:

at least one transition plate in fluid communication with the separator for distributing the influent fluid stream into the separator.

19. The apparatus of claim 2 further comprising:

at least one transition plate in fluid communication with the concentrator for distributing the influent fluid stream into the concentrator.

* * * * *

UNITED STATES PATENT AND TRADEMARK OFFICE
CERTIFICATE OF CORRECTION

PATENT NO. : 7,291,267 B2  Page 1 of 1
APPLICATION NO. : 10/820538
DATED : November 6, 2007
INVENTOR(S) : Raymond Ford Johnson et al.

It is certified that error appears in the above-identified patent and that said Letters Patent is hereby corrected as shown below:

In column 19, line 1, please delete "quid" and replace with -- fluid --

Signed and Sealed this

Twenty-fifth Day of December, 2007

JON W. DUDAS
*Director of the United States Patent and Trademark Office*